US012590693B2

(12) United States Patent
Bocock et al.

(10) Patent No.: US 12,590,693 B2
(45) Date of Patent: *Mar. 31, 2026

(54) METHOD OF CONTROLLING SERIALLY-CONNECTED LIGHTING DEVICES

(71) Applicant: Lutron Technology Company LLC, Coopersburg, PA (US)

(72) Inventors: Ryan M. Bocock, Austin, TX (US); Richard S. Burberry, Austin, TX (US); Christopher M. Green, Austin, TX (US); Jivan J. Luu, Austin, TX (US); Ananthanag Nemmani, Austin, TX (US); Jaykrishna A Shukla, Mays Landing, NJ (US)

(73) Assignee: Lutron Technology Company LLC, Coopersburg, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/980,876

(22) Filed: Dec. 13, 2024

(65) Prior Publication Data

US 2025/0109844 A1 Apr. 3, 2025

Related U.S. Application Data

(63) Continuation of application No. 18/517,150, filed on Nov. 22, 2023, now Pat. No. 12,209,739, which is a (Continued)

(51) Int. Cl.

*F21V 23/00* (2015.01)
*F21K 9/69* (2016.01)

(Continued)

(52) U.S. Cl.

CPC .............. *F21V 23/005* (2013.01); *F21K 9/69* (2016.08); *F21S 4/28* (2016.01); *F21V 5/008* (2013.01);

(Continued)

(58) Field of Classification Search

CPC ........ F21V 23/005; F21V 23/008; F21S 4/28; F21K 9/69

See application file for complete search history.

(56) References Cited

U.S. PATENT DOCUMENTS 7,839,109 B2 11/2010 Carmen et al.
9,146,028 B2 9/2015 Logan et al.

(Continued)

FOREIGN PATENT DOCUMENTS

WO 2008114106 A2 9/2008

*Primary Examiner* — Christopher E Dunay

(74) *Attorney, Agent, or Firm* — Flaster Greenberg P.C.

(57) ABSTRACT

A lighting device may include an elongated housing that defines a cavity. The lighting device may include plurality of emitter printed circuit boards configured to be received within the cavity. Each of the plurality of emitter printed circuit boards may include a plurality of emitter modules mounted thereto. Each of the plurality of emitter printed circuit boards may include a control circuit configured to control the plurality of emitter modules mounted to the respective emitter printed circuit board based on receipt of one or more messages. The lighting device may include a total internal reflection lens for each of the plurality of emitter printed circuit boards. The total internal reflection lens may be configured to diffuse light emitted by the emitter modules of the plurality of emitter printed circuit boards.

20 Claims, 16 Drawing Sheets

Related U.S. Application Data continuation of application No. 17/902,816, filed on Sep. 3, 2022, now Pat. No. 11,859,803.

(60) Provisional application No. 63/240,663, filed on Sep. 3, 2021.

(51) Int. Cl.

| | |
|---|---|
| ***F21S 4/28*** | (2016.01) |
| ***F21V 5/00*** | (2018.01) |
| ***F21V 7/00*** | (2006.01) |
| ***F21V 21/005*** | (2006.01) |
| ***F21V 23/06*** | (2006.01) |
| ***H05B 47/185*** | (2020.01) |
| *F21Y 115/10* | (2016.01) |

(52) U.S. Cl.

CPC .......... *F21V 7/0091* (2013.01); *F21V 21/005* (2013.01); *F21V 23/002* (2013.01); *F21V 23/06* (2013.01); *H05B 47/185* (2020.01); *F21Y 2115/10* (2016.08)

(56) References Cited

U.S. PATENT DOCUMENTS

| | | | | |
|---|---|---|---|---|
| 9,332,598 | B1 | 5/2016 | Ho et al. | |
| 9,360,174 | B2 | 6/2016 | Dong et al. | |
| 9,392,660 | B2 | 7/2016 | Dias et al. | |
| 9,392,663 | B2 | 7/2016 | Knapp et al. | |
| 9,485,813 | B1 | 11/2016 | Lewis et al. | |
| 9,668,314 | B2 | 5/2017 | Dong et al. | |
| 9,671,071 | B1 | 6/2017 | May | |
| 9,769,899 | B2 | 9/2017 | Ho et al. | |
| 9,954,435 | B2 | 4/2018 | Knauss et al. | |
| 10,161,786 | B2 | 12/2018 | Chang et al. | |
| 10,342,100 | B2 | 7/2019 | Dejonge et al. | |
| 10,764,979 | B1 * | 9/2020 | Lewis | H05B 45/12 |
| 10,859,229 | B1 * | 12/2020 | Elwell | F21S 43/15 |
| 2013/0003363 | A1 | 1/2013 | Lu et al. | |
| 2013/0249404 | A1 | 9/2013 | Eckel et al. | |
| 2014/0125133 | A1 * | 5/2014 | Han | F21S 9/022<br>320/148 |
| 2015/0264782 | A1 | 9/2015 | Miura et al. | |
| 2017/0251537 | A1 | 8/2017 | Clark et al. | |
| 2018/0315278 | A1 * | 11/2018 | Kemmerer | C09K 11/643 |
| 2021/0136899 | A1 * | 5/2021 | Elwell | H05B 47/19 |
| 2022/0039243 | A1 | 2/2022 | Bocock et al. | |
| 2022/0325860 | A1 * | 10/2022 | Osborne | F21V 23/0464 |

* cited by examiner

METHOD OF CONTROLLING SERIALLY-CONNECTED LIGHTING DEVICES

CROSS-REFERENCE TO RELATED APPLICATIONS

This application is a continuation of Non-Provisional U.S. patent application Ser. No. 18/517,150, filed Nov. 22, 2023, which is a continuation of Non-Provisional U.S. patent application Ser. No. 17/902,816, filed Sep. 3, 2022, which claims priority from Provisional U.S. Patent Application No. 63/240,663, filed Sep. 3, 2021, the entire disclosures of which are hereby incorporated by reference herein in their entirety.

BACKGROUND

Lamps and displays using efficient light sources, such as light-emitting diode (LED) light sources, for illumination are becoming increasingly popular in many different markets. LED light sources provide a number of advantages over traditional light sources, such as incandescent and fluorescent lamps. For example, LED light sources may have a lower power consumption and a longer lifetime than traditional light sources. When used for general illumination, LED light sources provide the opportunity to adjust the color (e.g., from white, to blue, to green, etc.) or the color temperature (e.g., from warm white to cool white) of the light emitted from the LED light sources to produce different lighting effects.

A multi-colored LED illumination device may have two or more different colors of LED emission devices (e.g., LED emitters) that are combined within the same package to produce light (e.g., white or near-white light). There are many different types of white light LED light sources on the market, some of which combine red, green, and blue (RGB) LED emitters; red, green, blue, and yellow (RGBY) LED emitters; phosphor-converted white and red (WR) LED emitters; red, green, blue, and white (RGBW) LED emitters, etc. By combining different colors of LED emitters within the same package, and driving the differently-colored emitters with different drive currents, these multi-colored LED illumination devices may generate white or near-white light within a wide gamut of color points or correlated color temperatures (CCTs) ranging from warm white (e.g., approximately 2600K-3700K), to neutral white (e.g., approximately 3700K-5000K) to cool white (e.g., approximately 5000K-8300K). Some multi-colored LED illumination devices also may enable the brightness (e.g., intensity level or dimming level) and/or color of the illumination to be changed to a particular set point.

SUMMARY

As described herein a lighting device may include a plurality of controllable light-emitting diode (LED) light sources. A lighting device may include an elongated housing, a plurality of lighting modules, and a plurality of emitter modules. The elongated housing may define a cavity. The cavity may extend along a longitudinal axis of the housing. The plurality of lighting modules may be configured to be received within the cavity of the housing. Each of the plurality of lighting modules may include a plurality of emitter modules mounted thereto. Each of the plurality of lighting modules may include a drive circuit configured to receive a bus voltage on a power bus for powering the plurality of emitter printed circuit boards. Each of the plurality of lighting modules may include a control circuit configured to control the plurality of emitter modules mounted to the respective lighting module based on receipt of one or more messages. The one or more messages may include control instructions. For example, the control circuit may control an intensity level of the emitter modules mounted to a printed circuit board of the respective lighting module. The drive circuit and/or control circuit may be mounted to the printed circuit board of the lighting modules.

The linear lighting device may include a total internal reflection lens for each of the plurality of lighting modules. The total internal reflection lens may be configured to diffuse light emitted by the emitter modules of the plurality of lighting modules. An upper surface of the total internal reflection lens may include a plurality of parallel ridges. The plurality of parallel ridges may be perpendicular to a length of the housing. Each of the plurality of lighting modules may have a length of 3 inches or 4 inches such that the overall length of the linear lighting device is configurable. For example, a first lighting module of the plurality of lighting modules may have a length of 3 inches and a second lighting module of the plurality of lighting modules may have a length of 4 inches. A plurality of lighting modules having different combinations of lengths may be combined in the linear lighting device such that different sized linear lighting devices may be produced. When the lighting modules have lengths of 3 or 4 inches, a plurality of lighting modules of 3 or 4 inch lengths may be assembled in the linear lighting device, for example, to achieve an overall length that can be configured in one inch increments (e.g., any length of 6" or greater in one inch increments).

A first lighting module of the plurality of lighting modules may receive the messages from a fixture controller. The first lighting module may relay the messages to a second lighting module of the plurality of lighting modules. The first lighting module may relay the messages to the second lighting module via an $I^2C$ communication bus. The first lighting module may receive the messages via an RS-485 communication protocol. The first lighting module may include a communications processor configured to receive the messages and relay the messages via the $I^2C$ communication bus.

Each of the plurality of emitter modules may include a plurality of emitters and a plurality of detectors mounted to a substrate and encapsulated by a dome. Each of the plurality of lighting modules may include a receptacle configured to connect adjacent lighting modules of the plurality of lighting modules. The linear lighting device may include a printed circuit board connector that is configured to connect a first lighting module of the plurality of lighting modules to a second lighting module of the plurality of lighting modules via the receptacle. The printed circuit board connector may include a flat flexible cable jumper. The plurality of lighting modules may be attached within the cavity defined by the housing using an adhesive. The adhesive may include thermal tape. The linear lighting device may include a plurality of mounting brackets configured to attach the linear lighting device to a horizontal structure. The linear lighting device may include a cover lens. The linear lighting device may include an input end cap and an output end cap. The input end cap may be configured to cover a first end of the cavity of the housing. The output end cap may be configured to cover a second end of the cavity of the housing. The linear lighting device may include a fixture controller configured to receive an alternating-current (AC) mains line voltage and generate the bus voltage on the power bus. The fixture controller may be configured to send the one or more messages to one or more of the plurality of lighting modules. The fixture controller may be configured to generate a timing signal to send to each of the plurality of lighting modules.

A master lighting module may be configured to determine an order of a plurality of drone lighting modules communicatively coupled to the master lighting module. The master lighting module may be configured to iteratively send a plurality of control messages to the unique addresses of each of the plurality of drone lighting modules. The master lighting module may be configured to measure, after each control message of the plurality of control messages is sent, a voltage on a communication line between the master lighting module and the plurality of drone lighting modules. The master lighting module may be configured to associate each of a plurality of measured voltages with each of the drone lighting modules based on respective unique addresses of the plurality of drone lighting modules. The master lighting module may be configured to determine the order of the plurality of drone lighting modules communicatively coupled to the master lighting module based on the plurality of measured voltages.

A linear lighting assembly may include a fixture controller, a plurality of master lighting modules, and a plurality of drone lighting modules. The fixture controller may be configured to control the plurality of master lighting modules and/or the plurality of drone lighting modules. The fixture controller may be configured to determine an order of the plurality of master lighting modules communicatively coupled to the fixture assembly. For example, the fixture controller may use measured voltages and/or communications to determine the order of the plurality of master lighting modules.

A master lighting module may be configured to generate a timing signal. For example, the master lighting module may be configured to receive, from a fixture controller, a synchronization pulse that indicates a length of a synchronization frame. The master lighting module may be configured to generate, based on the synchronization pulse, a timing signal. The timing signal may indicate a synchronization period during which a plurality of emitters of each of the plurality of drone lighting modules are able to synchronize. The master lighting module may be configured to send, to the plurality of drone lighting modules via a synchronization line, the generated timing signal. The plurality of emitters may be configured to synchronize according to the generated timing signal.

A linear lighting assembly may include a fixture controller, a plurality of linear lighting modules (e.g., one or more master lighting modules where, for example, each master lighting module may include a plurality of drone lighting modules), and cable that couples the devices together. The linear lighting assembly may be configured to detect and respond to brownout events, such as an overload condition and/or a long wire-run condition. The fixture control may include a power converter circuit and a control circuit. The power converter circuit may be configured to generate a bus voltage on a power bus. The power bus may be coupled between the fixture controller and one or more lighting modules (e.g., lighting devices). Each of the lighting devices may be configured to adjust a present intensity level of the light emitted by the lighting device between a low-end intensity level and a high-end intensity level. The control circuit may be configured to control the one or more lighting devices. The control circuit may be configured to detect a brownout event on the power bus, and send a power message to the one or more lighting devices instructing the one or more lighting devices to decrease their respective high-end intensity level (e.g., by a percentage or step) in response to the detection of the brownout event on the power bus (e.g., a DC power bus). The control circuit may be configured to send the power message along a communication bus (e.g., RS-485) coupled between the fixture controller and the one or more lighting devices. The control circuit may be configured to send a brownout notification message to a system controller.

In some examples, to detect the brownout event, the control circuit may be configured to determine a magnitude of the voltage on the power bus, and determine that the magnitude of the voltage on the power bus is indicative of the brownout event on the power bus. For example, in order to determine that the magnitude of the voltage on the power bus is indicative of the brownout event on the power bus, the control circuit may be configured to determine that the magnitude of the voltage on the power bus drops below a first threshold voltage (e.g., 15 V). Further, in some instances, the control circuit may be configured to determine that the magnitude of the voltage on the power bus drops below a first threshold voltage (e.g., 15V) and rises above a second threshold voltage (e.g., 19V) a predetermined number of times (e.g., 3 times) within a predetermined time period (e.g., 6 seconds).

The fixture controller may include a radio frequency interference (RFI) filter and rectifier circuit configured to receive an AC mains line voltage and generate a rectified voltage from the AC mains line voltage. In some instances, in order to determine that the magnitude of the voltage on the power bus is indicative of the brownout event on the power bus, the control circuit is further configured to determine that a magnitude of the AC mains line voltage is stable during the predetermined time period.

The power converter circuit may be configured to control the magnitude of the bus voltage to cause the one or more lighting devices to cease illuminating light (e.g., turn off) when the magnitude of the voltage on the power bus drops below the first threshold voltage, and configured to control the magnitude of the bus voltage to cause the one or more lighting devices to cause the lighting modules to illuminate light (e.g., turn on) when the magnitude of the voltage on the power bus drops rises above the first threshold voltage.

The control circuit may be configured to cause the one or more lighting devices to turn off (e.g., respective emitters of the lighting device) in response to the detection of a brownout event. For example, the control circuit may be configured to cause the voltage on the power bus to drop to zero volts in response to the detection of a brownout event. For instance, the control circuit may be configured to cause the power converter circuit to shut down, thereby causing the voltage on the power bus to drop to zero volts, in response to the detection of a brownout event.

In response to the detecting the brownout event and prior to sending the power message, the control circuit may be configured to send a hold signal (e.g., a pulse that is double the length of the synchronization pulse) to the one or more lighting devices instructing the one or more lighting devices to wait a predetermined amount of time before turning back on. The control circuit may be configured to receive a brownout message from the power converter (e.g., a control circuit of the power converter circuit) to detect the brownout event.

The control circuit may be configured to detect the brownout event based upon the reception of a brownout status message (e.g., a brownout status flag) from at least one of the one or more lighting devices indicating that the lighting device is experiencing the brownout event. For example, the control circuit may be configured to send (e.g., periodically send) a query message (e.g., health message) to the one or more lighting devices, wherein the query message requests that the lighting device send the brownout message if a voltage (e.g., DC voltage) received at the lighting device drops below a threshold voltage (e.g., 15V) (e.g., but remains above a second threshold voltage (e.g., 5V)), and receive the brownout event in response to the query message. In some examples, the control circuit may be configured to send a clear message to the one or more lighting devices that instructs the lighting devices to clear a flag associated with the brownout message after the control circuit sends the power message.

The fixture controller may include a radio frequency interference (RFI) filter and rectifier circuit configured to receive an AC mains line voltage and generate a rectified voltage from the AC mains line voltage. To detect the brownout event, the control circuit may be configured to determine that a magnitude of the AC mains line voltage is stable during a time period that precedes the reception of the brownout status message. For instance, the control circuit may be configured to detect the brownout event based upon the reception of a plurality of consecutive brownout status messages (e.g., a brownout status flag) from at least one of the one or more lighting devices.

The fixture controller may include a radio frequency interference (RFI) filter and rectifier circuit configured to receive an AC mains line voltage and generate a rectified voltage from the AC mains line voltage. The power converter circuit may be configured to receive the rectified voltage and generate the voltage on a power bus.

The control circuit may be configured to send a query message to the one or more lighting devices that requests the lighting device to send a status message including a minimum measured value of the voltage on the power bus, a maximum measured value of the voltage on the power bus, and an average measured value of the voltage on the power bus over a period of time.

The control circuit is configured to determine a number lighting devices of the one or more lighting devices that caused the brownout event.

A linear lighting assembly may be configured to detect a long wire-run condition. The lighting device (e.g., lighting module, such as a master lighting module) may include a power supply that is configured to receive a voltage across a power bus. The lighting device may include a drive circuit that is configured to receive the bus voltage and adjust a magnitude of drive current conducted through one or more emitters of the lighting device. The lighting device may include a control circuit that is configured adjust a present intensity level of light emitted by the lighting device between a low-end intensity level and a high-end intensity level. The control circuit may be configured to determine that the bus voltage falls below a first threshold voltage (e.g., 15V) (e.g., but remains above a second threshold voltage (e.g., 5V)), and control the magnitude of the drive current conducted through the one or more emitters to zero volts in response to the bus voltage being below the first threshold voltage.

The control circuit may be further configured to send a brownout message (e.g., sticky flag as part of a message) to a fixture controller in response to the bus voltage being below the first threshold voltage. The control circuit may be configured to receive (e.g., periodically receive) a query message (e.g., health message) from the fixture controller, wherein the query message requests that the lighting device sends the brownout message if the bus voltage drops below the first threshold voltage.

The fixture controller may include a control circuit that is configured to receive the brownout message from the lighting device, and send a power message to the lighting device instructing the lighting device to decrease their respective high-end intensity level in response to the brownout message. The control circuit of the fixture controller may be configured to send the power message to the one or more lighting devices instructing the one or more lighting devices to decrease their respective high-end intensity level in response to receiving a plurality the brownout messages (e.g., three consecutive messages) from a single lighting device.

The fixture controller may include a radio frequency interference (RFI) filter and rectifier circuit configured to receive an AC mains line voltage and generate a rectified voltage from the AC mains line voltage. The control circuit may be configured to determine that a magnitude of the AC mains line voltage is stable prior to sending the power message to the lighting device.

The control circuit may be configured to send a clear message to the lighting device that instructs the lighting device to clear a flag associated with the brownout message after the control circuit sends the power message.

A linear lighting assembly may be configured to detect a long-wire-run condition. The linear lighting assembly may include a plurality of lighting devices that are configured to adjust a present intensity level of light emitted by the lighting device between a low-end intensity level and a high-end intensity level. The linear lighting assembly may include a fixture controller. The fixture controller may include a control circuit and a power converter circuit. The power converter circuit may be configured to generate a bus voltage on a power bus that is coupled between the fixture controller and the plurality of lighting devices. The control circuit may be configured to control the plurality of lighting devices. The control circuit may be configured to send a query message to the one or more lighting devices, receive a brownout status message (e.g., a brownout status flag) from at least one of the one or more lighting devices indicating that the lighting device is experiencing the brownout event, and send a power message to the one or more lighting devices instructing the one or more lighting devices to decrease their respective high-end intensity level in response to the reception of the brownout status message. The control circuit of each of the plurality of lighting devices may be configured to set their high-end intensity level based on the power message.

Each of the plurality of lighting devices may include a control circuit and a power supply. The power supply may be configured to receive a bus voltage across a bus power bus. The control circuit may be configured to detect a brownout event based on a magnitude of the bus voltage on the power bus (e.g., based on a low bus voltage or a flashing lights event due to a swinging bus voltage), and send the brownout status message to the fixture controller in response to detecting the brownout event and receiving the query message. Further in some examples, the control circuit of each lighting device may be configured to detect the brownout event based on a determination that the bus voltage at the lighting device falls below a first threshold voltage (e.g., 15V) (e.g., but remains above a second threshold voltage (e.g., 5V)).

A fixture controller may include a power converter circuit that is configured to generate a bus voltage on a power bus.

The power bus may be coupled between the fixture controller and one or more lighting devices. Each of the one or more lighting devices may be configured to adjust a present intensity level of the light emitted by the lighting device between a low-end intensity level and a high-end intensity level. The fixture controller may include a control circuit that is configured to control the one or more lighting devices. For example, the control circuit may be configured to detect a brownout event on the power bus and send a power message to the one or more lighting devices instructing the one or more lighting devices to decrease their respective high-end intensity level in response to the detection of the brownout event on the power bus.

In some examples, to detect the brownout event, the control circuit may be configured to determine a magnitude of the bus voltage on the power bus, and determine that the magnitude of the bus voltage on the power bus is indicative of the brownout event on the power bus. For example, to determine that the magnitude of the bus voltage on the power bus is indicative of the brownout event on the power bus, the control circuit may be configured to determine that the magnitude of the bus voltage on the power bus drops below a first threshold voltage. For example, to determine that the magnitude of the bus voltage on the power bus is indicative of the brownout event on the power bus, the control circuit may be configured to determine that the magnitude of the bus voltage on the power bus drops below the first threshold voltage and subsequently rises above a second threshold voltage a predetermined number of times within a predetermined time period. For instance, to determine that the magnitude of the bus voltage on the power bus is indicative of the brownout event on the power bus, the control circuit may be configured to determine that a magnitude of the AC mains line voltage is stable during the predetermined time period.

In some examples, the power converter circuit may be configured to control the magnitude of the bus voltage to cause the one or more lighting devices to cease illuminating light when the magnitude of the bus voltage on the power bus drops below the first threshold voltage, and configured to control the magnitude of the bus voltage to cause the one or more lighting devices to illuminate light when the magnitude of the bus voltage on the power bus drops rises above the first threshold voltage.

In some examples, the control circuit may be configured to cause the one or more lighting devices to turn off in response to the detection of a brownout event.

In some examples, the control circuit may be further configured to cause the bus voltage on the power bus to drop to zero volts in response to the detection of a brownout event. For example, the control circuit may be configured to cause the power converter circuit to shut down, thereby causing the bus voltage on the power bus to drop to zero volts, in response to the detection of the brownout event, wherein the brownout event is an overload event.

In some examples, in response to the detecting the brownout event and prior to sending the power message, the control circuit may be configured to send a hold signal to the one or more lighting devices instructing the one or more lighting devices to wait a predetermined amount of time before turning back on.

In some examples, the control circuit may be configured to detect the brownout event in response to receiving a message from a lighting device of the one or more lighting devices. For example, the control circuit may be configured to send one or more scale up messages to the lighting device, wherein the scale up message cause the lighting device to increase its high-end intensity level. The control circuit may be configured to receive a second message from the lighting device that indicates that the lighting device experienced another brownout event. And, the control circuit may be configured to send a small power message to the lighting device that causes the lighting device to decrease its high-end intensity level, wherein the decrease caused by the small power message is less than the decrease caused by the second message. Accordingly, in such examples, the control circuit may be configured to prevent the brownout event from occurring, but also increase the relative high-end intensity level that the lighting device may operate.

In some examples, the control circuit may be configured to detect the brownout event based upon the reception of a brownout message from at least one of the one or more lighting devices indicating that the lighting device is experiencing the brownout event. For example, the control circuit may be configured to send a query message to the one or more lighting devices, wherein the query message requests that the lighting device send the brownout message if a bus voltage received at the lighting device drops below a threshold voltage, and may be configured to receive the brownout message in response to the query message. In some instances, the control circuit may be configured to send a clear message to the one or more lighting devices that instructs the lighting devices to clear a flag associated with the brownout message after the control circuit sends the power message. In some instances, to detect the brownout event, the control circuit may be configured to determine that a magnitude of the AC mains line voltage is stable during a time period that precedes the reception of the signal. In some instances, the control circuit may be configured to detect the brownout event based upon the reception of a plurality of consecutive signals from at least one of the one or more lighting devices.

In some examples, the control may be is configured to send the power message along a communication bus coupled between the fixture controller and the one or more lighting devices.

In some examples, the control circuit may be configured to send a query message to the one or more lighting devices that requests the lighting device to send a status message including a minimum measured value of the bus voltage on the power bus, a maximum measured value of the bus voltage on the power bus, and an average measured value of the bus voltage on the power bus over a period of time.

In some examples, wherein the control circuit may be configured to determine a number of lighting devices of the one or more lighting devices that caused the brownout event, and send a power message to the number of lighting devices that caused the brownout event.

In some examples, a system may be provided that includes the fixture controller and one or more lighting devices. In such examples, each lighting device may be configured to adjust a present intensity level of light emitted by the lighting device between a low-end intensity level and a high-end intensity level. The lighting device may include a power supply configured to receive a bus voltage across a power bus, a drive circuit that is configured to receive the bus voltage and adjust a magnitude of drive current conducted through one or more emitters of the lighting device, and a control circuit. The control circuit may be configured to adjust a present intensity level of light emitted by the lighting device between a low-end intensity level and a high-end intensity level. The control circuit may be configured to determine that the bus voltage falls below a first threshold voltage (e.g., 15V) and control the magnitude of the drive current conducted through the one or more emitters to zero volts in response to the bus voltage being below the first threshold voltage.

In some examples, the control circuit may be configured to send a brownout message to a fixture controller in response to the bus voltage being below the first threshold voltage. For example, the control circuit may be configured to receive a query message from the fixture controller, wherein the query message requests that the lighting device sends the brownout message if the bus voltage drops below the first threshold voltage.

In some examples, the power supply may be configured to generate a supply voltage using the bus voltage, and the control circuit may be configured to determine that the bus voltage falls below a first threshold voltage but is above a second threshold voltage that is greater than the supply voltage.

In some examples, the control circuit may be configured to determine that the bus voltage falls below a first threshold voltage, control the magnitude of the drive current conducted through the one or more emitters to zero volts in response to the bus voltage being below the first threshold voltage, and send a first message to a fixture controller in response to the bus voltage being below the first threshold voltage. The first message may indicate that the lighting device has experienced a brownout event. In response, the control circuit may receive (e.g., from a fixture controller) a second message that instructs the lighting device to decrease its high-end intensity level.

In some examples, the system may include a fixture controller that includes a power converter circuit configured to generate a bus voltage on a power bus that is coupled between the fixture controller and the plurality of lighting devices, and a control circuit configured to control the plurality of lighting devices. The control circuit may be configured to receive a first message from at least one of the one or more lighting devices indicating that the lighting device is experiencing the brownout event, and send a second message to the one or more lighting devices instructing the one or more lighting devices to decrease their respective high-end intensity level in response to the reception of the first message.

In some examples, the control circuit may be configured to send a third message to the one or more lighting devices, wherein the third message requests that the one or more lighting devices send the first message if a magnitude of a bus voltage received on a power bus at the respective lighting device is less than a threshold voltage.

In some examples, the system may include a lighting device that includes a control circuit configured to detect a brownout event based on a magnitude of the bus voltage on the power bus, and send the first message to the fixture controller in response to detecting the brownout event and receiving a third message. The third message may request that the one or more lighting devices send the first message based on a magnitude of a bus voltage received on a power bus at the respective lighting device.

In some examples, the control circuit of the lighting device may be configured to detect the brownout event based on a determination that the bus voltage at the lighting device falls below a first threshold voltage. For example, the control circuit may be configured to detect the brownout event based on a determination that the bus voltage at the lighting device falls below the first threshold voltage but remains above a second threshold voltage. For instance, the control circuit may be configured to set their high-end intensity level based on the second message.

DETAILED DESCRIPTION

Figure 1:
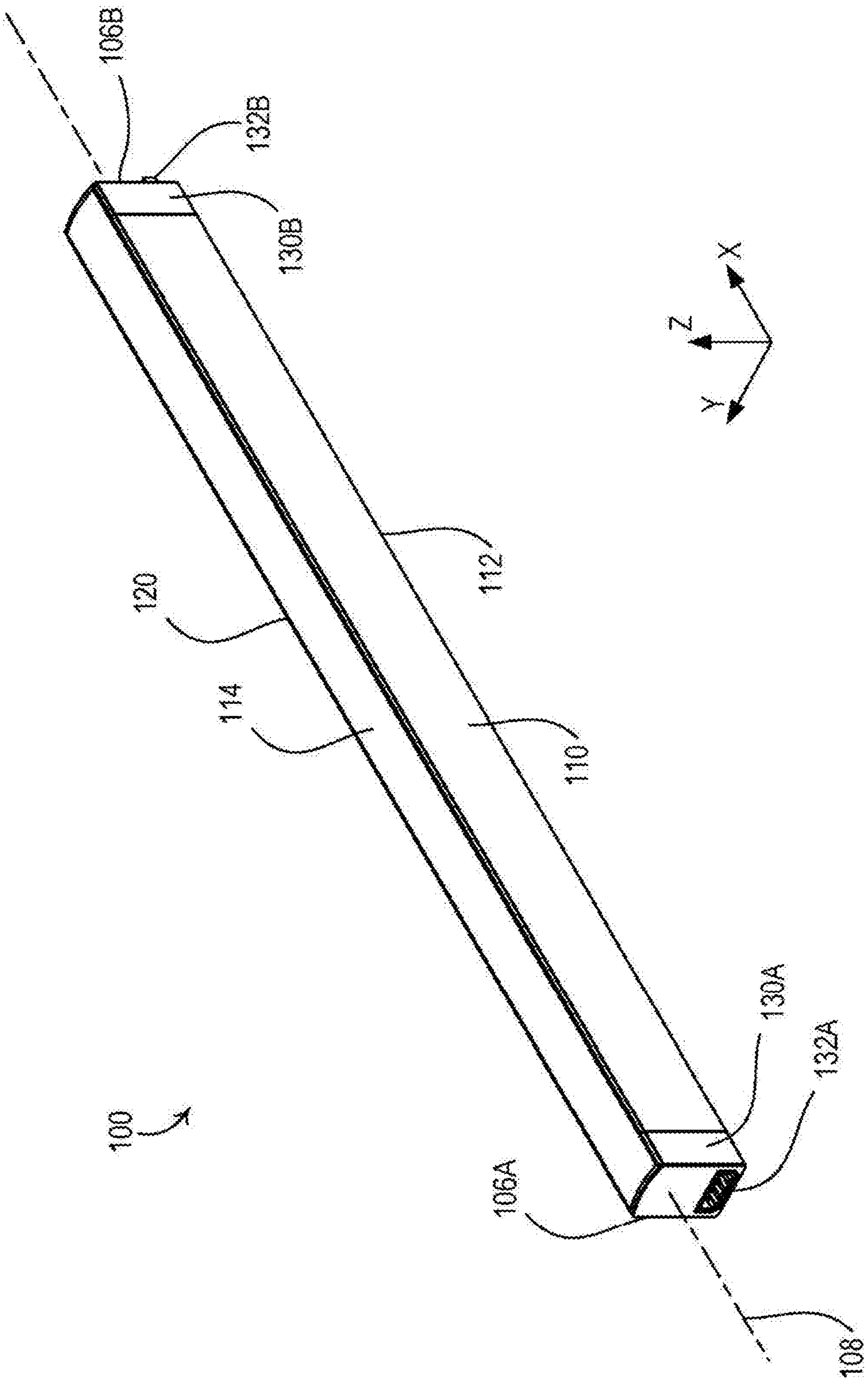
FIG. 1 is a simplified perspective view of an example lighting device (e.g., a linear lighting fixture).

FIG. 1 is a simplified perspective view of an example lighting device 100, (e.g., a linear lighting fixture). The lighting device 100 may include a housing 110, a cover lens 120, and end caps 130A, 130B. The housing 110 may be elongate (e.g., in the x-direction). The housing 110 may be configured to be mounted to a structure (e.g., a horizontal structure) such that the linear lighting device is attached to the structure. For example, the lighting device 100 may be configured to be mounted underneath a cabinet, a shelf, a door, a step, and/or some other structure. The housing 110 may define an upper surface 112 and a lower surface 114. The upper surface 112 may be configured to be proximate to the structure and the lower surface 114 may be distal to the structure when the housing 110 is mounted to the structure.

The lighting device 100 may define a first end 106A (e.g., an input end) and an opposed second end 106B (e.g., an output end). The end cap 130A may be an input end cap located at the first end 106A and the end cap 130B may be an output end cap located at the second end 106B. The lighting device 100 may define connectors 132A, 132B that are accessible via the respective end caps 130A, 130B. The connectors 132A, 132B may be configured to connect the lighting device 100 to a fixture controller (e.g., a controller, a lighting controller and/or a fixture controller such as the fixture controller 520 shown in FIG. 6) and/or other lighting devices. For example, the connector 132A may be configured to connect the lighting device 100 to the controller or another lighting device and the connector 132B may be configured to connect the lighting device 100 to another lighting device.

Figure 2:
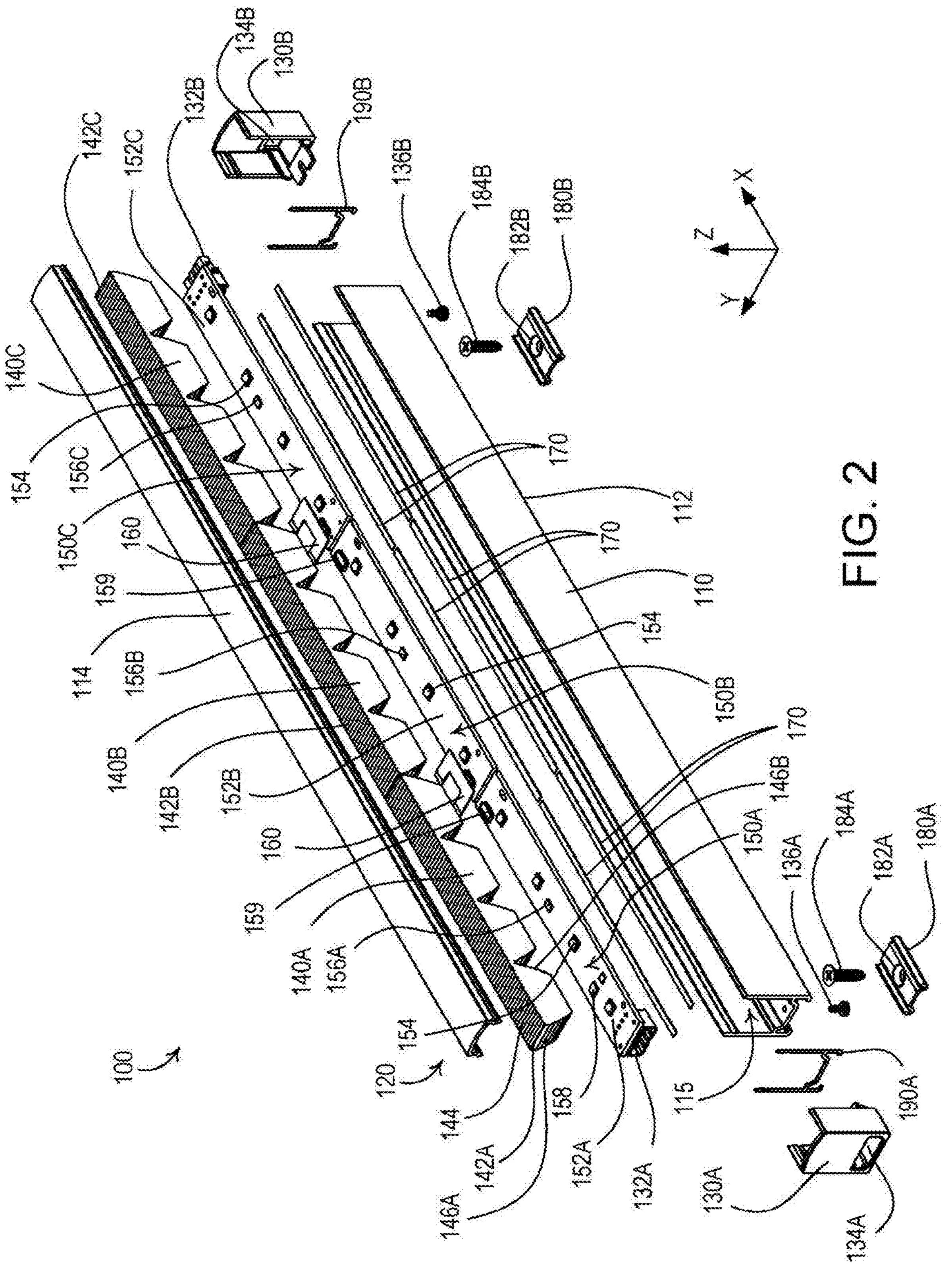
FIG. 2 is a partially exploded view of the lighting device of FIG. 1.

FIG. 2 is an exploded view of the example lighting device 100. The housing 110 may define a cavity 115 extending along a longitudinal axis 108 (e.g., in the x-direction) of the lighting device 100 (e.g., the housing 110). The lighting device 100 may comprise one or more lighting modules (e.g., light-generation modules) 150A, 150B, 150C that may be received within the cavity 115. The lighting modules may each comprise a respective printed circuit board (PCB) 152A, 152B, 152C. The lighting modules may each comprise one or more emitter modules 154 (in this example, each lighting module 150A, 150B, 150C includes four respective emitter modules 154), which may each include one or more emitters, such as light-emitting diodes (LEDs). The emitter modules 154 may be mounted to the respective PCBs 152A, 152B, 152C. Each of the PCBs 152A, 152B, 152C may include an emitter processor 156A, 156B, 156C configured to control the emitter modules 154 of the respective lighting module 150A, 150B, 150C. When the lighting modules 150A, 150B, 150C include a plurality of emitter modules 154, each of the plurality of emitter modules 154 of a respective lighting module (e.g., lighting module 150A) may be controlled by one emitter processor (e.g., emitter processor 156A). Controlling multiple emitter modules 154 with one emitter processor may reduce the power consumption of the lighting module, reduce a size of the PCB, and/or reduce a number of messages sent.

The lighting modules 150A, 150B, 150C (e.g., the PCBs 152A, 152B, 152C) may be secured within the cavity 115, for example, using thermal tape 170. The thermal tape 170 may be an adhesive that enables heat dissipation from the emitters 154 of the PCBs 152A, 152B, 152C to the housing 110, for example, while also affixing the PCBs 152A, 152B, 152C to the housing 110. The thermal tape 170 may be separated into segments (e.g., two or more) for each of the PCBs 152A, 152B, 152C. Alternatively, it should be appreciated that the thermal tape 170 may be continuous along the length (e.g., in the x-direction) of the lighting device 100.

The PCBs 152A, 152B, 152C of the lighting modules 150A, 150B, 150C may be connected together using cables 160 (e.g., ribbon cables). The cables 160 may mechanically, electrically, and/or communicatively connect adjacent PCBs of the PCBs 152A, 152B, 152C. For example, the PCB 152A may be connected to the PCB 152B via one of the cables 160 and the PCB 152B may be connected to the PCB 152C via another one of the cables 160. For example, the ends of the cables 160 may be inserted into sockets 159, such as zero-insertion force (ZIF) connectors, on PCBs of the adjacent lighting modules. The cables 160 may be flat flexible cable jumpers, as shown. Alternatively, the cables 160 may be round flexible jumpers, rigid jumpers, and/or the like.

The lighting modules 150A may be a master module (e.g., a starter module). For example, the master module may be a first module of the lighting device 100 that is located proximate to the first end 106A. For example, each lighting device 100 may start with a master module (e.g., such as the lighting module 150A). A master module may receive messages (e.g., including control data and/or commands) and may be configured to control one or more other lighting modules, for example, drone lighting modules, based on receipt of the messages. For example, each master module may include an additional processor (e.g., a master processor 158). The lighting modules 150B, 150C may be drone lighting modules. Each drone lighting module may be controlled by a master module. For example, the lighting modules 150B, 150C may be controlled by the lighting module 150A. The master processor 158 of the lighting module 150A may control the emitter processors 156A, 156B, 156C to control the emitter modules 154 of each of the lighting modules 150A, 150B, 150C. Drone lighting modules may be either a middle drone lighting module or an end drone module. Middle drone lighting modules (e.g., such as the emitter module 150B) may be connected between a master module and another drone lighting module. Middle drone lighting modules may be connected between other drone lighting modules. End drone lighting modules (e.g., such as the lighting module 150C) may be connected between a master module or another drone lighting module of its respective lighting device and another lighting device. End drone lighting modules may be connected between another drone lighting module and another master module (e.g., when the lighting device 100 includes multiple master modules). Although the lighting device 100 is shown having three lighting modules, for example, a master module 150A, a middle drone lighting module 150B, and an end drone lighting module 150C, it should be appreciated that a lighting device may include a plurality of master modules. Each master module may control a plurality (e.g., one or more) of drone lighting modules (e.g., up to five drone lighting modules).

Each master module (e.g., the lighting module 150A) of the lighting device 100 may include a connector 132A (e.g., an input connector) attached thereto. For example, the connector 132A may be a female connector. The connector 132A may be configured to enable connection of the lighting device 100 to a fixture controller (e.g., a controller and/or a fixture controller, such as fixture controller 520 shown in FIG. 6). The connector 132A may be configured to enable connection of the lighting device 100 to another lighting device. The connector 132A may be configured to enable connection of the master module (e.g., the lighting module 150A) of the lighting device 100 to a drone lighting module (e.g., an end drone lighting module) of another lighting device. Each end drone lighting module (e.g., the lighting module 150C) of the lighting device 100 may include a connector 132B (e.g., an input connector) attached thereto. For example, the connector 132B may be a male connector. The connector 132B may be configured to enable connection of the lighting device 100 to another lighting device. The connector 132B may be configured to enable connection of the end drone lighting module (e.g., the lighting module 150C) of the lighting device 100 to a master module of another lighting device.

The lighting device 100 may comprise end caps 130A, 130B. The end caps 130A, 130B may define apertures 134A, 134B that are configured to receive the connector 132A and/or the connector 132B. The end caps 130A, 130B may be secured to the housing 110, for example, using fasteners 136A, 136B. Light gaskets 190A, 190B may be configured to prevent light emitted by the emitter PCBs 150A, 150B, 150C from escaping between the end caps 130A, 130B and the housing 110. The light gasket 190A may be configured to be located between the end cap 130A and the housing 110.

The light gasket 190B may be configured to be located between the end cap 130B and the housing 110.

The lighting device 100 may comprise total internal reflection (TIR) lenses 140A, 140B, 140C. The TIR lenses 140A, 140B 140C may be configured to diffuse the light emitted by the emitters 154 of the lighting modules 150A, 150B, 150C. For example, each of the TIR lenses 140A, 140B, 140C may be configured to be located proximate to a respective one of the lighting modules 150A, 150B, 150C. That is, the TIR lens 140A may be located proximate to (e.g., directly above) the lighting module 150A, the TIR lens 140B may be located proximate to (e.g., directly above) the lighting module 150B, and the TIR lens 140C may be located proximate to (e.g., directly above) the lighting module 150C. Each of the TIR lenses 140A, 140B, 140C may define a plurality of polytopes (e.g., hexahedrons) connected together. Each of the plurality of polytopes may be funnel portions that are configured to funnel the light from the emitter modules 154 toward the cover lens 120. Each of the TIR lenses 140A, 140B, 140C may have a number of funnel portions that is equal to the number of emitter modules 154 of the respective lighting module over which the respective TIR lens is located. Each of the plurality of polytopes may define a plurality of faces. The lower surface 144 and side surfaces 146A, 146B of each of the TIR lenses 140A, 140B, 140C (e.g., upper and side faces of each of the plurality of polytopes) may define a plurality of ridges 142A, 142B, 142C. The plurality of ridges 142A, 142B, 142C may be parallel to one another. Each of the plurality of ridges 142A, 142B, 142C may extend in a direction perpendicular to a length of the housing 110 (e.g., perpendicular to the longitudinal axis 108 of the housing). For example each of the plurality of ridges 142A, 142B, 142C may oriented in a direction parallel to the y-direction.

A length of the TIR lenses 140A, 140B, 140C may correspond to a length of a corresponding one of the lighting modules 150A, 150B, 150C. The TIR lenses 140A, 140B, 140C may be made of a UV resistant material, for example, such as an acrylic, a polycarbonate, and/or the like. The TIR lenses 140A, 140B, 140C may be transparent, semi-transparent, and/or colored.

The lighting device 100 may also comprise mounting brackets 180A, 180B. The mounting brackets 180A, 180B may be configured to attach the lighting device 100 to the structure. For example, the mounting brackets 180A, 180B may engage the upper surface 112 of the housing 110. The mounting brackets 180A, 180B may define respective holes 182A, 182B that are configured to receive respective fasteners 184A, 184B configured to attach the mounting brackets 180A, 180B to the structure.

Although the figures depict the lighting device 100 with the TIR lenses 140A, 140B, 140C, it should be appreciated that the lighting device 100 may not include the TIR lenses 140A, 140B, 140C. In this case, a height of the housing 110 may be reduced in the z-direction which would enable a lower profile for the lighting device 100.

FIGS. 3A-3E are perspective views of example lighting modules 200A, 200B, 200C, 200D, 200E (e.g., such as the lighting modules 150A, 150B, 150C shown in FIG. 2). The lighting modules 200A, 200B, 200C, 200D, 200E may be configured to be used in a lighting device (e.g., such as the lighting device 100). Each of the lighting modules 200A, 200B, 200C, 200D, 200E may comprise respective printed circuits board (PCB) 202 (e.g., such as the PCBs 152A, 152B, 152C of the lighting device 100). Each of the PCBs 202 may have a length of 3 or 4 units (e.g., 3 or 4 inches, centimeters, etc.). When the PCBs 202 of the lighting modules 200A, 200B, 200C, 200D, 200E have a length of 3 or 4 units, the lighting device may be configured to have any length of 10 units or greater in one unit increments. Also, when the PCBs 202 have a length of 3 or 4 units, the lighting device may be configured to have a length of 3 units (e.g., one 3 unit PCB), 4 units (e.g., one 4 unit PCB), 6 units (e.g., two 3 unit PCBs), 7 units (e.g., one 3 unit PCB and one 4 unit PCB), 8 units (e.g., two 4 unit PCBs), or 9 units (e.g., three 3 unit PCBs). Each of the lighting modules 200A, 200B, 200C, 200D, 200E may include a plurality of emitter modules 210 (e.g., the emitter modules 154) mounted to the respective PCBs 202. The number of emitter modules 210 may be based on a length of the PCB of the respective emitter lighting module. For example, a 3-inch lighting module may include three emitter modules 210 and a 4-inch lighting module may include four emitter modules 210. The emitter modules 210 may be aligned linearly on each printed circuit board 202 as shown in FIGS. 3A-3E. For example, the emitter modules 210 may be equally spaced apart, e.g., approximately one inch apart. Although the lighting modules 200A, 200B, 200C, 200D, 200E are depicted in FIGS. 3A-3E with three or four emitter modules 210 linearly aligned and equally spaced apart, the lighting modules 200A, 200B, 200C, 200D, 200E could have any number of emitter modules in any alignment and spaced apart by any distance.

The emitter modules 210 on the lighting modules 200A, 200B, 200C, 200D, 200E may be rotated (e.g., in a plane defined by the x-axis and the y-axis) with respect to one another. For example, a first emitter module may be arranged in a first orientation and an adjacent emitter module may be arranged in a second orientation that is rotated by a predetermined angle with respect to the first orientation. Successive emitter modules may be arranged in orientations that are rotated by the predetermined angle with respect to an adjacent emitter module.

When lighting modules have a length of 4 units (e.g., inches), each of the emitter modules 210 may be rotated by 90 degrees with respect to adjacent emitter modules 210. For example, the second emitter module (e.g., in the x-direction) may be rotated 90 degrees (e.g., clockwise or counter-clockwise) from the first emitter module, the third emitter module (e.g., in the x-direction) may be rotated 90 degrees in the same direction (e.g., clockwise or counter-clockwise), and the fourth emitter module may be rotated 90 degrees in the same direction (e.g., clockwise or counter-clockwise) with respect to the third emitter module. Stated differently, the second emitter module may be oriented 90 degrees offset from the first emitter module, the third emitter module may be oriented 180 degrees offset from the first emitter module, and the fourth emitter module may be oriented 270 degrees offset from the first emitter module.

When lighting modules have a length of 3 units (e.g., inches), each of the emitter modules 210 may be rotated by 120 degrees with respect to adjacent emitter modules 210. For example, the second emitter module (e.g., in the x-direction) may be rotated 120 degrees (e.g., clockwise or counter-clockwise) from the first emitter module, and the third emitter module (e.g., in the x-direction) may be rotated 120 degrees in the same direction (e.g., clockwise or counter-clockwise) with respect to the second emitter module. Stated differently, the second emitter module may be oriented 120 degrees offset from the first emitter module, the third emitter module may be oriented 240 degrees offset from the second emitter module.

Figure 3A:
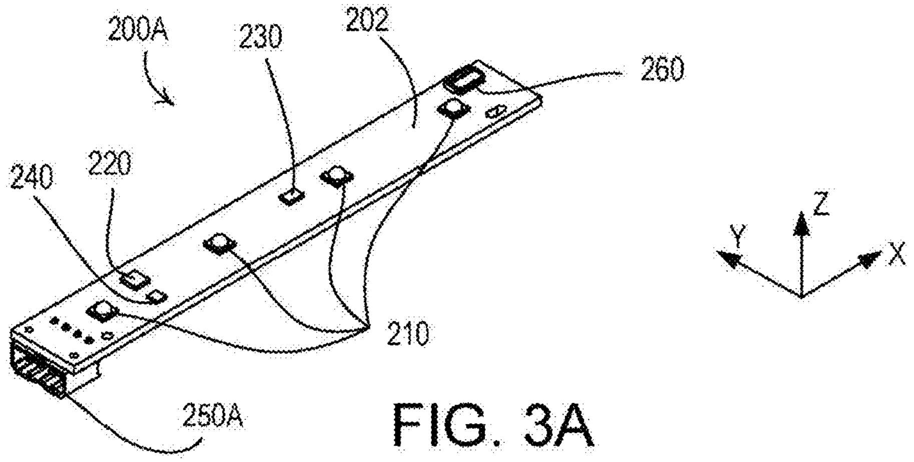
FIGS. 3A-3E are example light emitting diode (LED) printed circuit boards for the lighting device of FIG. 1.

FIG. 3A depicts an example master lighting module 200A (e.g., such as the lighting module 150A shown in FIG. 2).

The master lighting module 200A may include a plurality of emitter modules 210 (e.g., four) mounted to a PCB 202. The PCB 202 of the master lighting module 200A may have a length that is defined in four units (e.g., four inches, four centimeters, etc.). It should be appreciated that the master lighting module 200A may also have a length that is defined in three units. The master lighting module 200A may include a master control circuit 220 (e.g., the master processor 158 shown in FIG. 2) and an emitter control circuit 230 (e.g., the emitter processor 156A shown in FIG. 2). The master lighting module 200A may also comprise a drive circuit (not shown) configured to conduct current through one or more emitters of each of the emitter modules 210 to cause the emitter modules to emit light. The emitter control circuit 230 may be configured to control the drive circuit to control the intensity level and/or color of the light emitted by the plurality of emitter modules 210 mounted to the PCB 202 of the master lighting module 200A. The master control circuit 220 may be configured to receive messages (e.g., from a fixture controller such as the fixture controller 520 shown in FIG. 6), for example, via the communication circuit 240. The messages may include control data and/or commands for controlling the emitter modules 210. The master control circuit 220 may be configured to control one or more other lighting modules, for example, drone lighting modules, based on receipt of the messages. For example, the messages may be received by the communication circuit 240. The communication circuit 240 may relay the messages to the master control circuit 220. The master control circuit 220 may send the messages to the emitter control circuit 230 of the master lighting module 200A and to the emitter control circuit 230 of any other drone lighting module (e.g., such as the drone lighting modules 200B, 200C, 200D, 200E) of the lighting device.

The master lighting module 200A may include a connector 250A (e.g., the connector 132A shown in FIG. 2) that is configured to connect the master lighting module 200A to a fixture controller (e.g., such as the fixture controller 520 shown in FIG. 6) or another lighting module (e.g., a drone lighting module). The connector 250A may be a female connector. The master lighting module 200A may include a socket 260 (e.g., one of the sockets 159 shown in FIG. 2) that is configured to connect the master lighting module 200A to an adjacent drone lighting module. The socket 260 may be configured to receive a cable (e.g., such as the cable 160 shown in FIG. 2). For example, the socket 260 may comprise a zero-insertion force (ZIF) connector. Although FIG. 3A depicts the master module 200A having one socket 260, it should be appreciated that the master module 200A may have two sockets 260 (e.g., one at each end of the board 202). For example, a lighting device may have more than one master module 200A. When there are two or more master modules in a lighting device, the first master module may be a starter master module (e.g., such as master module 200A) with one socket 260 and the second master module may be a master middle module with two sockets 260. The master middle module may be configured to connect to two drone lighting modules (e.g., one on each side of the master middle module).

Figure 3B:
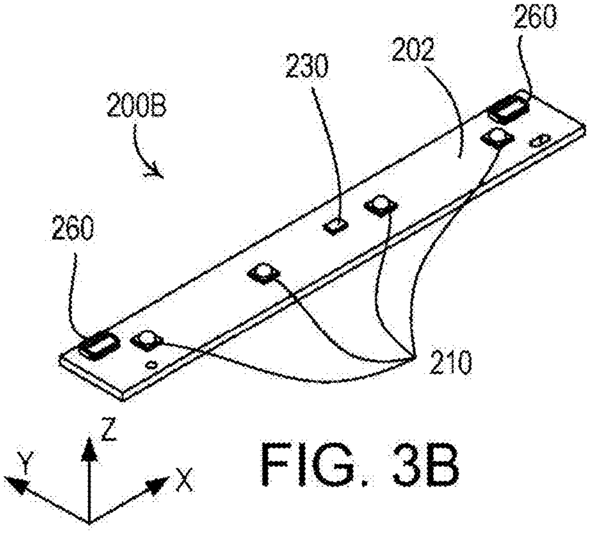

FIG. 3B depicts an example drone lighting module 200B (e.g., a middle drone lighting module, such as the lighting module 150B shown in FIG. 2). The drone lighting module 200B may include a plurality of emitter modules 210 (e.g., four) mounted to a PCB 202. The PCB 202 of the drone lighting module 200B may have a length that is defined in four units (e.g., four inches, four centimeters, etc.). The drone lighting 200B may include an emitter control circuit 230 (e.g., the emitter processor 156B shown in FIG. 2). The drone lighting module 200B may also comprise a drive circuit (not shown) configured to conduct current through one or more emitters of each of the emitter modules 210 to cause the emitter modules to emit light. The emitter control circuit 230 of the drone lighting module 200B may receive messages from the master lighting module 200A. The emitter control circuit 230 may be configured to control the drive circuit to control the intensity level and/or color of the light emitted by the plurality of emitter modules 210 mounted to the PCB 202 of the drone lighting module 200B. The drone lighting module 200B may include a pair of sockets 260 (e.g., two of the sockets 159 shown in FIG. 2) that are configured to connect the drone lighting module 200B to one or more adjacent drone lighting modules and/or a master lighting module. The sockets 260 may be configured to receive cables (e.g., such as the cables 160 shown in FIG. 2). For example, the sockets 260 may comprise a zero-insertion force (ZIF) connectors.

Figure 3C:
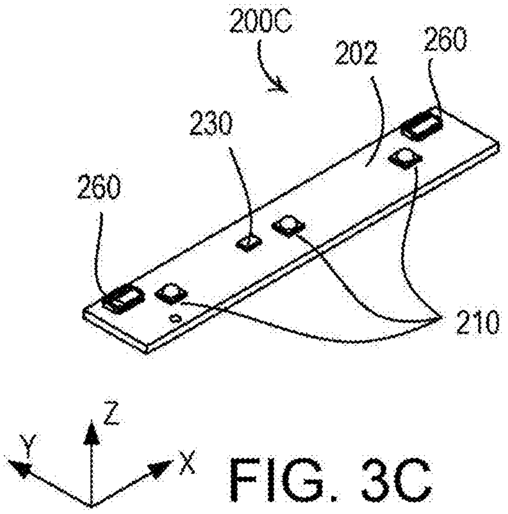

FIG. 3C depicts another example drone lighting module 200C (e.g., a middle drone lighting module). The drone lighting module 200C may include a plurality of emitter modules 210 (e.g., three) mounted to a PCB 202. The PCB 202 of the drone lighting module 200C may have a length that is defined in three units (e.g., three inches, three centimeters, etc.). The drone lighting module 200C may include an emitter control circuit 230 (e.g., an emitter processor). The emitter control circuit 230 of the drone lighting module 200C may receive messages from the master lighting module 200A. The drone lighting module 200C may also comprise a drive circuit (not shown) configured to conduct current through one or more emitters of each of the emitter modules 210 to cause the emitter modules to emit light. The emitter control circuit 230 may be configured to control the drive circuit to control the intensity level and/or color of the light emitted by the plurality of emitter modules 210 mounted to the PCB 202 of the drone lighting module 200C. The drone emitter PCB 200C may include a pair of sockets 260 (e.g., two of the sockets 159 shown in FIG. 2) that are configured to connect the drone lighting module 200B to one or more adjacent drone lighting module and/or a master lighting module. The sockets 260 may be configured to receive cables (e.g., such as the cables 160 shown in FIG. 2). For example, the sockets 260 may comprise a zero-insertion force (ZIF) connectors.

Figure 3D:
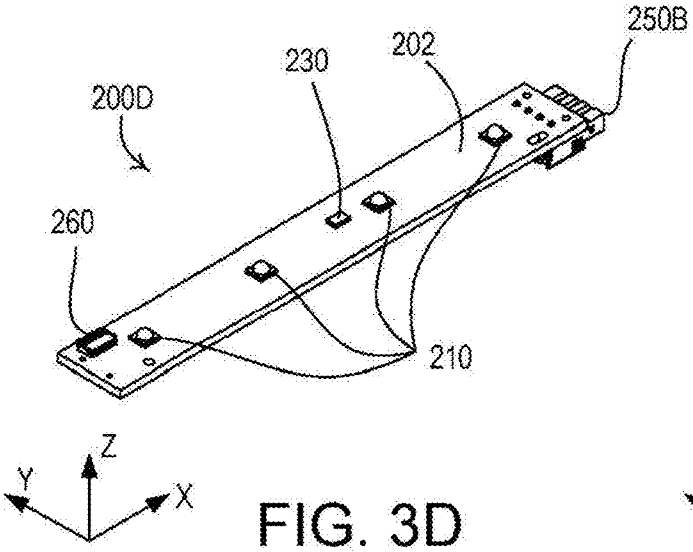

FIG. 3D depicts an example drone lighting module 200D (e.g., an end drone lighting module, such as the lighting module 150C shown in FIG. 2). The drone lighting module 200D may include a plurality of lighting modules 210 (e.g., four) mounted to a PCB 202. The PCB 202 of the drone lighting module 200D may have a length that is defined in four units (e.g., four inches, four centimeters, etc.). The drone lighting module 200D may include an emitter control circuit 230 (e.g., the emitter processor 156C shown in FIG. 2). The emitter control circuit 230 of the drone lighting module 200D may receive messages from the master lighting module 200A. The drone lighting module 200D may also comprise a drive circuit (not shown) configured to conduct current through one or more emitters of each of the emitter modules 210 to cause the emitter modules to emit light. The emitter control circuit 230 may be configured to control the drive circuit to control the intensity level and/or color of the light emitted by the plurality of emitter modules 210 mounted to the PCB 202 of the drone lighting module 200D. The drone lighting module 200D may include a connector 250B (e.g., the connector 132B shown in FIG. 2) that is configured to connect the drone lighting module 200D to another lighting device (e.g., a master lighting module of the other lighting device). The connector 250B may be a male connector. The drone lighting module 200D may include a socket 260 (e.g., one of the sockets 159 shown in FIG. 2) that is configured to connect the drone lighting module 200D to an adjacent drone lighting module or a master lighting module. The receptacle 260 may be configured to receive a cable (e.g., such as the cable 160 shown in FIG. 2). For example, the socket 260 may comprise a zero-insertion force (ZIF) connector.

Figure 3E:
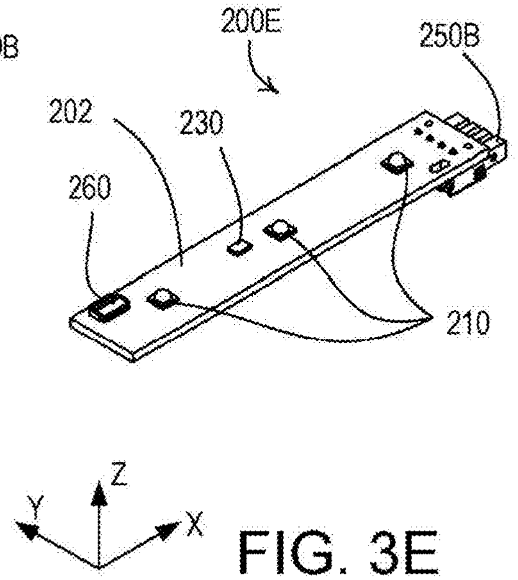

FIG. 3E depicts an example drone lighting module 200E (e.g., an end drone lighting module). The drone lighting module 200E may include a plurality of emitter modules 210 (e.g., three) mounted to a PCB 202. The PCB 202 of the drone lighting module 200E may have a length that is defined in three units (e.g., three inches, three centimeters, etc.). The drone lighting module 200E may include an emitter control circuit 230 (e.g., an emitter processor). The emitter control circuit 230 of the drone lighting module 200E may receive messages from the master lighting module 200A. The drone lighting module 200E may also comprise a drive circuit (not shown) configured to conduct current through one or more emitters of each of the emitter modules 210 to cause the emitter modules to emit light. The emitter control circuit 230 may be configured to control the drive circuit to control the intensity level and/or color of the light emitted by the plurality of emitter modules 210 mounted to the PCB 202 of the drone lighting module 200E. The drone lighting module 200E may include a connector 250B (e.g., the connector 132B shown in FIG. 2) that is configured to connect the drone lighting module 200E to another lighting device (e.g., a master lighting module of the other lighting device). The connector 250B may be a male connector. The drone lighting device 200E may include a socket 260 (e.g., one of the sockets 159 shown in FIG. 2) that is configured to connect the drone lighting device 200E to an adjacent drone lighting module or a master lighting module. The socket 260 may be configured to receive a cable (e.g., such as the cable 160 shown in FIG. 2). For example, the socket 260 may comprise a zero-insertion force (ZIF) connector.

Figure 4A:
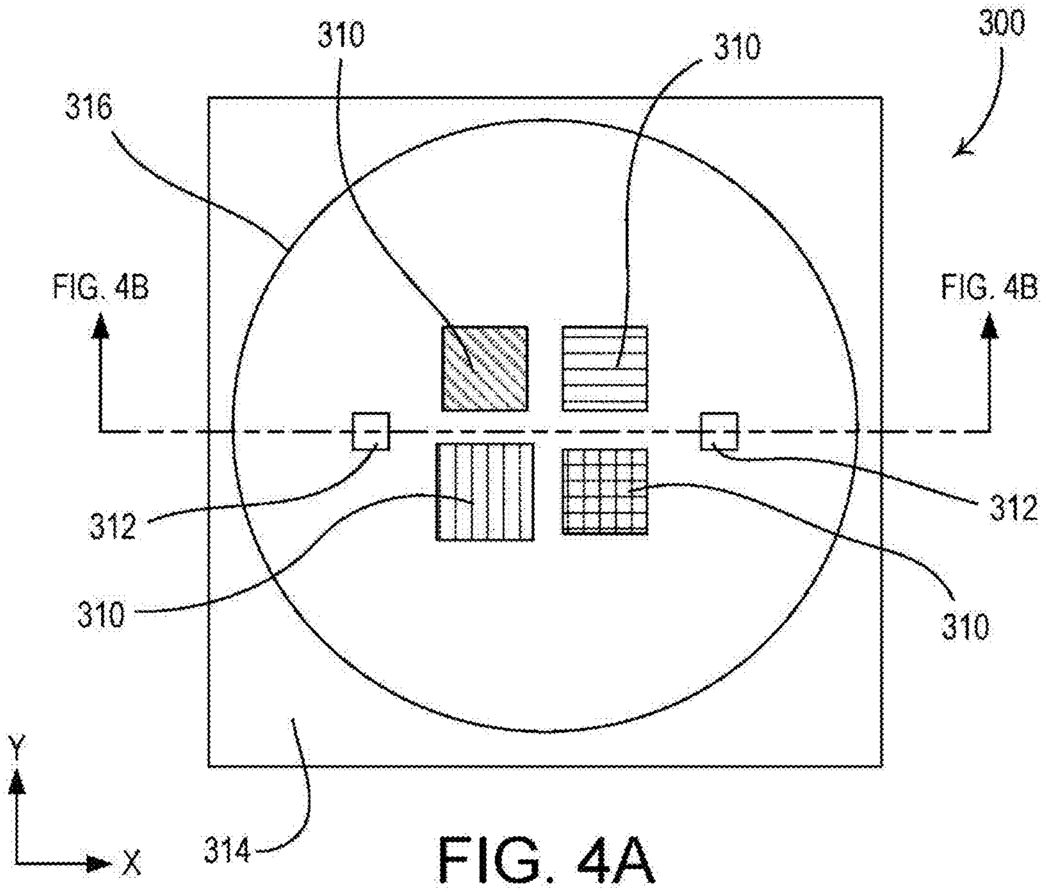
FIG. 4A is a top view of an example emitter module.
Figure 4B:
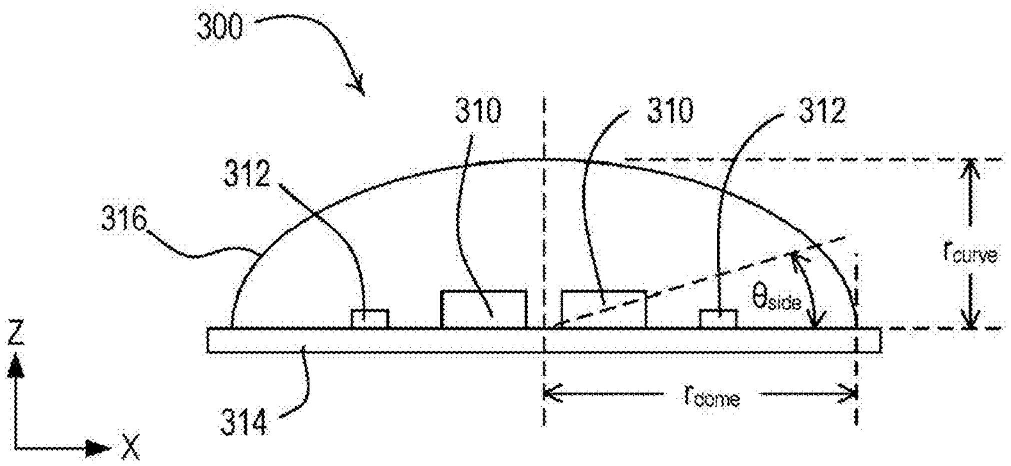
FIG. 4B is a side cross-sectional view of the emitter module of FIG. 5A.

FIG. 4A is a top view of an example emitter module 300 (e.g., such as the emitter modules 154 shown in FIG. 2 and/or the emitter modules 210 shown in FIGS. 3A-3E). FIG. 4B is a side cross-section view of the emitter module 300 taken through the center of the emitter module (e.g., through the line shown in FIG. 4A). The emitter module 300 may comprise an array of four emitters 310 (e.g., emission LEDs) and two detectors 312 (e.g., detection LEDs) mounted on a substrate 314 and encapsulated by a dome 316. The emitters 310, the detectors 312, the substrate 314, and the dome 316 may form an optical system. The emitters 310 may each emit light of a different color (e.g., red, green, blue, and white or amber), and may be arranged in a square array as close as possible together in the center of the dome 316, so as to approximate a centrally located point source. The detectors 312 may be any device that produces current indicative of incident light, such as a silicon photodiode or an LED. For example, the detectors 312 may each be an LED having a peak emission wavelength in the range of approximately 550 nm to 700 nm, such that the detectors 312 may not produce photocurrent in response to infrared light (e.g., to reduce interference from ambient light). For example, a first one of the detectors 312 may comprise a small red, orange or yellow LED, which may be used to measure a luminous flux of the light emitted by the red LED of the emitters 310. A second one of the detectors 312 may comprise a green LED, which may be used to measure a respective luminous flux of the light emitted by each of the green and blue LEDs of the emitters 310. Both of the detectors 312 may be used to measure the luminous flux of the white LED of the emitters 310 at different wavelengths (e.g., to characterize the spectrum of the light emitted by the white LED).

The substrate 314 of the emitter module 300 may be a ceramic substrate formed from an aluminum nitride or an aluminum oxide material or some other reflective material, and may function to improve output efficiency of the emitter module 300 by reflecting light out of the emitter module through the dome 316. The dome 316 may comprise an optically transmissive material, such as silicon or the like, and may be formed through an over-molding process, for example. A surface of the dome 316 may be lightly textured to increase light scattering and promote color mixing, as well as to reflect a small amount of the emitted light back toward the detectors 312 mounted on the substrate 314 (e.g., about 5%). The size of the dome 316 (e.g., a diameter of the dome in a plane of the LEDs 310) may be generally dependent on the size of the LED array. The diameter of the dome may be substantially larger (e.g., about 1.5 to 4 times larger) than the diameter of the array of LEDs 310 to prevent occurrences of total internal reflection.

The size and shape (e.g., curvature) of the dome 316 may also enhance color mixing when the emitter module 300 is mounted near other emitter modules (e.g., in a similar manner as the emitter modules 210 mounted to the emitter PCBs 200A, 200B, 200C, 200D, 200E of the lighting device 100). For example, the dome 316 may be a flat shallow dome as shown in FIG. 4B. A radius $r_{dome}$ of the dome 316 in the plane of the emitters 310 array may be, for example, approximately 20-30% larger than a radius $r_{curve}$ of the curvature of the dome 316. For example, the radius $r_{dome}$ of the dome 316 in the plane of the LEDs 310 may be approximately 4.8 mm and the radius $r_{curve}$ of the dome curvature (e.g., the maximum height of the dome 316 above the plane of the LEDs 310) may be approximately 3.75 mm. Alternatively, the dome 316 may have a hemispherical shape. In addition, one skilled in the art would understand that alternative radii and ratios may be used to achieve the same or similar color mixing results.

By configuring the dome 316 with a substantially flatter shape, the dome 316 allows a larger portion of the emitted light to emanate sideways from the emitter module 300 (e.g., in an X-Y plane as shown in FIGS. 5A and 5B). Stated another way, the shallow shape of the dome 316 allows a significant portion of the light emitted by the emitters 310 to exit the dome at small angles $\theta_{side}$ relative to the horizontal plane of the array of emitters 310. For example, the dome 316 may allow approximately 40% of the light emitted by the array of emitters 310 to exit the dome 316 at approximately 0 to 30 degrees relative to the horizontal plane of the array of emitters 310. When the emitter module 300 is mounted near other emitter modules (e.g., as in a linear light source such as the lighting device 100), the shallow shape of the dome 316 may improve color mixing in the lighting device by allowing a significant portion (e.g., 40%) of the light emitted from the sides of adjacent emitter modules to intermix before that light is reflected back out of the lighting device. Examples of emitter modules, such as the emitter module 200, are described in greater detail in U.S. Pat. No. 10,161,786, issued Dec. 25, 2018, entitled EMITTER MODULE FOR AN LED ILLUMINATION DEVICE, the entire disclosure of which is hereby incorporated by reference.

Figure 5:
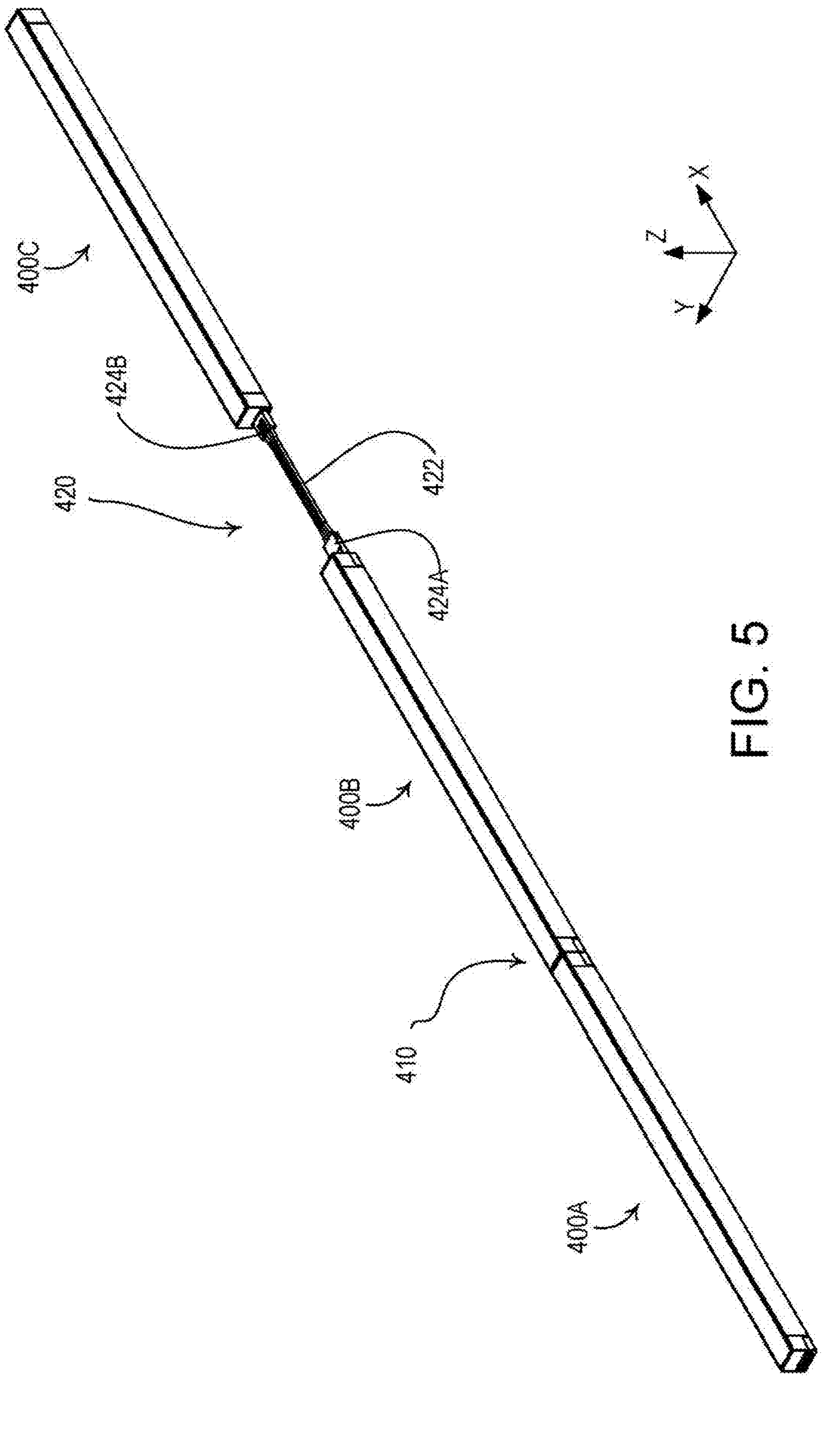
FIG. 5 is a perspective view showing example end-to end and wired connections of the lighting devices of FIG. 1.

FIG. 5 is a perspective view of a lighting fixture assembly 401 comprising a plurality of example lighting devices 400A, 400B, 400C (e.g., linear lighting fixtures) connected (e.g., serially-connected) together. The lighting devices 400A, 400B, 400C may be an example of the lighting device 100 shown in FIGS. 1, 2. The lighting devices 400A, 400B, 400C may be directly connected (e.g., via an end-to-end connection 410) or via a wired connection 420. For example, the lighting device 400A may be directly connected to the lighting device 400B using an end-to-end connection 410. The end-to-end connection 410 may include a male connector (e.g., such as the connector 132B shown in FIG. 1 and/or the connector 250B shown in FIGS. 3D, 3E) of the lighting device 400A engaging with (e.g., received within) a female connector (e.g., such as the connector 132A shown in FIGS. 1, 2 and/or the connector 250A shown in FIG. 3A). Although the end-to-end connection 410 is shown as a straight connection, it should be appreciated that the end-to-end connection 410 may also include an angled connection (e.g., such as a 90-degree connection). The lighting device 400B may be connected to the lighting device 400C using the wired connection 420. The wired connection 420 may include a cable 422 that is configured to engage (e.g., received by or within) with a connector (e.g., such as the connector 132B shown in FIG. 1 and/or the connector 250B shown in FIGS. 3D, 3E) of the lighting device 400B. The cable 422 may be configured to engage (e.g., received by or within) with a connector (e.g., such as the connector 132A shown in FIGS. 1, 2 and/or the connector 250A shown in FIG. 3A) of the lighting device 400C. For example, the cable 422 may define connectors 424A, 424B configured to mate with the connectors of the lighting device 400A, 400B. The length of the cable 422 may be configured based on the installation location of the lighting devices 400B, 400C.

Although FIG. 5 depicts three lighting devices 400A, 400B, 400C connected together using the end-to-end connection 410 and the wired connection 420, it should be appreciated that more or fewer than three lighting devices may be connected together using any combination of end-to-end connections 410 and/or wired connections 420.

Figure 6:
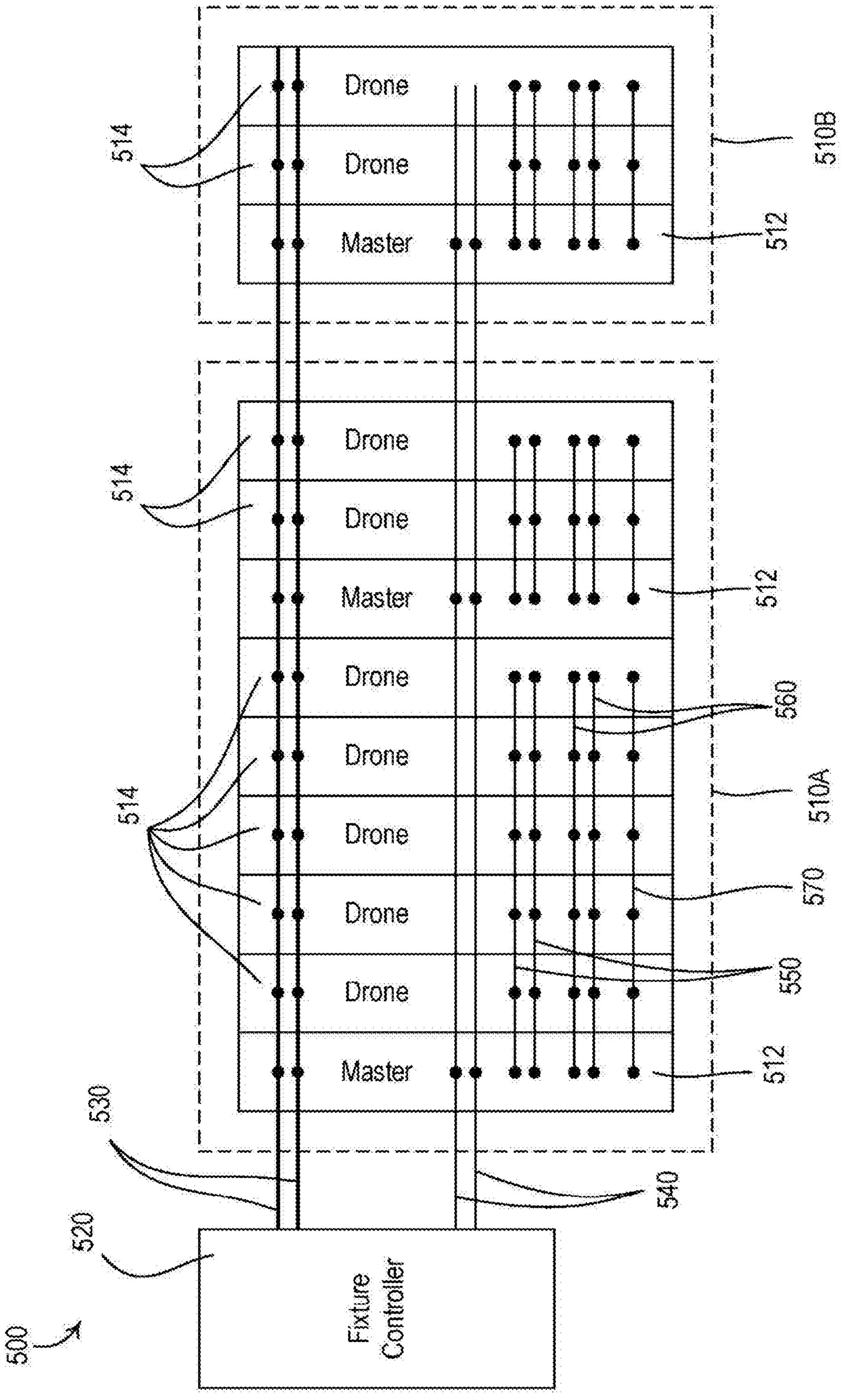
FIG. 6 is a simplified block diagram of a linear lighting assembly using the lighting device of FIG. 1.

FIG. 6 is a simplified block diagram of a lighting system 500. The lighting system 500 may include a fixture controller 520 (e.g., a controller and/or a lighting controller) and a lighting fixture assembly (e.g., such as the lighting fixture assembly 401 shown in FIG. 5) that includes a plurality of serially-connected lighting devices 510A, 510B (e.g., such as the lighting device 100 shown in FIGS. 1, 2 and/or the lighting devices 400A, 400B, 400C shown in FIG. 5), and wiring that is used to connect the fixture controller 520 and/or lighting devices 510A, 510B to one another (e.g., the cable 422). The fixture controller 520 may receive a line voltage input (e.g., an alternating-current (AC) mains line voltage from an AC power source) and may generate a bus voltage (e.g., a direct-current (DC) bus voltage) on a power bus 530 (e.g., power wiring) for powering the plurality of lighting devices 510A, 510B. Each of the lighting devices 510A, 510B may include one or more master lighting modules 512 (e.g., such as the master lighting module 200A shown in FIG. 3A) and one or more drone lighting modules 514 (e.g., such as the drone lighting modules 200B, 200C, 200D, 200E shown in FIGS. 3B-3E). Each of the master lighting modules 512 and the drone lighting modules 514 of the lighting devices 510A, 510B may be coupled to the power bus 530 for receiving the bus voltage. Although the master lighting module 512 is illustrated in closest proximity to the fixture controller 520, in some examples the lighting devices 510A may be connected to the fixture controller 520 (e.g., rotated or flipped) such that the drone lighting module 514 is located between the fixture controller 520 and the master lighting module 512.

The fixture controller 520 may comprise one or more communication circuits that are configured to communicate (e.g., transmit and/or receive) messages. The fixture controller 520 may be configured to communicate the messages on a wireless communication link, such as a radio-frequency (RF) communication link (e.g., via wireless signals) and/or via a wired communication link (e.g., a digital or analog communication link). The fixture controller 520 may be configured to receive messages including control data and/or commands for controlling the lighting devices 510A, 510B (e.g., for controlling the intensity level and/or color of the lighting devices 510A, 510B) from external devices for example, other control devices of a load control system, such as a remote control device and/or a system controller. In addition, the fixture controller 520 may be configured to transmit messages including control data and/or commands for controlling the lighting devices 510A, 510B (e.g., for controlling the intensity level and/or color of the lighting devices 510A, 510B) to the lighting devices 510A, 510B (e.g., the master lighting modules 512).

One fixture controller (e.g., such as the fixture controller 520) may be used to control and/or power a plurality of lighting devices (e.g., such as the lighting devices 510A, 510B) of the lighting system 500 that are connected together (e.g., serially-connected together). The fixture controller 520 may be configured to communicate messages with the plurality of linear lighting devices 510A, 510B. For example, the fixture controller 520 may transmit one or more messages to the master lighting modules 512 in each of the plurality of lighting devices 510A, 510B via a master communication bus 540 (e.g., a first wired digital communication link, such as an RS-485 communication link). In some examples, the master communication bus 540 may be connected to the master lighting modules 512 (e.g., all of the master lighting modules 512), but not the drone lighting modules 514. Each of the master lighting modules 512 may comprise a master communication circuit for transmitting and/or receiving messages on the master communication bus 540. In some examples, such as when the master communication bus 540 is an RS-485 communication link, the master communication circuit may be an RS-485 transceiver. The messages may include control data and/or commands for controlling the lighting devices 510A, 510B (e.g., intensity level, color control information, and/or the like, requests for information, e.g., such as address information, from the lighting devices 510A, 510B, etc).

The master lighting module 512 may be coupled to a plurality of the drone lighting modules 514 via one or more electrical connections, such as a drone communication bus 550 (e.g., an Inter-Integrated Circuit ($I^2C$) communication link), timing signal lines 560 (e.g., timing signal electrical conductors), and/or an interrupt request (IRQ) signal line 570 (e.g., an IRQ electrical conductor). The master lighting modules 512 may receive the messages from the fixture controller 520, and may relay the messages to the drone lighting modules 514 via the drone communication bus 550. For example, the master lighting modules 512 may convert the messages from the RS-485 communication protocol to the $I^2C$ communication protocol for transmission over the drone communication bus 550. In some examples, the master lighting module 512 may communication control messages including control data and/or command (e.g., intensity level and/or color control commands) over the drone communication bus 550.

The fixture controller 520 may be configured to control the intensity level and/or color (e.g., color temperature) of the light emitted by each of the master lighting modules 512 and the drone lighting modules 514. The fixture controller 520 may be configured to individually or collectively control the intensity levels and/or colors of each of the master lighting modules 512 and the drone lighting modules 514. For example, the fixture controller 520 may be configured to control the master lighting modules 512 and the drone lighting modules 514 of one of the lighting devices 510A, 510B to the same intensity level and/or the same color, or to different intensity levels and/or different colors. Further, in some examples, the fixture controller 520 may be configured to control the master lighting modules 512 and the drone lighting modules 514 of one of the lighting devices 510A, 510B to different intensity levels and/or colors in an organized manner to provide a visual effect, for example, to provide a gradient of intensity levels and/or colors along the length of one or more of the linear lighting devices 510A, 510B.

Each of the drone lighting modules 514 may be configured to use the IRQ signal line 570 to signal to the respective master lighting module 512 that service is needed and/or that the drone lighting module 512 has a message to transmit to the master lighting module 512. In some examples, the IRQ signal line 570 may be used to configure the drone lighting modules 514, for example, to determine the order and/or location of each drone lighting module 514 that is part of the lighting device.

As described in more detail herein, the master lighting modules 512 may receive messages from the fixture controller 520 via the master communication bus 540. In some examples, the fixture controller 520 may be configured to interrupt the transmission of the messages on the master communication bus 540 to generate a synchronization pulse (e.g., a synchronization frame). The fixture controller 520 may generate the synchronization pulse periodically on the master communication bus 540 during periods where other communication across the master communication bus 540 is not occurring. The master lighting modules 512 may be configured to generate a timing signal that is received by the drone lighting modules 514 on the timing signal lines 560. In some examples, the master lighting module 512 may receive the synchronization pulse from the fixture controller 520, and in response, generate the timing signal on the timing signal lines 560, where for example, the timing signal may be a sinusoidal waveform that is generated at a frequency that is determined based on a frequency of synchronization pulse received from the fixture controller 120. The master lighting module 512 and the drone lighting modules 514 may use the timing signal to coordinate a timing at which the master lighting module 512 and the drone lighting modules 514 can perform a measurement procedure (e.g., to reduce the likelihood that any module causes interference with the measurement procedure of another module). For example, the master lighting module 512 and the drone lighting modules 514 may use the timing signal to determine a time to measure optical feedback information of the lighting loads of its module to, for example, perform color and/or intensity level control refinement, when other master and drone lighting modules are not emitting light.

Figure 7:
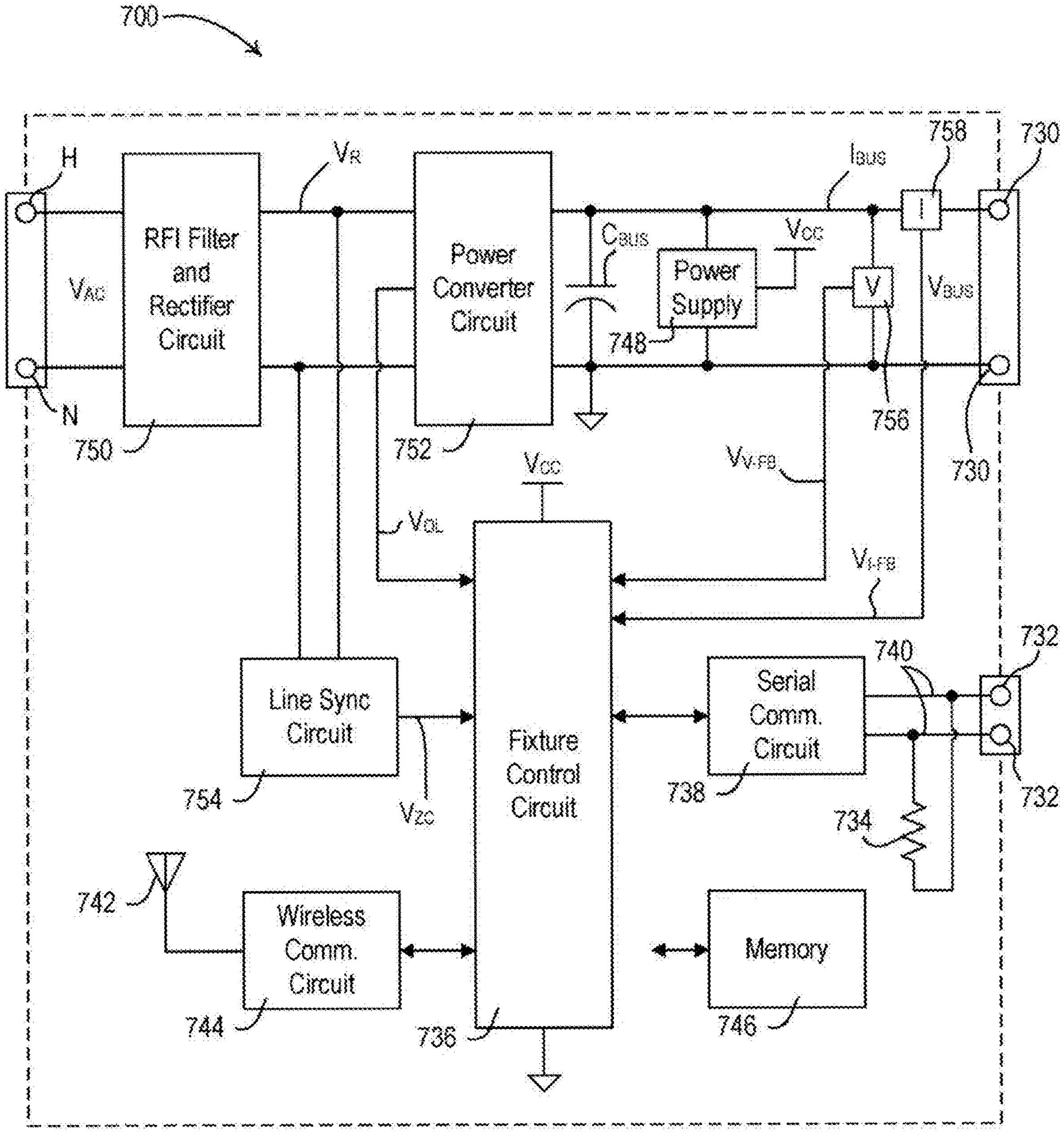
FIG. 7 is a simplified block diagram of an example fixture controller.

FIG. 7 is a simplified block diagram of an example fixture controller 700 (e.g., a lighting controller such as the fixture controller 520 shown in FIG. 6). The fixture controller 700 may comprise a radio frequency interference (RFI) filter and rectifier circuit 750, which may receive a source voltage, such as an AC mains line voltage $V_{AC}$, via a hot connection H and a neutral connection N. The radio frequency interference (RFI) filter and rectifier circuit 750 may be configured to generate a rectified voltage $V_R$ from the AC mains line voltage $V_{AC}$. The radio frequency interference (RFI) filter and rectifier circuit 750 may also be configured to minimize the noise provided on the AC mains (e.g., at the hot connection H and the neutral connection N).

The fixture controller 700 may also comprise a power converter circuit 752 that may receive the rectified voltage $V_R$ and generate a bus voltage $V_{BUS}$ (e.g., having a magnitude of approximately 15-20V) across a bus capacitor $C_{BUS}$. The fixture controller 700 may output the bus voltage $V_{BUS}$ via connectors 730 to a power bus (e.g., the power bus 530) between the fixture controller 700 and one or more lighting modules. The power converter circuit 752 may comprise, for example, a boost converter, a buck converter, a buck-boost converter, a flyback converter, a single-ended primary-inductance converter (SEPIC), a Cuk converter, and/or any other suitable power converter circuit for generating an appropriate bus voltage. In some examples, the power converter circuit 752 may comprise a controller (e.g., processor) that is internal to the power converter circuit 752 that is configured to control the operation of the power converter circuit 752. The fixture controller 700 may comprise a power supply 748 that may receive the bus voltage $V_{BUS}$ and generate a supply voltage $V_{CC}$ which may be used to power one or more circuits (e.g., low voltage circuits) of the fixture controller 700.

The fixture controller 700 may comprise a fixture control circuit 736. The fixture control circuit 736 may comprise, for example, a microprocessor, a microcontroller, a programmable logic device (PLD), an application specific integrated circuit (ASIC), a field-programmable gate array (FPGA), or any other suitable processing device or controller. The fixture control circuit 736 may be powered by the power supply 748 (e.g., the supply voltage $V_{CC}$). The fixture controller 700 may comprise a memory 746 configured to store information (e.g., one or more operational characteristics of the fixture controller 700) associated with the fixture controller 700. For example, the memory 746 may be implemented as an external integrated circuit (IC) or as an internal circuit of the fixture control circuit 736.

The fixture controller 700 may include a serial communication circuit 738, which may be configured to communicate on a serial communication bus 740 via connectors 732. For example, the serial communication bus 740 may be an example of the master communication bus 540 (e.g., a wired digital communication link, such as an RS-485 communication link). The serial communication bus 740 may comprise a termination resistor 734, which may be coupled across the lines of the serial communication bus 740. For example, the resistance of the termination resistor 734 may match the differential-mode characteristic impedance of the master communication bus 740 to minimize reflections on the master communication bus 740.

The fixture control circuit 736 may control the serial communication circuit 738 to transmit messages to one or more master lighting modules (e.g., the master lighting modules 200A, the master lighting modules 512, and/or the master lighting module 800) via the serial communication bus 740, for example, to control one or more characteristics of the master lighting modules. For example, the fixture control circuit 736 may transmit control signals to the master lighting modules for controlling the intensity level (e.g., brightness) and/or the color (e.g., color temperature) of light emitted by the master lighting module(s) (e.g., light sources of the master lighting module). Further, the fixture control circuit 736 may be configured to control the operation of drone modules (e.g., middle and/or end drone modules, such as the drone lighting modules 200B, 200C, 200D, 200E, and/or 514) indirectly by communicating messages to the master lighting modules via the serial communication circuit 738 and the serial communication bus 740. For example, the fixture control circuit 736 may control the intensity level and/or the color of light emitted by the drone lighting modules.

The fixture control circuit 736 may receive an input from a line sync circuit 754. The line sync circuit 754 may receive the rectified voltage $V_R$. Alternatively or additionally, the line sync circuit 754 may receive the AC mains line voltage $V_{AC}$ directly from the hot connection H and the neutral connection N. For example, the line sync circuit 754 may comprise a zero-cross detect circuit that may be configured to generate a zero-cross signal $V_{ZC}$ that may indicate the zero-crossings of the AC mains line voltage $V_{AC}$. The fixture control circuit 736 may use the zero-cross signal $V_{ZC}$ from the line sync circuit 754, for example, to generate a synchronization pulse on the master communication bus 740 (e.g., the master communication bus 540), for instance, to synchronize the fixture controller 700 and/or devices controlled by the fixture controller 700 in accordance with the frequency of the AC mains line voltage $V_{AC}$ (e.g., utilizing the timing of the zero crossings of the AC mains line voltage $V_{AC}$).

The fixture control circuit 736 may be configured to generate a synchronization pulse (e.g., a synchronization frame) on the serial communication bus 740. The fixture control circuit 736 may use the zero-cross signal $V_{ZC}$ from the line sync circuit 754, for example, to generate the synchronization pulse on the serial communication bus 740 in accordance with the frequency of the AC mains line voltage $V_{AC}$ (e.g., utilizing the timing of a zero crossing of the AC mains line voltage $V_{AC}$). The synchronization pulse may include either a digital or analog signal. In some examples, the synchronization pulse is a synchronization frame that is generated on the serial communication bus 740. In such examples, the fixture control circuit 736 may be configured to halt transmitting messages on the serial communication bus 740 when generating the synchronization pulse on the serial communication bus 740. As such, the synchronization pulse may be used by the master lighting modules to generate a timing signal that may be used by the master lighting module and the drone lighting modules to coordinate the timing at which the master lighting module and the drone lighting modules can perform a measurement procedure. For example, the synchronization pulse may be generated during a frame sync period that may occur on a periodic basis and during which the synchronization pulse may be generated. Further, as described in more detail herein, the synchronization pulse may be received by the master lighting module(s) connected to the serial communication bus 740, and the master lighting modules may be configured to generate a timing signal that may be received by the drone lighting modules 514 via a separate electrical connection (e.g., the timing signal lines 560).

The fixture control circuit 736 may be configured to receive messages (e.g., one or more signals) from the master lighting modules via the serial communication bus 740. For example, the master lighting modules may transmit feedback information regarding the state of the master lighting modules and/or the drone lighting modules via the serial communication bus 740. The serial communication circuit 738 may receive messages from the master lighting modules, for example, in response to a query transmitted by the fixture control circuit 736.

Further, in some examples, the fixture control circuit 736 may be configured to receive an overload signal VOL from the power converter circuit 752, where the overload signal VOL may indicate that the power converter circuit 752 is experiencing an overload condition. As described in more detail herein, an overload condition may arise when there is too much load connected to the fixture controller 700, such as when there are too many lighting modules connected to the fixture control 700 (e.g., the total length of lighting modules connected to the fixture controller 700 exceeds a maximum allowable length for the lighting assembly (e.g., 50 feet)). Also, in some examples, the power converter circuit 752 may be configured to shut down in response to an overload condition. For instance, the power converter circuit 752 may be configured to render a controllable switching device(s) of the power converter to be non-conductive) in response to the overload condition (e.g., in response to detecting too much load connected to the fixture controller 700). Further, in some instances, if the power converter circuit detects too much load (e.g., more than the maximum number of lighting modules), the power converter circuit may shut down, which may bring the magnitude of the bus voltage $V_{BUS}$ to below the threshold voltage, and then turn back on, which may cause the magnitude of the bus voltage $V_{BUS}$ to swing.

The fixture controller 700 may comprise a wireless communication circuit 744. The fixture control circuit 736 may be configured to transmit and/or receive messages via the wireless communication circuit 744. The wireless communication circuit 744 may comprise a radio-frequency (RF) transceiver coupled to an antenna 742 for transmitting and/or receiving RF signals. The wireless communication circuit 744 may be an RF transmitter for transmitting RF signals, an RF receiver for receiving RF signals, or an infrared (IR) transmitter and/or receiver for transmitting and/or receiving IR signals. The wireless communication circuit 744 may be configured to transmit and/or receive messages (e.g., via the antenna 742). For example, the wireless communication circuit 744 may transmit messages in response to a signal received from the fixture control circuit 736. The fixture control circuit 736 may be configured to transmit and/or receive, for example, feedback information regarding the status of one or more lighting devices such as the lighting devices 100, 400A, 400B, 400C, 510A, 510B and/or messages including control data and/or commands for controlling one or more lighting devices.

The fixture controller 700 may comprise a voltage feedback circuit 756. The voltage feedback circuit 756 may be coupled across the power bus (e.g., the portion of the power bus 530 that resides within the fixture controller 700) between the output of the power converter circuit 752 and the connectors 730. The voltage feedback circuit 756 may generate a voltage feedback signal $V_{V\text{-}FB}$ that indicate the magnitude of the voltage of the bus voltage $V_{BUS}$, and may provide the voltage feedback signal $V_{V\text{-}FB}$ to the fixture control circuit 736. As such, the fixture control circuit 736 may be configured to determine the magnitude of the bus voltage $V_{BUS}$ based on the voltage feedback signal $V_{V\text{-}FB}$. Further, as described in more detail herein, in some examples the fixture control circuit 736 may be configured to detect an overload condition based on the magnitude of the bus voltage $V_{BUS}$ dropping below a threshold voltage (e.g., 15 V) (e.g., and in some instance rises above another threshold voltage, such as 19 V, multiple times). In response to detecting an overload condition, the fixture control circuit 736 may be configured to cause one or more of the lighting modules of the lighting assembly connected to the power bus to reduce their maximum power (e.g., the power delivered to and/or the luminous flux of the light emitted by each of the emitters of the emitter module of each of the one or more lighting modules).

The fixture controller 700 may comprise a current feedback circuit 758. The current feedback circuit 758 may be coupled in series on the power bus (e.g., the portion of the power bus 530 that resides within the fixture controller 700) between the output of the power converter circuit 752 and the connectors 730. The current feedback circuit 758 may generate a current feedback signal $V_{I\text{-}FB}$ that indicate the magnitude of a current of a bus current $I_{BUS}$, and may provide the current feedback signal $V_{I\text{-}FB}$ to the fixture control circuit 736. As such, the fixture control circuit 736 may be configured to determine the magnitude of the bus current $I_{BUS}$ based on the current feedback signal $V_{I\text{-}FB}$.

Figure 8:
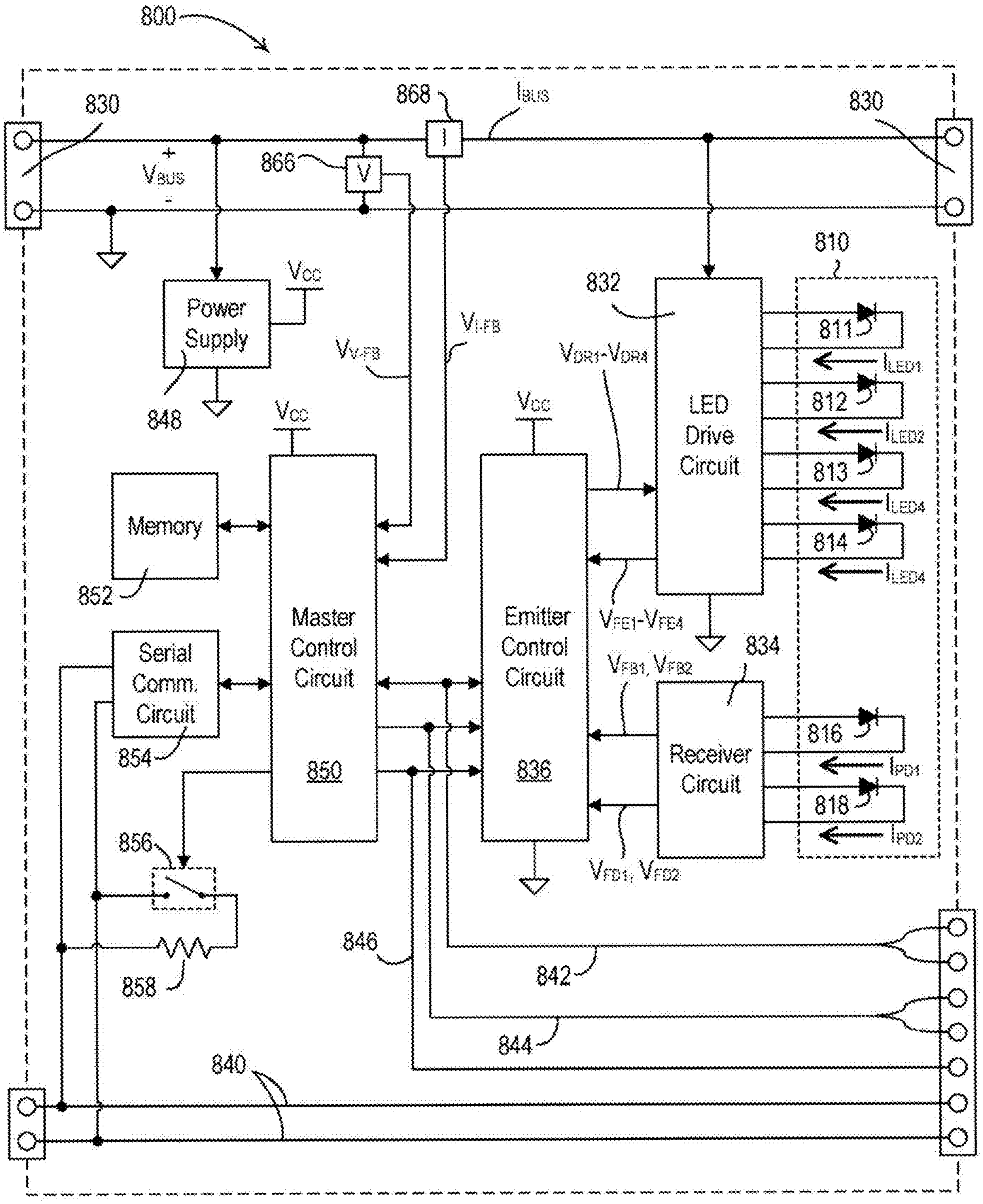
FIG. 8 is a simplified block diagram of an example master emitter module.

FIG. 8 is a simplified block diagram of an example master lighting module 800 (e.g., a starter module such as the master modules 150A, 200A, and/or 512) of a lighting device (e.g., such as the lighting device 100 shown in FIGS. 1, 2 the lighting devices 400A, 400B, 400C shown in FIG. 5, and/or the lighting devices 510A, 510B shown in FIG. 6) of a lighting system (e.g., the lighting system 500 shown in FIG. 6). Each lighting device of the lighting system may include a master lighting module 800 and one or more drone lighting modules (e.g., the drone modules 150B, 150C, 200B-200E, 514). The master lighting module 800 may be the first module of the lighting device. That is, when reviewing the physical order of the master and drone lighting modules of a lighting device, the master lighting module 800 may be the first lighting module to receive the bus voltage. Alternatively, in other examples, one or more drone lighting modules may be the first module of the lighting device (e.g., the drone lighting modules may receive the bus voltage prior to the master lighting module 800).

The master lighting module 800 may comprise one or more emitter modules 810 (e.g., the emitter modules 154, 210, and/or 300), where each emitter module 810 may include one or more strings of emitters 811, 812, 813, 814. Although each of the emitters 811, 812, 813, 814 is shown in FIG. 8 as a single LED, each of the emitters 811, 812, 813, 814 may comprise a plurality of LEDs connected in series (e.g., a chain of LEDs), a plurality of LEDs connected in parallel, or a suitable combination thereof, depending on the particular lighting system. In addition, each of the emitters 811, 812, 813, 814 may comprise one or more organic light-emitting diodes (OLEDs). For example, the first emitter 811 may represent a chain of red LEDs, the second emitter 812 may represent a chain of blue LEDs, the third emitter 813 may represent a chain of green LEDs, and the fourth emitter 814 may represent a chain of white or amber LEDs.

The master lighting module 800 may control the emitters 811, 812, 813, 814 to adjust an intensity level (e.g., a luminous flux or a brightness) and/or a color (e.g., a color temperature) of a cumulative light output of the master lighting module 800. The emitter module 810 may also comprise one or more detectors 816, 818 (e.g., the detectors 312) that may generate respective detector signals (e.g., photodiode currents $I_{PD1}$, $I_{PD2}$) in response to incident light. In examples, the detectors 816, 818 may be photodiodes. For example, the first detector 816 may represent a single red, orange or yellow LED, or multiple red, orange or yellow LEDs in parallel, and the second detector 818 may represent a single green LED or multiple green LEDs in parallel.

The master lighting module 800 may comprise a power supply 848 that may receive a source voltage, such as a bus voltage (e.g., the bus voltage $V_{BUS}$ on the power bus 530), via a first connector 830. The power supply 848 may generate an internal DC supply voltage $V_{CC}$ which may be used to power one or more circuits (e.g., low voltage circuits) of the master lighting module 800.

The master lighting module 800 may comprise an LED drive circuit 832. The LED drive circuit 832 may be configured to control (e.g., individually control) the power delivered to and/or the luminous flux of the light emitted by each of the emitters 811, 812, 813, 814 of the emitter module 810. The LED drive circuit 832 may receive the bus voltage $V_{BUS}$ and may adjust magnitudes of respective LED drive currents $I_{LED1}$, $I_{LED2}$, $I_{LED3}$, $I_{LED4}$ conducted through the emitters 811, 812, 813, 814. The LED drive circuit 832 may comprise one or more regulation circuits (e.g., four regulation circuits), such as switching regulators (e.g., buck converters) for controlling the magnitudes of the respective LED drive currents $I_{LED1}$-$I_{LED4}$. An example of the LED drive circuit 832 is described in greater detail in U.S. Pat. No. 9,485,813, issued Nov. 1, 2016, entitled ILLUMINATION DEVICE AND METHOD FOR AVOIDING AN OVER-POWER OR OVER-CURRENT CONDITION IN A POWER CONVERTER, the entire disclosure of which is hereby incorporated by reference.

The master lighting module 800 may comprise a receiver circuit 834 that may be electrically coupled to the detectors 816, 818 of the emitter module 810 for generating respective optical feedback signals $V_{FB1}$, $V_{FB2}$ in response to the photodiode currents $I_{PD1}$, $I_{PD2}$. The receiver circuit 834 may comprise one or more trans-impedance amplifiers (e.g., two trans impedance amplifiers) for converting the respective photodiode currents $I_{PD1}$, $I_{PD2}$ into the optical feedback signals $V_{FB1}$, $V_{FB2}$. For example, the optical feedback signals $V_{FB1}$, $V_{FB2}$ may have DC magnitudes that indicate the magnitudes of the respective photodiode currents $I_{PD1}$, $I_{PD2}$.

The master lighting module 800 may comprise an emitter control circuit 836 for controlling the LED drive circuit 832 to control the intensities and/or colors of the emitters 811, 812, 813, 814 of the emitter module 810. The emitter control circuit 836 may comprise, for example, a microprocessor, a microcontroller, a programmable logic device (PLD), an application specific integrated circuit (ASIC), a field-programmable gate array (FPGA), or any other suitable processing device or controller. The emitter control circuit 836 may be powered by the power supply 848 (e.g., receiving the voltage $V_{CC}$). The emitter control circuit 836 may generate one or more drive signals $V_{DR1}$, $V_{DR2}$, $V_{DR3}$, $V_{DR4}$ for controlling the respective regulation circuits in the LED drive circuit 832. The emitter control circuit 836 may receive the optical feedback signals $V_{FB1}$, $V_{FB2}$ from the receiver circuit 834 for determining the luminous flux $L_E$ of the light emitted by the emitters 811, 812, 813, 814.

The emitter control circuit 836 may receive a plurality of emitter forward voltage feedback signals $V_{FE1}$, $V_{FE2}$, $V_{FE3}$, $V_{FE4}$ from the LED drive circuit 832 and a plurality of detector forward voltage feedback signals $V_{FD1}$, $V_{FD2}$ from the receiver circuit 834. The emitter forward voltage feedback signals $V_{FE1}$-$V_{FE4}$ may be representative of the magnitudes of the forward voltages of the respective emitters 811, 812, 813, 814, which may indicate temperatures $T_{E1}$, $T_{E2}$, $T_{E3}$, $T_{E4}$ of the respective emitters. If each emitter 811, 812, 813, 814 comprises multiple LEDs electrically coupled in series, the emitter forward voltage feedback signals $V_{FE1}$-$V_{FE4}$ may be representative of the magnitude of the forward voltage across a single one of the LEDs or the cumulative forward voltage developed across multiple LEDs in the chain (e.g., all of the series-coupled LEDs in the chain). The detector forward voltage feedback signals $V_{FD1}$, $V_{FD2}$ may be representative of the magnitudes of the forward voltages of the respective detectors 816, 818, which may indicate temperatures $T_{D1}$, $T_{D2}$ of the respective detectors. For example, the detector forward voltage feedback signals $V_{FD1}$, $V_{FD2}$ may be equal to the forward voltages $V_{FD}$ of the respective detectors 816, 818.

The master lighting module 800 may comprise a master control circuit 850. The master control circuit 850 may comprise, for example, a microprocessor, a microcontroller, a programmable logic device (PLD), an application specific integrated circuit (ASIC), a field-programmable gate array (FPGA), or any other suitable processing device or controller. The master control circuit 850 may be electrically coupled to a fixture controller (e.g., the fixture controllers 520, 700) via a communication bus 840 (e.g., a master communication bus, such as an RS-485 communication link). The master control circuit 850 may be electrically coupled to the drone lighting modules via one or more electrical connections, such as a communication bus 842 (e.g., a drone communication bus, such as an $I^2C$ communication link), a timing signal lines 844, and/or an IRQ signal line 846. The master control circuit 850 may be powered by the power supply 848 (e.g., receiving the voltage $V_{CC}$).

The master lighting module 800 may comprise a serial communication circuit 854 that couples the master control circuit 850 to the communication bus 840. The serial communication circuit 854 may be configured to communicate with the fixture controller on the communication bus 840. For example, the communication bus 840 may be an example of the communication bus 540 and/or the communication bus 740. The master lighting module 800 may comprise a termination resistor 858 coupled in series with a controllable switching circuit 856 between the lines of the communication bus 840. For example, the resistance of the termination resistor 858 may match the differential-mode characteristic impedance of the master communication bus 840 to minimize reflections on the communication bus 840. The master control circuit 850 may be configured to control the controllable switching circuit 856 to control when the termination resistor 858 is coupled between the liens of the communication but 840. The master control circuit 850 be configured to determine the target intensity level $L_{TRGT}$ for the master lighting module 800 and/or one or more drone lighting modules in response to messages received via the serial communication circuit 854 (e.g., via the communication bus 840 from the fixture controller). For example, the master control circuit 850 may be configured to control the emitter control circuit 836 to control the intensity level (e.g., brightness or luminous flux) and/or the color (e.g., color temperature) of the cumulative light emitted by the emitter module 810 of the master lighting module 800, for example, in response to messages received via the communication bus 840. That is, the master control circuit 850 may be configured to control the emitter control circuit 836, for example, to control the LED drive circuit 832 and the emitter module 810.

The master control circuit 850 may be configured to communicate with the one or more drone lighting modules via the communication bus 842 (e.g., using the $I^2C$ communication protocol). The communication bus 842 may be, for example, the drone communication bus 550. For example, the master control circuit 850 may be configured to transmit messages including control data and/or commands to the drone lighting modules via the communication bus 842 to control the emitter modules of one or more drone lighting modules to control the intensity level (e.g., brightness or luminous flux) and/or the color (e.g., color temperature) of the cumulative light emitted by the emitter modules of the drone lighting modules, for example, in response to messages received via the communication bus 840.

The master control circuit 850 may be configured to adjust a present intensity level $L_{PRES}$ (e.g., a present brightness) of the cumulative light emitted by the master lighting module 800 and/or drone lighting modules towards a target intensity level $L_{TRGT}$ (e.g., a target brightness). The target intensity level $L_{TRGT}$ may be in a range across a dimming range, e.g., between a low-end intensity level $L_{LE}$ (e.g., a minimum intensity level, such as approximately 0.1%-1.0%) and a high-end intensity level $L_{HE}$ (e.g., a maximum intensity level, such as approximately 100%). The master lighting module 800 (e.g., and/or the drone lighting modules) may be configured to adjust a present color temperature $T_{PRES}$ of the cumulative light emitted by the master lighting module 800 (e.g., and/or the drone lighting modules) towards a target color temperature $T_{TRGT}$. In some examples, the target color temperature $T_{TRGT}$ may be in a range between a cool-white color temperature (e.g., approximately 3100-4500 K) and a warm-white color temperature (e.g., approximately 2000-3000 K).

In examples, the master control circuit 850 may receive a synchronization pulse on the communication bus 840 (e.g., from the fixture controller 700). The synchronization pulse may include either a digital or analog signal. In some examples, the synchronization pulse is a sync frame that is generated on the communication bus 840. In such examples, the master control circuit 850 may be configured to not transmit messages with the fixture controller on the communication bus 840 during a frame sync period when the synchronization pulse may be received. As such, the synchronization pulse may be used by the master control circuit 850 to generate a timing signal that may be used by the master lighting module and the drone lighting modules to coordinate the timing at which the master lighting module 800 and the drone lighting modules can perform a measurement procedure. For example, the synchronization pulse may be generated during a frame sync period that may occur on a periodic basis and during which the synchronization pulse may be generated.

The master control circuit 850 may be configured to generate a timing signal, for example, on the timing signal lines 844 (e.g., the timing signal lines 560). The master control circuit 850 may be configured to generate the timing signal in response to the synchronization pulse. In some examples, the timing signal may be a sinusoidal waveform that is generated at a frequency that is determined based on the frequency of synchronization pulse received from the fixture controller. The emitter control circuit 836 of the master lighting module 800 and emitter module control circuits of the drone lighting modules (e.g., the drone lighting modules connected to the communication bus 844) may receive the timing signal generated by the master control circuit 850. As noted herein, the master lighting module 800 and the drone lighting modules may use the timing signal to coordinate a timing at which the master lighting module 800 and the drone lighting modules 514 can perform the measurement procedure (e.g., to reduce the likelihood that any module causes interference with the measurement procedure of another module). For example, the master lighting module 800 and the drone lighting modules may use the timing signal to determine a time to measure optical feedback information of the lighting loads of its module to, for example, perform color and/or intensity level control refinement, when other master and drone lighting modules are not emitting light.

The master control circuit 850 may also be configured to receive an indication from the emitter control circuit 836 and/or an emitter control circuit of one of the drone lighting modules requires service and/or has a message to transmit to the master lighting module 800 via the IRQ signal line 846 (e.g., such as the IRQ signal line 570 shown in FIG. 6). In examples, an emitter control circuit may signal to the master control circuit 850 via the IRQ signal line 846 that the emitter control circuit needs to be serviced. In addition, an emitter control circuit may signal to the master control circuit 850 via the IRQ signal line 846 that the emitter control circuit has a message to transmit to the master control circuit 850. Further, the master control circuit 850 may be configured to determine the order and/or location of each drone lighting module using the IRQ signal line 846.

The master lighting module 800 may comprise a memory 852 configured to store information (e.g., one or more operational characteristics of the master lighting module 800 such as the target intensity level $L_{TRGT}$, the target color temperature $T_{TRGT}$, the low-end intensity level $L_{LE}$, the high-end intensity level $L_{HE}$, and/or the like). The memory 852 may be implemented as an external integrated circuit (IC) or as an internal circuit of the master control circuit 850.

When the master lighting module 800 is powered on, the master control circuit 850 may be configured to control the master lighting module 800 (e.g., the emitters of the master lighting module 800) to emit light substantially all of the time. The emitter control circuit 836 may be configured to disrupt the normal emission of light to execute the measurement procedure during periodic measurement intervals. During the periodic measurement intervals, the emitter control circuit 836 may measure one or more operational characteristics of the master lighting module 800. The measurement intervals may occur based on the timing signal on the synchronization lines 844 (e.g., which may be based on zero-crossing events of the AC mains line voltage $V_{AC}$). The emitter control circuit 836 may be configured to receive the timing signal and determine the specific timing of the periodic measurement intervals (e.g., a frequency of a periodic measurement intervals) based on (e.g., in response to) the timing signal. For example, during the measurement intervals, the emitter control circuit 836 may be configured to individually turn on each of the different-colored emitters 811, 812, 813, 814 of the master lighting module 800 (e.g., while turning off the other emitters) and measure the luminous flux of the light emitted by that emitter using one of the two detectors 816, 818. For example, the emitter control circuit 836 may turn on the first emitter 811 of the emitter module 810 (e.g., at the same time as turning off the other emitters 812, 813, 814) and determine the luminous flux $L_E$ of the light emitted by the first emitter 811 in response to the first optical feedback signal $V_{FB1}$ generated from the first detector 816. In addition, the emitter control circuit 836 may be configured to drive the emitters 811, 812, 813, 814 and the detectors 816, 818 to generate the emitter forward voltage feedback signals $V_{FE1}$-$V_{FE4}$ and the detector forward voltage feedback signals $V_{FD1}$, $V_{FD2}$ during the measurement intervals.

Methods of measuring the operational characteristics of emitter modules in a lighting device are described in greater detail in U.S. Pat. No. 9,332,598, issued May 3, 2016, entitled INTERFERENCE-RESISTANT COMPENSATION FOR ILLUMINATION DEVICES HAVING MULTIPLE EMITTER MODULES; U.S. Pat. No. 9,392,660, issued Jul. 12, 2016, entitled LED ILLUMINATION DEVICE AND CALIBRATION METHOD FOR ACCURATELY CHARACTERIZING THE EMISSION LEDS AND PHOTODETECTOR(S) INCLUDED WITHIN THE LED ILLUMINATION DEVICE; and U.S. Pat. No. 9,392,663, issued Jul. 12, 2016, entitled ILLUMINATION DEVICE AND METHOD FOR CONTROLLING AN ILLUMINATION DEVICE OVER CHANGES IN DRIVE CURRENT AND TEMPERATURE, the entire disclosures of which are hereby incorporated by reference.

Calibration values for the various operational characteristics of the master lighting module 800 may be stored in the memory 852 as part of a calibration procedure performed during manufacturing of the master lighting module 800. Calibration values may be stored for each of the emitters 811, 812, 813, 814 and/or the detectors 816, 818 of the emitter module 800. For example, calibration values may be stored for measured values of luminous flux (e.g., in lumens), x-chromaticity, y-chromaticity, emitter forward voltage, photodiode current, and/or detector forward voltage. For example, the luminous flux, x-chromaticity, and/or y-chromaticity measurements may be obtained from the emitters 811, 812, 813, 814 using an external calibration tool, such as a spectrophotometer. In examples, the master lighting module 800 may measure the values for the emitter forward voltages, photodiode currents, and/or detector forward voltages internally. An external calibration tool and/or the master lighting module 800 may measure the calibration values for each of the emitters 811, 812, 813, 814 and/or the detectors 816, 818 at a plurality of different drive currents, and/or at a plurality of different operating temperatures.

After installation, the master lighting module 800 of the lighting device may use the calibration values stored in the memory 852 to maintain a constant light output from the master lighting module 800. The master control circuit 850 may determine target values for the luminous flux to be emitted from the emitters 811, 812, 813, 814 to achieve the target intensity level $L_{TRGT}$ and/or the target color temperature $T_{TRGT}$ for the master lighting module 800. The emitter control circuit 836 may determine the magnitudes for the respective drive currents $I_{LED1}$-$I_{LED4}$ for the emitters 811, 812, 813, 814 based on the determined target values for the luminous flux to be emitted from the emitters 811, 812, 813, 814. When the age of the master lighting module 800 is zero, the magnitudes of the respective drive currents $I_{LED1}$-$I_{LED4}$ for the emitters 811, 812, 813, 814 may be controlled to initial magnitudes $I_{LED\text{-}INITIAL}$.

The light output (e.g., a maximum light output and/or the light output at a specific current or frequency) of the master lighting module 800 may decrease as the emitters 811, 812, 813, 814 age. The emitter control circuit 836 may be configured to increase the magnitudes of the drive current IDR for the emitters 811, 812, 813, 814 to adjusted magnitudes $I_{LED\text{-}ADJUSTED}$ to achieve the determined target values for the luminous flux of the target intensity level $L_{TRGT}$ and/or the target color temperature $T_{TRGT}$. Methods of adjusting the drive currents of emitters to achieve a constant light output as the emitters age are described in greater detail in U.S. Pat. No. 9,769,899, issued Sep. 19, 2017, entitled ILLUMINATION DEVICE AND AGE COMPENSATION METHOD, the entire disclosure of which is hereby incorporated by reference.

Further, in some examples, the master lighting module 800 may comprise a voltage feedback circuit 866. The voltage feedback circuit 866 may be coupled across the power bus (e.g., the portion of the power bus 530 that resides within master lighting module 800) between the connectors 830. The voltage feedback circuit 866 may generate a voltage feedback signal $V_{V\text{-}FB}$ that indicate the magnitude of the voltage of the bus voltage $V_{BUS}$, and may provide the voltage feedback signal $V_{V\text{-}FB}$ to the master control circuit 850. As such, the master control circuit 850 may be configured to determine the magnitude of the bus voltage $V_{BUS}$ based on the voltage feedback signal $V_{V\text{-}FB}$. As noted in more detail below, in some examples, if the master control circuit 850 detects that the magnitude of the bus voltage $V_{BUS}$ falls below a threshold voltage (e.g., 15 V), the master control circuit 850 may be configured to cause the emitters of the master lighting module 800 to turn off (e.g., control the power delivered to and/or the luminous flux of the light emitted by each of the emitters 811, 812, 813, 814 of the emitter module 810 to zero). The master control circuit 850 may turn off the emitters when the magnitude of the bus voltage $V_{BUS}$ falls below the threshold voltage to, for example, ensure that the control circuits and communication circuitry (e.g., the master control circuit 850, the emitter control circuit 836, and/or the serial communication circuit 854) of the master lighting module 800 remains powered. Further, although described in reference to the master control circuit 850, in some examples the emitter control circuit 836 may receive the voltage feedback signal $V_{V\text{-}FB}$ and control the emitters accordingly.

The master lighting module 800 may comprise a current feedback circuit 868. The current feedback circuit 868 may be coupled in series on the power bus (e.g., the portion of the power bus 530 that resides within the master lighting module 800) between the connectors 830. The current feedback circuit 868 may generate a current feedback signal $V_{I\text{-}FB}$ that indicate the magnitude of a current of a bus current $I_{BUS}$, and may provide the current feedback signal $V_{I\text{-}FB}$ to the master control circuit 850. As such, the master control circuit 850 may be configured to determine the magnitude of the bus current $I_{BUS}$ based on the current feedback signal $V_{I\text{-}FB}$. Further, although described in reference to the master control circuit 850, in some examples the emitter control circuit 836 may receive the current feedback signal $V_{I\text{-}FB}$.

Figure 9:
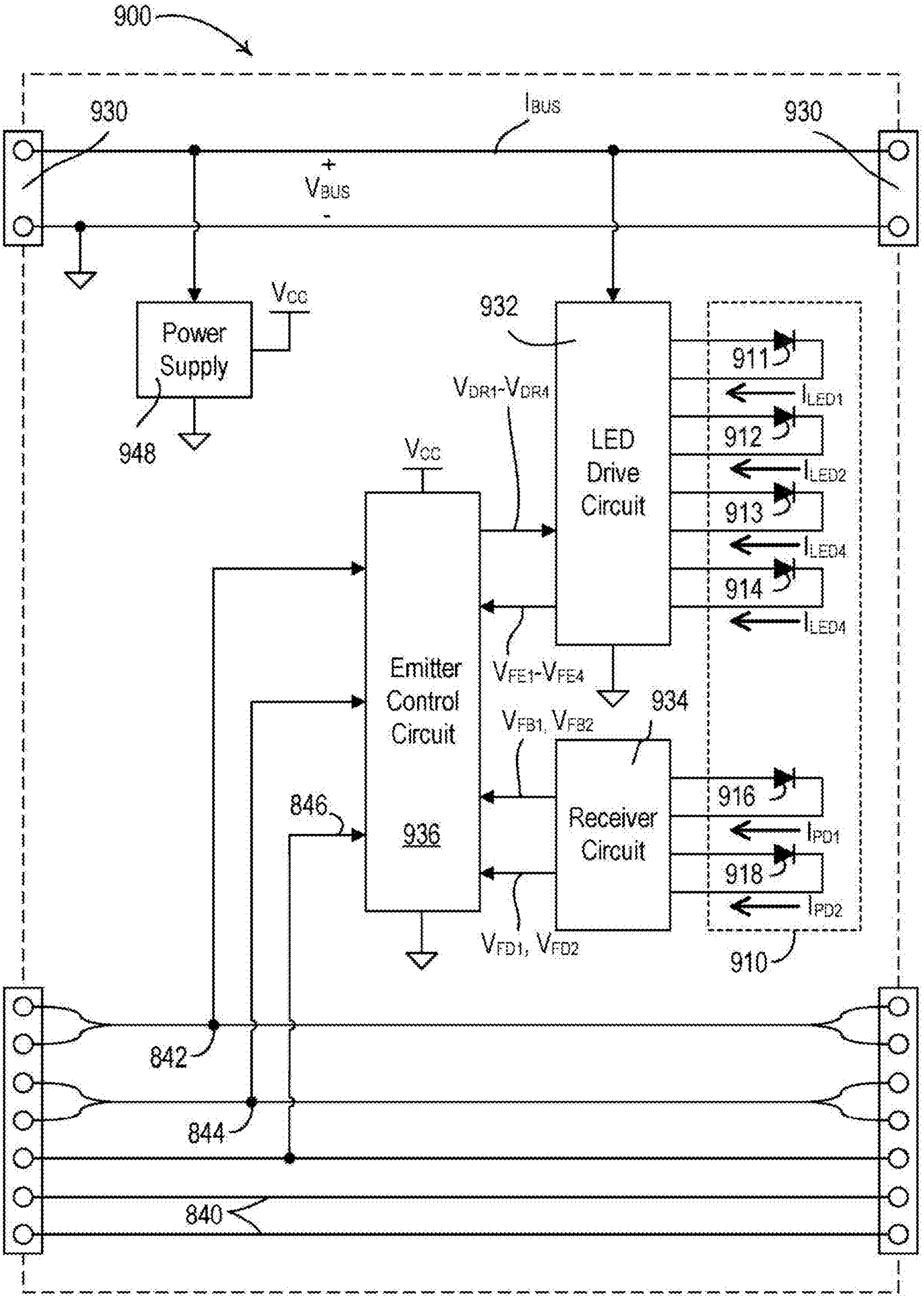
FIG. 9 is a simplified block diagram of an example middle emitter module.

FIG. 9 is a simplified block diagram of an example drone lighting module 900 (e.g., a middle drone lighting module such as middle drone lighting modules 150B, 200B, and/or 200C shown in FIGS. 2, 3B, and 3C) of a lighting device (e.g., such as the lighting device 100 shown in FIGS. 1, 2 the lighting devices 400A, 400B, 400C shown in FIG. 5, and/or the lighting devices 510A, 510B shown in FIG. 6) of a lighting system (e.g., the lighting system 500 shown in FIG. 6). The middle drone lighting module 900 may be a middle module of the lighting device. The middle drone lighting module 900 may include any drone lighting module that resides between the master lighting module (e.g., the master module 150A, 200A, 512, and/or the master lighting module 800) and another drone lighting module of the lighting device.

The middle drone lighting module 900 may comprise one or more emitter modules 910 (e.g., such as the emitter modules 154, 210, and/or 300). For example, the middle drone lighting module 900 may comprise an emitter module 910 that may include one or more strings of emitters 911, 912, 913, 914. Each of the emitters 911, 912, 913, 914 is shown in FIG. 9 as a single LED, but may each comprise a plurality of LEDs connected in series (e.g., a chain of LEDs), a plurality of LEDs connected in parallel, or a suitable combination thereof, depending on the particular lighting system. In addition, each of the emitters 911, 912, 913, 914 may comprise one or more organic light-emitting diodes (OLEDs). For example, the first emitter 911 may represent a chain of red LEDs, the second emitter 912 may represent a chain of blue LEDs, the third emitter 913 may represent a chain of green LEDs, and the fourth emitter 914 may represent a chain of white or amber LEDs.

The middle drone lighting module 900 may control the emitters 911, 912, 913, 914 to adjust an intensity level (e.g., a luminous flux or a brightness) and/or a color (e.g., a color temperature) of a cumulative light output of the middle drone lighting module 900. The emitter module 910 may also comprise one or more detectors 916, 918 (e.g., the detectors 312) that may generate respective photodiode currents $I_{PD1}$, $I_{PD2}$ (e.g., detector signals) in response to incident light. In examples, the detectors 916, 918 may be photodiodes. For example, the first detector 916 may represent a single red, orange or yellow LED or multiple red, orange or yellow LEDs in parallel, and the second detector 918 may represent a single green LED or multiple green LEDs in parallel.

The middle drone lighting module 900 may comprise a power supply 948 that may receive a source voltage, such as a bus voltage (e.g., the bus voltage $V_{BUS}$ on the power bus 530), via a first connector 930. The power supply 948 may generate an internal DC supply voltage $V_{CC}$ which may be used to power one or more circuits (e.g., low voltage circuits) of the middle drone lighting module 900, such as the emitter control circuit 936.

The middle drone lighting module 900 may comprise an LED drive circuit 932. The LED drive circuit 932 may be configured to control (e.g., individually controlling) the power delivered to and/or the luminous flux of the light emitted by each of the emitters 911, 912, 913, 914 of the emitter module 910. The LED drive circuit 932 may receive the bus voltage $V_{BUS}$ and may adjust magnitudes of respective LED drive currents $I_{LED1}$, $I_{LED2}$, $I_{LED3}$, $I_{LED4}$ conducted through the emitters 911, 912, 913, 914. The LED drive circuit 932 may comprise one or more regulation circuits (e.g., four regulation circuits), such as switching regulators (e.g., buck converters) for controlling the magnitudes of the respective LED drive currents $I_{LED1}$-$I_{LED4}$.

The middle drone lighting module 900 may comprise a receiver circuit 934 that may be electrically coupled to the detectors 916, 918 of the emitter module 910 for generating respective optical feedback signals $V_{FB1}$, $V_{FB2}$ in response to the photodiode currents $I_{PD1}$, $I_{PD2}$. The receiver circuit 934 may comprise one or more trans-impedance amplifiers (e.g., two trans impedance amplifiers) for converting the respective photodiode currents $I_{PD1}$, $I_{PD2}$ into the optical feedback signals $V_{FB1}$, $V_{FB2}$. For example, the optical feedback signals $V_{FB1}$, $V_{FB2}$ may have DC magnitudes that indicate the magnitudes of the respective photodiode currents $I_{PD1}$, $I_{PD2}$.

The middle drone lighting module 900 may comprise an emitter control circuit 936 for controlling the LED drive circuit 932 to control the intensities and/or colors of the emitters 911, 912, 913, 914 of the emitter module 910. The emitter control circuit 936 may comprise, for example, a microprocessor, a microcontroller, a programmable logic device (PLD), an application specific integrated circuit (ASIC), a field-programmable gate array (FPGA), or any other suitable processing device or controller. The emitter control circuit 936 may be electrically coupled to a master lighting module via one or more electrical connections, such as the communication bus 842 (e.g., a drone communication bus, such as an I2C communication link), the timing signal line 844, and/or the IRQ signal line 846.

The emitter control circuit 936 may be configured to communicate with a master lighting module via the communication bus 842 (e.g., using the $I^2C$ communication protocol). The communication bus 842 may be, for example, the drone communication bus 550. For example, the emitter control circuit 936 may be configured to receive messages including control data and/or commands from the master lighting module via the communication bus 842 to control the emitter modules 910 to control the intensity level (e.g., brightness or luminous flux) and/or the color (e.g., color temperature) of the cumulative light emitted by the emitter modules 910 of the middle drone lighting module 900.

The emitter control circuit 936 may be powered by the power supply 948 (e.g., receiving the voltage $V_{CC}$). The emitter control circuit 936 may generate one or more drive signals $V_{DR1}$, $V_{DR2}$, $V_{DR3}$, $V_{DR4}$ for controlling the respective regulation circuits in the LED drive circuit 932. The emitter control circuit 936 may receive the optical feedback signals $V_{FB1}$, $V_{FB2}$ from the receiver circuit 934 for determining the luminous flux $L_E$ of the light emitted by the emitters 911, 912, 913, 914.

The emitter control circuit 936 may be configured to transmit an indication to the master control circuit 850 when the emitter control circuit 936 requires service and/or has a message to transmit to the master lighting module 800 via the IRQ signal line 846 (e.g., such as the IRQ signal line 570 shown in FIG. 6). For example, the emitter control circuit 936 may signal the master control circuit (e.g., the master control circuit 850) via the IRQ signal line 846 that the emitter control circuit 936 needs to be serviced. In addition, the emitter control circuit 936 may signal to the master control circuit via the IRQ signal line 846 that the emitter control circuit 936 has a message to transmit to the master control circuit.

The emitter control circuit 936 may receive a plurality of emitter forward voltage feedback signals $V_{FE1}$, $V_{FE2}$, $V_{FE3}$, $V_{FE4}$ from the LED drive circuit 932 and a plurality of detector forward voltage feedback signals $V_{FD1}$, $V_{FD2}$ from the receiver circuit 934. The emitter forward voltage feedback signals $V_{FE1}$-$V_{FE4}$ may be representative of the magnitudes of the forward voltages of the respective emitters 911, 912, 913, 914, which may indicate temperatures $T_{E1}$, $T_{E2}$, $T_{E3}$, $T_{E4}$ of the respective emitters. If each emitter 911, 912, 913, 914 comprises multiple LEDs electrically coupled in series, the emitter forward voltage feedback signals $V_{FE1}$-$V_{FE4}$ may be representative of the magnitude of the forward voltage across a single one of the LEDs or the cumulative forward voltage developed across multiple LEDs in the chain (e.g., all of the series-coupled LEDs in the chain). The detector forward voltage feedback signals $V_{FD1}$, $V_{FD2}$ may be representative of the magnitudes of the forward voltages of the respective detectors 916, 918, which may indicate temperatures $T_{D1}$, $T_{D2}$ of the respective detectors. For example, the detector forward voltage feedback signals $V_{FD1}$, $V_{FD2}$ may be equal to the forward voltages $V_{FD}$ of the respective detectors 916, 918.

Notably, the middle drone lighting module 900 is not connected to the communication bus 840 (e.g., an RS-485 communication link). Accordingly, the emitter control circuit 936 of the middle drone lighting module 900 may receive messages (e.g., control messages) via a communication bus 842 (e.g., using the $I^2C$ communication protocol). For example, the middle drone lighting module 900 may receive messages from a master lighting module (e.g., the master module 150A, 200A, 512, and/or the master lighting module 800). A master control circuit of the master lighting module (e.g., master control circuit 850) may be configured to control the middle drone lighting module 900 to control the intensity level (e.g., brightness or luminous flux) and/or the color (e.g., color temperature) of the cumulative light emitted by the middle drone lighting module 900.

The master control circuit may be configured to adjust a present intensity level $L_{PRES}$ (e.g., a present brightness) of the cumulative light emitted by the middle drone lighting module 900 towards a target intensity level $L_{TRGT}$ (e.g., a target brightness). The target intensity level $L_{TRGT}$ may be in a range across a dimming range of the middle drone lighting module 900, e.g., between a low-end intensity level $L_{LE}$ (e.g., a minimum intensity level, such as approximately 0.1%-1.0%) and a high-end intensity level $L_{HE}$ (e.g., a maximum intensity level, such as approximately 100%). The master control circuit may be configured to adjust a present color temperature $T_{PRES}$ of the cumulative light emitted by the middle drone lighting module 900 towards a target color temperature $T_{TRGT}$. In some examples, the target color temperature $T_{TRGT}$ may range be in a range between a cool-white color temperature (e.g., approximately 3100-4500 K) and a warm-white color temperature (e.g., approximately 2000-3000 K).

When the middle drone lighting module 900 is powered on, the master control circuit may be configured to control the middle drone lighting module 900 (e.g., the emitters of the middle drone lighting module 900) to emit light substantially all of the time. The emitter control circuit 936 may be configured to receive a timing signal (e.g., via the timing signal lines 844 and/or an IRQ signal line 846). The emitter control circuit 936 may use the timing signal to coordinate the timing at which the emitter control circuit 936 can perform a measurement procedure (e.g., to reduce the likelihood that any module causes interference with the measurement procedure of another module). For example, the emitter control circuit 936 may use the timing signal to determine a time to measure optical feedback information of the lighting loads of its module to, for example, perform color and/or intensity level control refinement, when other master and drone lighting modules are not emitting light.

The emitter control circuit 936 may be configured to disrupt the normal emission of light to execute the measurement procedure during periodic measurement intervals. During the periodic measurement intervals, the emitter control circuit 936 may measure one or more operational characteristics of the middle drone lighting module 900. The measurement intervals may occur based on the timing signal on the synchronization lines 844 (e.g., which may be based on zero-crossing events of the AC mains line voltage $V_{AC}$). The emitter control circuit 936 may be configured to receive the timing signal and determine the specific timing of the periodic measurement intervals (e.g., a frequency of periodic measurement intervals) based on (e.g., in response to the timing signal. For example, during the measurement intervals, the emitter control circuit 936 may be configured to individually turn on each of the different-colored emitters 911, 912, 913, 914 of the middle drone lighting module 900 (e.g., while turning off the other emitters) and measure the luminous flux $L_E$ of the light emitted by that emitter using one of the two detectors 916, 918. For example, the emitter control circuit 936 may turn on the first emitter 911 of the emitter module 910 (e.g., at the same time as turning off the other emitters 912, 913, 914 and determine the luminous flux $L_E$ of the light emitted by the first emitter 911 in response to the first optical feedback signal $V_{FB1}$ generated from the first detector 916. In addition, the emitter control circuit 936 may be configured to drive the emitters 911, 912, 913, 914 and the detectors 916, 918 to generate the emitter forward voltage feedback signals $V_{FE1}$-$V_{FE4}$ and the detector forward voltage feedback signals $V_{FD1}$, $V_{FD2}$ during the measurement intervals.

Calibration values for the various operational characteristics of the middle drone lighting module 900 may be stored in a memory as part of a calibration procedure performed during manufacturing. For example, the memory 852 of the master lighting module 800. Calibration values may be stored for each of the emitters 911, 912, 913, 914 and/or the detectors 916, 918 of the middle drone lighting module 900. For example, calibration values may be stored for measured values of luminous flux (e.g., in lumens), x-chromaticity, y-chromaticity, emitter forward voltage, photodiode current, and detector forward voltage. For example, the luminous flux, x-chromaticity, and/or y-chromaticity measurements may be obtained from the emitters 911, 912, 913, 914 using an external calibration tool, such as a spectrophotometer. In examples, the middle drone lighting module 900 may measure the values for the emitter forward voltages, photodiode currents, and/or detector forward voltages internally. An external calibration tool and/or the middle drone lighting module 900 may measure the calibration values for each of the emitters 911, 912, 913, 914 and/or the detectors 916, 918 at a plurality of different drive currents, and/or at a plurality of different operating temperatures.

After installation, a master lighting module of the lighting device (e.g., the master lighting module 800) may use the calibration values stored in memory (e.g., the memory 852) to maintain a constant light output from the middle drone lighting module 900. The emitter control circuit 936 may determine target values for the luminous flux to be emitted from the emitters 911, 912, 913, 914 to achieve the target intensity $L_{TRGT}$ and/or the target color temperature $T_{TRGT}$ for the middle drone lighting module 900. The emitter control circuit 936 may determine the magnitudes for the respective drive currents $I_{LED1}$-$I_{LED4}$ for the emitters 911, 912, 913, 914 based on the determined target values for the luminous flux to be emitted from the emitters 911, 912, 913, 914. When the age of the middle drone lighting module 900 is zero, the magnitudes of the respective drive currents $I_{LED1}$-$I_{LED4}$ for the emitters 911, 912, 913, 914 may be controlled to initial magnitudes $I_{LED\text{-}INITIAL}$.

The light output (e.g., a maximum light output and/or the light output at a specific current or frequency) of middle drone lighting module 900 may decrease as the emitters 911, 912, 913, 914 age. The emitter control circuit 936 may be configured to increase the magnitudes of the drive current IDR for the emitters 911, 912, 913, 914 to adjusted magnitudes $I_{LED\text{-}ADJUSTED}$ to achieve the determined target values for the luminous flux of the target intensity $L_{TRGT}$ and/or the target color temperature $T_{TRGT}$.

Figure 10:
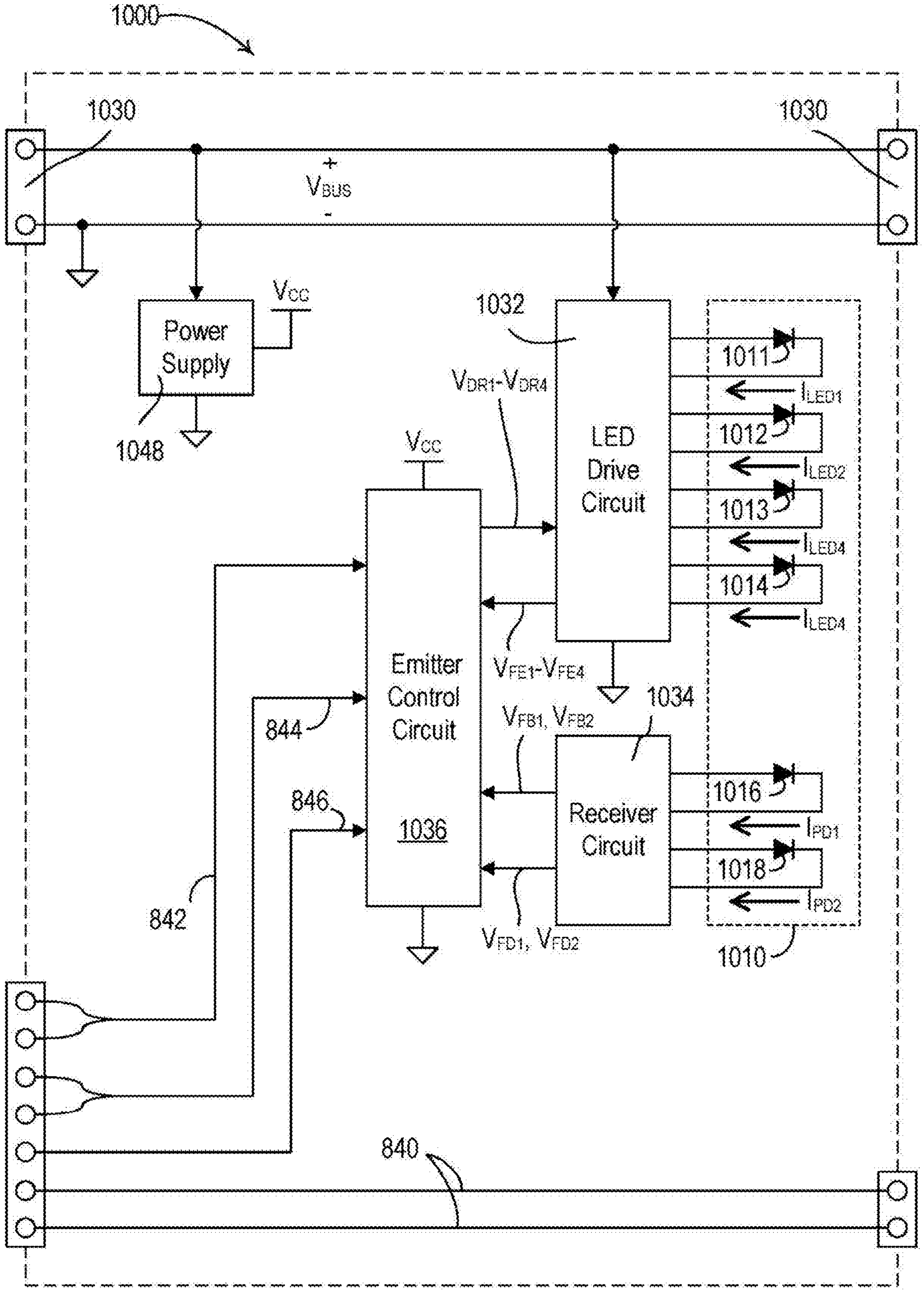
FIG. 10 is a simplified block diagram of an example end emitter module.

FIG. 10 is a simplified block diagram of an example drone lighting module 1000 (e.g., an end drone module such as end drone lighting modules 150C, 200D, and/or 200E shown in FIGS. 2, 3D, and 3E) of a lighting device (e.g., such as the lighting device 100 shown in FIGS. 1, 2 the lighting devices 400A, 400B, 400C shown in FIG. 5, and/or the lighting devices 510A, 510B shown in FIG. 6) of a lighting system (e.g., the lighting system 500 shown in FIG. 6). The end drone lighting module 1000 may be an end lighting module of the lighting device. The end drone lighting module 1000 may comprise one or more emitter modules 1010 (e.g., the emitter modules 154, 210, and/or 300 shown in FIGS. 2, 3A-3E, 4A, and 4B). The emitter module 1010 may include one or more strings of emitters 1011, 1012, 1013, 1014. Although each of the emitters 1011, 1012, 1013, 1014 is shown in FIG. 10 as a single LED, each of the emitters 1011, 1012, 1013, 1014 may comprise a plurality of LEDs connected in series (e.g., a chain of LEDs), a plurality of LEDs connected in parallel, or a suitable combination thereof, depending on the particular lighting system. In addition, each of the emitters 1011, 1012, 1013, 1014 may comprise one or more organic light-emitting diodes (OLEDs). For example, the first emitter 1011 may represent a chain of red LEDs, the second emitter 1012 may represent a chain of blue LEDs, the third emitter 1013 may represent a chain of green LEDs, and the fourth emitter 1014 may represent a chain of white or amber LEDs.

The end drone lighting module 1000 may control the emitters 1011, 1012, 1013, 1014 to adjust an intensity level (e.g., brightness or luminous flux) and/or a color (e.g., a color temperature) of a cumulative light output of the end drone lighting module 1000. The emitter module 1010 may also comprise one or more detectors 1016, 1018 (e.g. the detectors 312) that may generate respective photodiode currents $I_{PD1}$, $I_{PD2}$ (e.g., detector signals) in response to incident light. In examples, the detectors 1016, 1018 may be photodiodes. For example, the first detector 1016 may represent a single red, orange or yellow LED or multiple red, orange or yellow LEDs in parallel, and the second detector 1018 may represent a single green LED or multiple green LEDs in parallel.

The end drone lighting module 1000 may comprise a power supply 1048 that may receive a source voltage, such as a bus voltage (e.g., the bus voltage $V_{BUS}$ on the power bus 530), via a first connector 1030. The power supply 1048 may generate an internal DC supply voltage $V_{CC}$ which may be used to power one or more circuits (e.g., low voltage circuits) of the end drone lighting module 1000, such as the emitter control circuit 1036.

The end drone lighting module 1000 may comprise an LED drive circuit 1032. The LED drive circuit 1032 may be configured to control (e.g., individually controlling) the power delivered to and/or the luminous flux of the light emitted by each of the emitters 1011, 1012, 1013, 1014 of the emitter module 1010. The LED drive circuit 1032 may receive the bus voltage $V_{BUS}$ and may adjust magnitudes of respective LED drive currents $I_{LED1}$, $I_{LED2}$, $I_{LED3}$, $I_{LED4}$ conducted through the emitters 1011, 1012, 1013, 1014. The LED drive circuit 1032 may comprise one or more regulation circuits (e.g., four regulation circuits), such as switching regulators (e.g., buck converters) for controlling the magnitudes of the respective LED drive currents $I_{LED1}$-$I_{LED4}$.

The end drone lighting module 1000 may comprise a receiver circuit 1034 that may be electrically coupled to the detectors 1016, 1018 of the emitter module 1010 for generating respective optical feedback signals $V_{FB1}$, $V_{FB2}$ in response to the photodiode currents $I_{PD1}$, $I_{PD2}$. The receiver circuit 1034 may comprise one or more trans-impedance amplifiers (e.g., two trans impedance amplifiers) for converting the respective photodiode currents $I_{PD1}$, $I_{PD2}$ into the optical feedback signals $V_{FB1}$, $V_{FB2}$. For example, the optical feedback signals $V_{FB1}$, $V_{FB2}$ may have DC magnitudes that indicate the magnitudes of the respective photodiode currents $I_{PD1}$, $I_{PD2}$.

The middle drone lighting module 1000 may comprise an emitter control circuit 1036 for controlling the LED drive circuit 1032 to control the intensities and/or colors of the emitters 1011, 1012, 1013, 1014 of the emitter module 1010. The emitter control circuit 1036 may comprise, for example, a microprocessor, a microcontroller, a programmable logic device (PLD), an application specific integrated circuit (ASIC), a field-programmable gate array (FPGA), or any other suitable processing device or controller. The emitted control circuit 1036 may be powered by the power supply 1048 (e.g., receiving the voltage $V_{CC}$). The emitter control circuit 1036 may generate one or more drive signals $V_{DR1}$, $V_{DR2}$, $V_{DR3}$, $V_{DR4}$ for controlling the respective regulation circuits in the LED drive circuit 1032. The emitter control circuit 1036 may receive the optical feedback signals $V_{FB1}$, $V_{FB2}$ from the receiver circuit 934 for determining the luminous flux $L_E$ of the light emitted by the emitters 1011, 1012, 1013, 1014.

The emitter control circuit 1036 may be configured to transmit an indication to the master control circuit 850 when the emitter control circuit 1036 requires service and/or has a message to transmit to the master lighting module 800 via the IRQ signal line 846 (e.g., such as the IRQ signal line 570 shown in FIG. 6). For example, the emitter control circuit 1036 may signal the master control circuit (e.g., the master control circuit 850) via the IRQ signal line 846 that the emitter control circuit 1036 needs to be serviced. In addition, the emitter control circuit 1036 may signal to the master control circuit via the IRQ signal line 846 that the emitter control circuit 1036 has a message to transmit to the master control circuit.

The emitter control circuit 1036 may receive a plurality of emitter forward voltage feedback signals $V_{FE1}$, $V_{FE2}$, $V_{FE3}$, $V_{FE4}$ from the LED drive circuit 1032 and a plurality of detector forward voltage feedback signals $V_{FD1}$, $V_{FD2}$ from the receiver circuit 1034. The emitter forward voltage feedback signals $V_{FE1}$-$V_{FE4}$ may be representative of the magnitudes of the forward voltages of the respective emitters 1011, 1012, 1013, 1014, which may indicate temperatures $T_{E1}$, $T_{E2}$, $T_{E3}$, $T_{E4}$ of the respective emitters. If each emitter 1011, 1012, 1013, 1014 comprises multiple LEDs electrically coupled in series, the emitter forward voltage feedback signals $V_{FE1}$-$V_{FE4}$ may be representative of the magnitude of the forward voltage across a single one of the LEDs or the cumulative forward voltage developed across multiple LEDs in the chain (e.g., all of the series-coupled LEDs in the chain). The detector forward voltage feedback signals $V_{FD1}$, $V_{FD2}$ may be representative of the magnitudes of the forward voltages of the respective detectors 1016, 1018, which may indicate temperatures $T_{D1}$, $T_{D2}$ of the respective detectors. For example, the detector forward voltage feedback signals $V_{FD1}$, $V_{FD2}$ may be equal to the forward voltages $V_{FD}$ of the respective detectors 1016, 1018.

The emitter control circuit 1036 of the end drone lighting module 1000 may receive messages (e.g., control messages) via a communication bus 842 (e.g., the drone communication bus 550), for example, using the $I^2C$ communication protocol. For example, the end drone lighting module 1000 may receive messages from a master lighting module (e.g., the master module 150A, 200A, 512, and/or the master lighting module 800). A master control circuit of the master lighting module (e.g., master control circuit 850) may be configured to control the end drone lighting module 1000 to control the intensity level (e.g., brightness or luminous flux) and/or the color (e.g., the color temperature) of the cumulative light emitted by the end drone lighting module 1000.

The master control circuit may be configured to adjust a present intensity level $L_{PRES}$ (e.g., a present brightness) of the cumulative light emitted by the end drone lighting module 1000 towards a target intensity level $L_{TRGT}$ (e.g., a target brightness). The target intensity level $L_{TRGT}$ may be in a range across a dimming range of the end drone lighting module 1000, e.g., between a low-end intensity level $L_{LE}$ (e.g., a minimum intensity level, such as approximately 0.1%-1.0%) and a high end intensity level $L_{HE}$ (e.g., a maximum intensity level, such as approximately 100%). The master control circuit may be configured to adjust a present color temperature $T_{PRES}$ of the cumulative light emitted by the end drone lighting module 1000 towards a target color temperature $T_{TRGT}$. The target color temperature $T_{TRGT}$ may be in a range between a cool-white color temperature (e.g., approximately 3100-4500 K) and a warm-white color temperature (e.g., approximately 2000-3000 K).

When the end drone lighting module 1000 is powered on, the master control circuit may be configured to control the end drone lighting module 1000 (e.g., the emitters of the end drone lighting module 1000) to emit light substantially all of the time. The emitter control circuit 1036 may be configured to receive a timing signal (e.g., via the timing signal lines 844 and/or an IRQ signal line 846). The emitter control circuit 1036 may use the timing signal to coordinate the timing at which the emitter control circuit 1036 can perform a measurement procedure (e.g., to reduce the likelihood that any module causes interference with the measurement procedure of another module). For example, the emitter control circuit 1036 may use the timing signal to determine a time to measure optical feedback information of the lighting loads of its module to, for example, perform color and/or intensity level control refinement, when other master and drone lighting modules are not emitting light.

The emitter control circuit 1036 may be configured to disrupt the normal emission of light to execute the measurement procedure during periodic measurement intervals. During the periodic measurement intervals, the emitter control circuit 1036 may measure one or more operational characteristics of the end drone lighting module 1000. The measurement intervals may occur based on the timing signal on the synchronization lines 844 (e.g., which may be based on zero-crossing events of the AC mains line voltage $V_{AC}$). The emitter control circuit 1036 may be configured to receive the timing signal and determine the specific timing of the periodic measurement intervals (e.g., a frequency of periodic measurement intervals) based on (e.g., in response to the timing signal. For example, during the measurement intervals, the emitter control circuit 1036 may be configured to individually turn on each of the different-colored emitters 1011, 1012, 1013, 1014 of the end drone lighting module 1000 (e.g., while turning off the other emitters) and measure the luminous flux $L_E$ of the light emitted by that emitter using one of the two detectors 1016, 1018. For example, the emitter control circuit 1036 may turn on the first emitter 1011 of the emitter module 1010 (e.g., at the same time as turning off the other emitters 1012, 1013, 1014 and determine the luminous flux $L_E$ of the light emitted by the first emitter 1011 in response to the first optical feedback signal $V_{FB1}$ generated from the first detector 1016. In addition, the emitter control circuit 1036 may be configured to drive the emitters 1011, 1012, 1013, 1014 and the detectors 1016, 1018 to generate the emitter forward voltage feedback signals $V_{FE1}$-$V_{FE4}$ and the detector forward voltage feedback signals $V_{FD1}$, $V_{FD2}$ during the measurement intervals.

Calibration values for the various operational characteristics of the end drone lighting module 1000 may be stored in a memory as part of a calibration procedure performed during manufacturing. For example, the memory 852 of the master lighting module 800. Calibration values may be stored for each of the emitters 1011, 1012, 1013, 1014 and/or the detectors 1016, 1018 of the end drone module 1000. For example, calibration values may be stored for measured values of luminous flux (e.g., in lumens), x-chromaticity, y-chromaticity, emitter forward voltage, photodiode current, and/or detector forward voltage. For example, the luminous flux, x-chromaticity, and/or y-chromaticity measurements may be obtained from the emitters 1011, 1012, 1013, 1014 using an external calibration tool, such as a spectrophotometer. In examples, the end drone lighting module 1000 may measure the values for the emitter forward voltages, photodiode currents, and/or detector forward voltages internally. An external calibration tool and/or the end drone lighting module 1000 may measure the calibration values for each of the emitters 1011, 1012, 1013, 1014 and/or the detectors 1016, 1018 at a plurality of different drive currents, and/or at a plurality of different operating temperatures.

After installation, a master lighting module of the lighting device (e.g., the master lighting module 800) may use the calibration values stored in memory (e.g., the memory 852) to maintain a constant light output from the end drone module 1000. The emitter control circuit 1036 may determine target values for the luminous flux to be emitted from the emitters 1011, 1012, 1013, 1014 to achieve the target intensity level $L_{TRGT}$ and/or the target color temperature $T_{TRGT}$ for the end drone module 1000. The emitter control circuit 1036 may determine the magnitudes for the respective drive currents $I_{LED1}$-$I_{LED4}$ for the emitters 1011, 1012, 1013, 1014 based on the determined target values for the luminous flux to be emitted from the emitters 1011, 1012, 1013, 1014. When the age of the end drone module 1000 is zero, the magnitudes of the respective drive currents $I_{LED1}$-$I_{LED4}$ for the emitters 1011, 1012, 1013, 1014 may be controlled to initial magnitudes $I_{LED-INITIAL}$.

The light output (e.g., a maximum light output and/or the light output at a specific current or frequency) of end drone module 1000 may decrease as the emitters 1011, 1012, 1013, 1014 age. The emitter control circuit 1036 may be configured to increase the magnitudes of the drive current IDR for the emitters 1011, 1012, 1013, 1014 to adjusted magnitudes $I_{LED-ADJUSTED}$ to achieve the determined target values for the luminous flux of the target intensity level $L_{TRGT}$ and/or the target color temperature $T_{TRGT}$.

Figure 11:
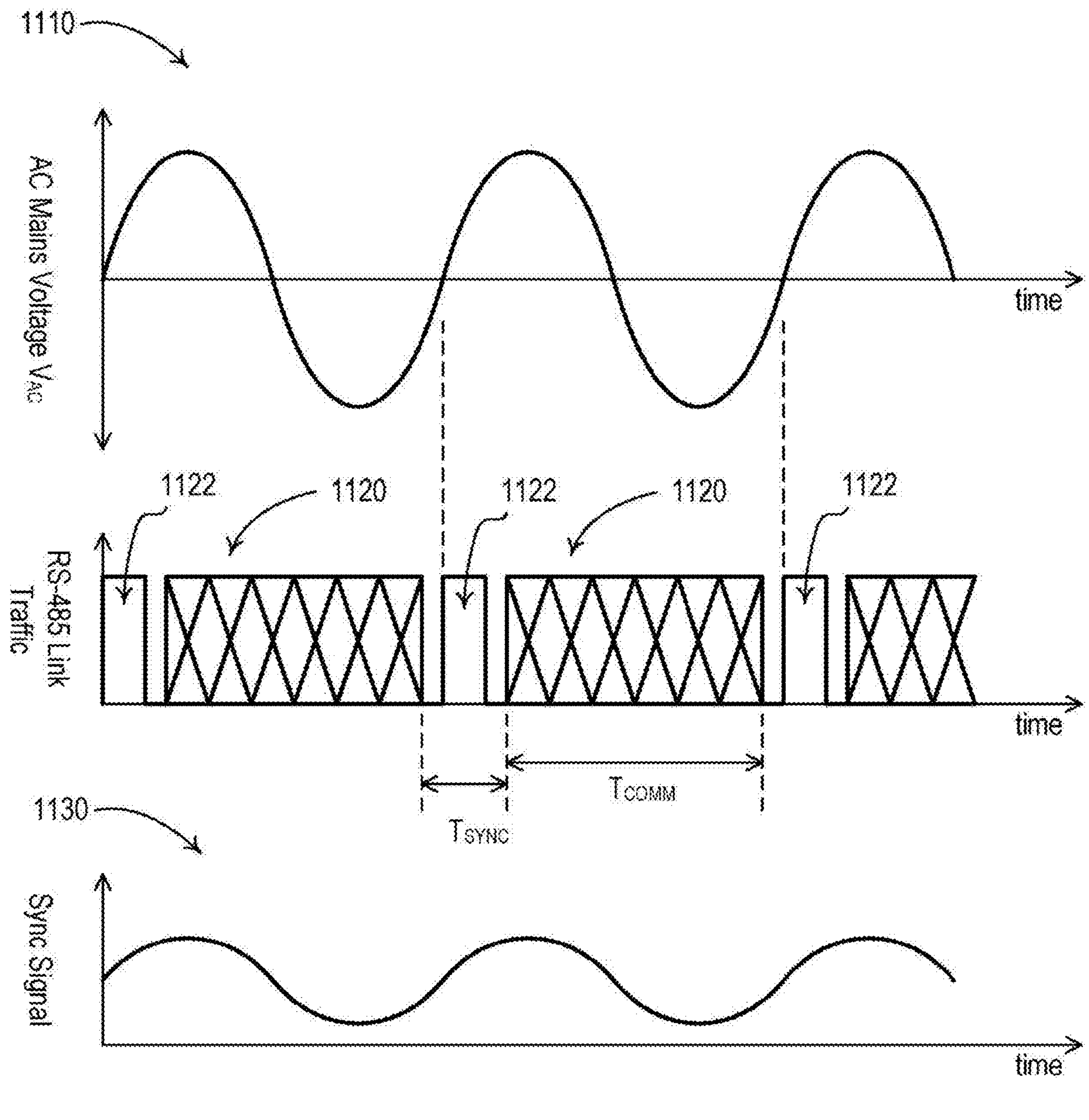
FIG. 11 depicts example waveforms associated with generation of a timing signal.

FIG. 11 depicts example waveforms associated with the generation of a timing signal 1130 on a synchronization line (e.g., the synchronization lines 844) that is coupled between one or more master and drone lighting modules. For example, a master lighting module (e.g., the master module 150A, 200A, 512, and/or the master lighting module 800) of a lighting system (e.g., the lighting system 500) may be configured to generate the timing signal 1130. The lighting system may include a fixture controller (e.g., the fixture controller 520 and/or the fixture controller 700), one or more master lighting modules, and a plurality of drone lighting modules (e.g., the drone lighting module 900 and/or the drone lighting module 1000).

The fixture controller may receive an AC mains voltage 1110. The fixture controller may be configured to transmit messages (e.g., as represented by communication waveforms 1120) to the master lighting control modules via a communication bus (e.g., the communication bus 540, 840) during a communication period $T_{COMM}$. In addition, the fixture controller may be configured to generate a synchronization pulse 1122 on the communication bus. The fixture controller may be configured to determine the zero-crossings of the AC mains voltage 1110 and begin generating the synchronization pulse 1122 at the zero-crossings (e.g., once per line cycle of the AC mains voltage). The fixture controller may be configured to pause communications on the communication bus during a synchronization period $T_{SYNC}$ during which the fixture controller may generate the synchronization pulse 1122. In some examples, the fixture controller may poll (e.g., query) each of the master lighting modules in a looping manner on the communication bus. If a master lighting module has a message to transmit, the master lighting module will only communication on the communication bus in response to being polled by the fixture controller. In such examples, the fixture controller may pause communication on the communication bus by ceasing to poll the master lighting modules on the communication bus. In other examples, the fixture controller may transmit a communicate message to the master lighting modules on the communication bus to indicate that the master lighting modules may communicate on the communication bus, and may pause the communication on the communication bus by sending a pause message on the communication bus.

The fixture controller may determine the length of the synchronization period $T_{SYNC}$ based on the time of the zero-crossing event. For example, the fixture controller may determine when to end the synchronization period $T_{SYNC}$ based on the time of the zero-crossing event, which means that the length of the synchronization period $T_{SYNC}$ may vary from on half-cycle to the next. Further, the time between the zero-crossing and the end of the synchronization period $T_{SYNC}$ might be a fixed or predetermined time. Accordingly, in some examples, the time between the end of the communication period $T_{COMM}$ and the next zero-crossing might vary.

Each of the master lighting modules may generate a timing signal 1130 in response to receiving the synchronization pulse 1122 on the communication bus, and for example, based on the frequency of the synchronization pulse 1122 (e.g., based on the frequency of a plurality of synchronization pulses 1122). The timing signal 1130 may be a sinusoidal wave (e.g., as shown), or alternatively, may be a square wave or other suitable timing signal. For instance, the timing signal 1130 may be a sinusoidal waveform having the same frequency and period as the synchronization pulses 1122. For example, the master lighting modules may be configured to determine a frequency of synchronization pulses 1122 on the communication bus (e.g., which may be indicative of the frequency and/or zero-crossing events of the AC mains voltage 1110). In some examples, the master lighting modules may be configured to measure a period between the beginnings (e.g., or ends) of the synchronization pulses 1122 to determine the frequency of the synchronization pulses 1122. The plurality of master and drone lighting modules may be configured to use the timing signal 1130 to determine the timing of a respective measurement interval during which the master and drone lighting modules may execute a measurement procedure (e.g., as described above), since, for example, the timing signal 1130 may be indicative of the frequency and/or zero-crossing events of the AC mains voltage 1110. Accordingly, the master and drone lighting modules may coordinate a measurement procedure with respect to the AC mains line voltage $V_{AC}$ (e.g., the zero-crossing event of the AC mains line voltage $V_{AC}$), even though the master and drone lighting modules do not receive the AC mains line voltage $V_{AC}$.

Although described primarily in the context of a linear lighting device, the procedures and examples provided herein may be application to lighting devices of other designs, shapes, and sizes. For instance, the procedures and examples described herein may be implemented in one or more devices within a lighting system that comprises other lighting devices (e.g., lighting devices having a different form factor), such as but not limited to, downlights, pendants, linear downlight fixtures, strip lighting, track lighting, sconces, accent lighting, chandeliers, etc.

Figure 12:
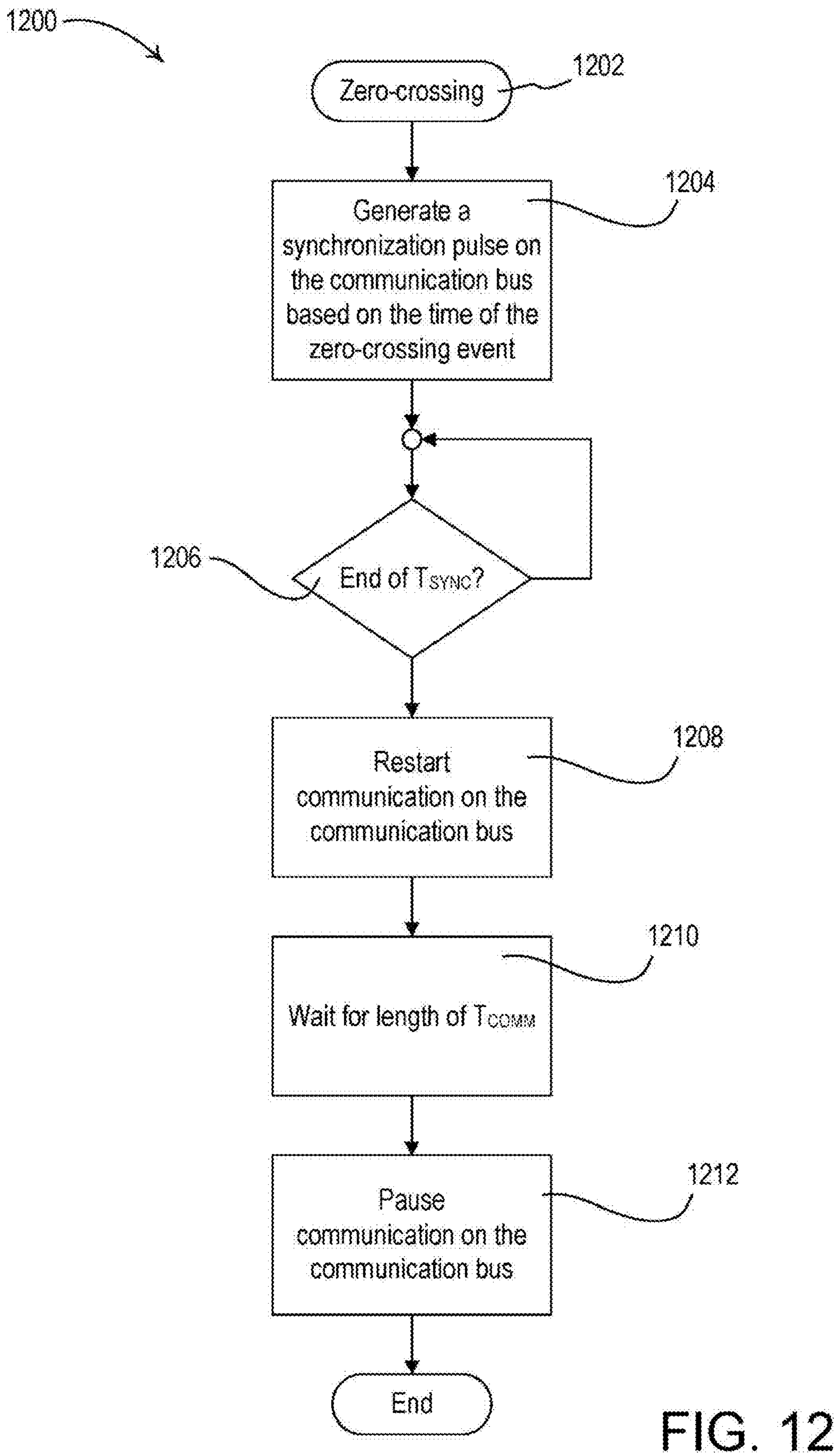
FIG. 12 is a flowchart depicting an example procedure for generating a synchronization pulse across a communication bus for receipt by one or more master lighting modules of a lighting assembly.

FIG. 12 is a flowchart depicting an example procedure 1200 for generating a synchronization pulse across a communication bus for receipt by one or more master lighting modules of a lighting system (e.g., the lighting system 500). The procedure 1200 may be executed by a control circuit of a fixture controller (e.g., the fixture control circuit 736 of the fixture controller 700). The control circuit may execute the procedure 1200 periodically. The control circuit may execute the procedure 1200 to synchronize the fixture controller and/or devices controlled by the fixture controller (e.g., one or more master and/or drone lighting modules) in accordance with the frequency of the AC mains line voltage $V_{AC}$ (e.g., utilizing the timing of the zero crossings of the AC mains line voltage $V_{AC}$).

The control circuit may execute the procedure 1200 in response to a signal from a zero-cross detect circuit indicating a zero-crossing of the AC mains line voltage $V_{AC}$ (e.g., the zero-cross signal $V_{ZC}$) at 1202. For example, a rising or falling edge of the zero-cross signal $V_{ZC}$ may trigger an interrupt in the control circuit that may cause the execution of the procedure 1200 at 1202. The control circuit may execute the procedure 1200 in response to the zero-cross signal $V_{ZC}$ at approximately the times of zero-crossings of the AC mains lines voltage $V_{AC}$. For example, the control circuit may execute the procedure 1200 once per line cycle, for example, at the positive-going zero-crossings (e.g., or the negative-going zero-crossings).

At 1204, the control circuit may generate a synchronization pulse (e.g., a synchronization frame and/or the synchronization pulse 1122) on a communication bus (e.g., the serial communication bus 740) based on the time of the zero-crossing event. For example, the control circuit may generate the synchronization pulse such that the synchronization pulse begins at begins at the zero-crossing event.

At 1206, the control circuit may determine whether a synchronization period $T_{SYNC}$ is has ended. If the control circuit determines that the synchronization period $T_{SYNC}$ has not ended at 1206, the control circuit may continue to generate the synchronization pulse. During the synchronization period $T_{SYNC}$, the control circuit may be configured to pause communications on the communication bus to allow the control circuit to generate the synchronization pulse. For instance, the control circuit may be configured to halt transmitting messages on the communication bus in order to generate the synchronization pulse on the communication bus.

The control circuit may determine the length of the synchronization period $T_{SYNC}$ based on the time of the zero-crossing event. For example, the control circuit may determine when to end the synchronization period $T_{SYNC}$ based on the time of the zero-crossing event, which means that the length of the synchronization period $T_{SYNC}$ may vary from on half-cycle to the next. For example, the control circuit may start a timer in response to detecting a zero-crossing at 1202, and may determine the end of the synchronization period $T_{SYNC}$ at 1206 after a predetermined amount of time has expired from the detected zero-crossing. Alternatively, the control circuit may determine the length of the synchronization period $T_{SYNC}$ based on the time that a previous communication period $T_{COMM}$ ended.

When the control circuit determines that the synchronization period $T_{SYNC}$ has ended at 1206, the control circuit may restart communication on the communication bus during a communication period $T_{COMM}$. During the communication period $T_{COMM}$, the control circuit of the fixture controller may be configured to transmit messages to the master lighting control modules via the communication bus. The control circuit may wait for the length of the communication period $T_{COMM}$ at 1210, and during the length of the communication period $T_{COMM}$ the fixture controller and the one or more master lighting control modules may communication over the communication bus. The control circuit may pause communication on the communication bus at the end of the communication period $T_{COMM}$ at 1212, before exiting the procedure 1200. The control circuit may set the length of the communication period $T_{COMM}$ such that the communication period $T_{COMM}$ ends before the next zero-crossing event of the AC mains line voltage $V_{AC}$. For example, the control circuit may enable communication across the communication bus during the communication period $T_{COMM}$, and then pause the communication on the communication period $T_{COMM}$ prior to the next zero-crossing event so that the control circuit can wait for and receive the signal from the zero-cross detect circuit indicating the next zero-crossing and execute the procedure 1200 again. For example, the control circuit may start a timer in response to detecting a zero-crossing at 1202, and may determine the end of the communication period $T_{COMM}$ at 1212 after a predetermined amount of time has expired from the detected zero-crossing.

Figure 13:
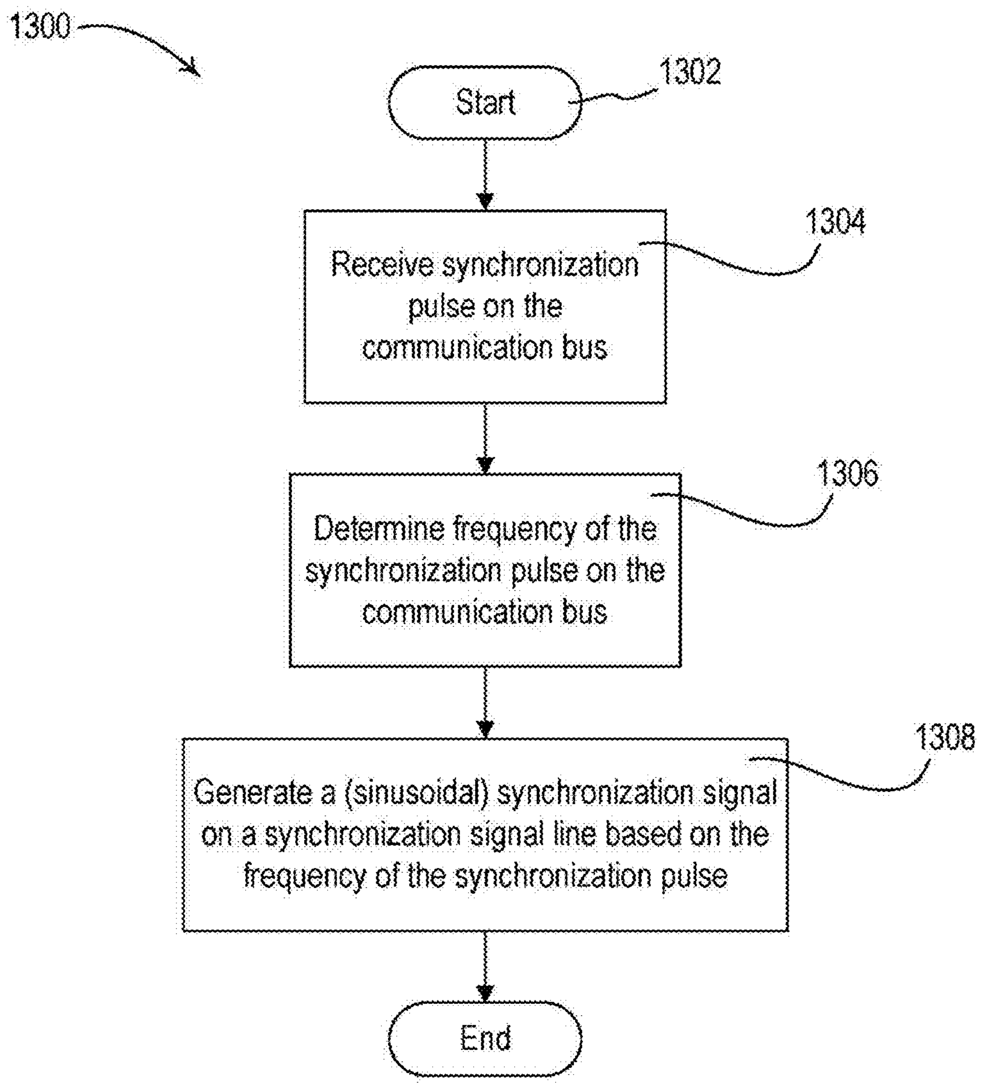
FIG. 13 is a flowchart depicting an example procedure for generating a timing signal that may be used by the master lighting module and the drone lighting modules of a linear lighting assembly.

FIG. 13 is a flowchart depicting an example procedure 1300 for generating a timing signal that may be used by the master lighting modules and the drone lighting modules of a lighting assembly (e.g., the lighting system 500). The procedure 1300 may be executed by one or more control circuits (e.g., the master control circuit 850) of a master lighting module (e.g., the master module 150A, 200A, 512, and/or the master lighting module 800). The control circuit may perform the procedure 1300 to coordinate the timing at which the master lighting module and the drone lighting modules (e.g., the emitter control circuits 836, 936, 1036) can perform a measurement procedure modules. The control circuit may execute the procedure 1300 periodically. The control circuit may execute the procedure 1300 to coordinate the timing of a respective measurement intervals during which the master and drone lighting modules may execute a measurement procedure (e.g., as described above).

The control circuit may start the procedure 1300 at 1302. At 1304, the control circuit may receive one or more synchronization pulses (e.g., synchronization frames) on a communication bus (e.g., the serial communication bus 740), for example, from a fixture controller (e.g., the fixture control circuit 736 of the fixture controller 700) of the lighting assembly. For instance, the control circuit may receive the synchronization pulse from a fixture controller that executes the procedure 1200. In some examples, a pulse detector of the master lighting module (e.g., of a master control circuit of the master lighting module) may receive (e.g., detect) the synchronization pulse on the communication bus. For instance, the pulse detector may be implemented using microprocessor hardware peripherals (e.g., timer input capture) of the master lighting module.

At 1306, the control circuit may determine a frequency of the synchronization pulse. For example, the control circuit may be configured to measure a period between the beginning of a first synchronization pulse and a second subsequent synchronization pulse (e.g., the next synchronization pulse after the first synchronization pulse) to determine the frequency of the synchronization pulses on the communication bus. The control circuit may be configured to measure the periods between the beginnings of a plurality of the synchronization pulses (e.g., a plurality of first and second synchronization pulses) to determine the frequency of the synchronization pulses on the communication bus. In some instances, the control circuit may update the frequency after each synchronization pulse (e.g., based on a sliding window of samples of synchronization pulses). Further, in some examples, the control circuit may filter and/or average the determined frequency over time.

At 1308, the control circuit may generate a timing signal on a timing signal line (e.g., the timing signal lines 560 and/or the timing signal lines 844) based on the frequency of the synchronization pulse. The timing signal may be a sinusoidal wave, a square wave, or other suitable timing signal. In some examples, the timing signal may be a sinusoidal waveform having the same frequency and period as the synchronization pulses. Further, and for example, the control circuit may generate the timing signal using a digital-to-analog converter (DAC), where the control of the DAC is updated based on the frequency of the synchronization pulses across the communication bus.

The plurality of master and drone lighting modules (e.g., the emitter control circuits 836, 936, 1036) may be configured to use the timing signal to perform a measurement procedure. As such, the plurality of master and drone lighting modules may coordinate a measurement procedure with respect to zero-crossings of the AC mains line voltage $V_{AC}$ (e.g., the zero-crossing event of the AC mains line voltage $V_{AC}$), even though the master and drone lighting modules do not receive the AC mains line voltage $V_{AC}$. For example, the plurality of master and drone lighting modules may determine a frequency of periodic measurement intervals based on the frequency of the timing signal received on the synchronization line (e.g., determine the timing of a respective measurement interval during which the master and drone lighting modules may execute a measurement procedure). Accordingly, in some examples, the plurality of master and drone lighting modules may determine a time to measure optical feedback information of the lighting loads of their respective modules based on the frequency of the timing signal to, for example, perform color and/or intensity level control refinement. Finally, in some examples, the control circuit may compensate for any phase delay between detection of the synchronization pulse and the AC mains line voltage $V_{AC}$ (e.g., the zero-crossing events of the AC mains line voltage $V_{AC}$), and may generate the timing signal at the actual times of the zero crossings events of the AC mains line voltage $V_{AC}$ (e.g., using a phase delay compensation procedure).

Lighting systems (e.g., the lighting system 500) may be configured to protect against damage caused by transient spikes in a magnitude of a bus voltage $V_{BUS}$ and/or a sustained low magnitude of the bus voltage $V_{BUS}$, which for example, may be due to a power bus (e.g., power wiring, such as the power bus 530) being too long, too many lighting fixtures and/or modules connected to the power bus, or other unexpected conditions. As such, a lighting system may be configured to detect a brownout event, such as an overload condition and/or a long wire-run condition, and prevent the event from continuing. For instance, the lighting system may be specified to handle a maximum power rating (e.g., 20 or 25 watts). In some examples, such as with linear lighting devices, the maximum power rating may be defined in terms of a maximum length of a lighting fixture assembly of the lighting system, which may include the total length of lighting devices (e.g., the lighting device 100 shown in FIGS. 1, 2 the lighting devices 400A, 400B, 400C shown in FIG. 5, and/or the lighting devices 510A, 510B shown in FIG. 6) plus the total length of the power bus (e.g., the power wiring between the lighting devices). The power draw of the lighting assembly may be a function of number of emitters of the lighting assembly. Too many emitters along a power bus may cause an overload condition. When there is too much resistance on the line, such as in a long wire-run condition, the lighting devices located far from the power converter may receive the bus voltage $V_{BUS}$ at a magnitude that is below a threshold (e.g., 15 V). The wire may include both the power wiring between lighting devices and the power wiring within the lighting devices. As is appreciated, a linear lighting device may have more power wiring located within the lighting device than lighting devices of other form factors, such as downlights. If a lighting device receives the bus voltage $V_{BUS}$ at a magnitude that is below the threshold (e.g., 15 V), the emitters of the lighting device may turn off (e.g., flicker on and off) due to the low bus voltage.

If more than the maximum number of lighting modules are connected to the power bus of a single fixture controller (e.g., the number of lighting module connected to the power bus exceeds a maximum length), then the fixture controller (e.g., the fixture controller 700) may detect too much power draw on the power bus, which for example, may cause the magnitude of the bus voltage $V_{BUS}$ to drop below a threshold voltage (e.g., 15V). For instance, if the total length of the lighting modules and cable connected to a single fixture controller exceeds a threshold (e.g., a threshold that corresponds to a load that is greater than a set power rating, such as 20 watts), the power converter circuit may shut down, which may cause the magnitude of the bus voltage $V_{BUS}$ to drop below the threshold voltage (e.g., 15V). In some examples, a control circuit of the power converter circuit may cause the power converter to shut down (e.g., render a controllable switching device(s) of the power converter to be non-conductive) in response to the overload condition. Further, in some instances, if the power converter circuit detects too much load (e.g., more than the maximum number of lighting modules), the power converter circuit may shut down, which may bring the magnitude of the bus voltage $V_{BUS}$ to below the threshold voltage, and then turn back on. This may continue (e.g., oscillating on and off) until the overload condition is fixed (e.g., a system administrator removes one or more lighting modules from the linear lighting fixture). As such, too many lighting modules connected to the power bus (e.g., the total length of the lighting modules and cable connected to a single fixture controller exceeds a threshold) may create an overload condition in the lighting fixture assembly (e.g., on the power bus).

Further, and for example, the linear lighting assembly may be specified to handle a power bus that can be up to a maximum length (e.g., approximately 50 feet). The maximum length may define the maximum length of wiring (e.g., the wiring of the power bus) from the fixture controller that a lighting module can be connected to the power bus and still receive the bus voltage $V_{BUS}$ at a magnitude (e.g., 20 V) that allows the emitters of the lighting module to reliably maintain their emitted light output (e.g., at the high-end intensity $L_{HE}$). The wiring length may, for example, include just the length of the cable (e.g., the cable 422) connecting each lighting module, or may include both the length of the cable connected each lighting module and the length of the lighting modules themselves (e.g., the length of the wiring between the power bus connectors, such as the connectors 830, that resides within the lighting module). For example, the power bus may include the cumulative length of the electrical conductors within the lighting modules (e.g., the electrical traces between the connectors, etc.) and the electrical conductors between the lighting modules and/or fixture controller (e.g., the wiring between fixtures). In other examples, the maximum length (e.g., 50 feet) may define the maximum length of cable (e.g., the cable 422) that can be used to connect each lighting module to one another and/or the fixture controller.

If the linear lighting assembly is configured with a power bus that exceeds the maximum length, such that one or more lighting modules are connected to the power bus at a wiring length from the fixture controller that exceeds the maximum length, these lighting modules that are located on the power bus at an excess of the maximum length may receive the bus voltage $V_{BUS}$ at a magnitude that is below a threshold (e.g., 15 V). This, for example, may be caused by the power loss due to the resistance of the wiring of the power bus. If a lighting module receives the bus voltage $V_{BUS}$ at a magnitude that is below the threshold (e.g., 15 V), the lighting modules may turn off the emitters of the lighting module (e.g., cause the emitters to not emit light), for example, to ensure that the control circuits (e.g., the master control circuit, the emitter control circuits, etc.) and the communication circuits (e.g., the serial communication circuit) do not shut off too. For instance, the lighting module (e.g., a control circuit of the lighting module) may detect that the magnitude of the bus voltage $V_{BUS}$ is below the threshold and turn off its emitters, which in turn may cause the magnitude of the bus voltage $V_{BUS}$ to rise above the threshold. As such, the emitters of the lighting modules that are located at a wiring length from the fixture controller that exceeds the maximum length may flicker on and off (e.g., due to the low voltage received on the power bus by these lighting modules) and/or otherwise react undesirably. Accordingly, one or more of the linear lighting fixtures may experience a long wire-run condition when those lighting modules that are located at a wiring length from the fixture controller that exceeds the maximum length.

As described in more detail herein, the linear lighting assembly may be configured to detect instances where the linear lighting assembly is experiencing an overload condition (e.g., the fixture controller is overloaded due to too many lighting modules attached to the power bus) and/or a long wire-run condition (e.g., the wiring of the lighting fixture assembly exceeds a maximum wiring length). In response to an overload condition and/or a long wire-run condition, the fixture controller and/or the lighting modules of one or more of the linear lighting assembly may be configured to react accordingly. For instance, in some examples, the fixture controller may be configured to cause one or more of the lighting modules of the linear lighting assembly connected to the power bus to reduce their maximum power (e.g., the power delivered to and/or the luminous flux of the light emitted by each of the emitters of the emitter module of each of the one or more lighting modules). For instance, the fixture controller may instruct the one or more lighting modules connected to the power bus to reduce their high-end intensity $L_{HE}$ (e.g., by a percentage and/or a step). After reducing their high-end intensity level $L_{HE}$, the magnitude of the bus voltage $V_{BUS}$ on the power bus may stabilize (e.g., maintain a magnitude above the threshold voltage across the entire power bus). If not, the fixture controller may repeatedly instruct the one or more lighting modules connected to the power bus to reduce their high-end intensity $L_{HE}$ until the magnitude of the bus voltage $V_{BUS}$ stabilizes (e.g., the magnitude of the bus voltage $V_{BUS}$ remains above the threshold voltage across the entire power bus).

Figure 14:
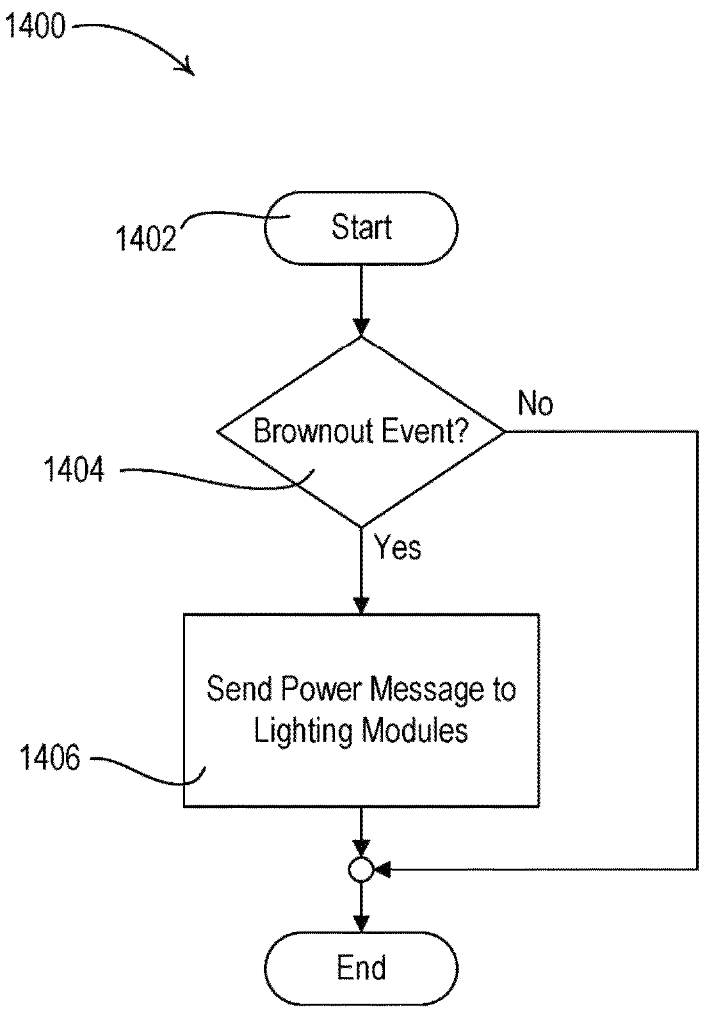
FIG. 14 is a flowchart depicting an example procedure for detecting a brownout event (e.g., an overload condition and/or a long wire-run condition) with a fixture controller of a linear lighting assembly.

FIG. 14 is a flowchart depicting an example procedure 1400 for detecting a brownout event (e.g., an overload condition and/or a long wire-run condition) with a fixture controller of a lighting system (e.g., the lighting system 500). The procedure 1400 may be executed by a control circuit of a fixture controller (e.g., the fixture control circuit 736 of the fixture controller 700). The control circuit may execute the procedure 1400 periodically, or in response to receiving one or more messages from one or more lighting modules (e.g., the master lighting module 800, the drone lighting module 900, and/or the drone lighting module 1000) of the lighting system. The control circuit may execute the procedure 1400 to detect and respond to a brownout event on a power bus (e.g., the power bus 530). For example, the control circuit may execute the procedure 1400 to detect a brownout event that is caused by an overload condition (e.g., more than the maximum number, or length, of lighting devices connected to the power bus) and/or a long wire-run condition (e.g., too long of a power bus, such that one or more lighting devices are connected to the power bus at a length that exceeds the maximum length for the lighting system).

The control circuit may start the procedure 1400 at 1402. At 1404, the control circuit may determine if a brownout event has been detected (e.g., by the fixture controller and/or one or more lighting modules of the lighting devices). For example, the control circuit may detect a brownout event by receiving a signal (e.g., a message) from a power converter circuit (e.g., the overload signal VOL from the power converter circuit 752) of the fixture controller, where for instance, the signal from the power converter indicates that a brownout event (e.g., an overload condition) is occurring. For example, the power converter circuit may be configured to detect that the magnitude of the bus current $I_{BUS}$ (e.g., the bus current $I_{BUS}$ as indicated by the bus current feedback signal $V_{I\text{-}BUS}$) indicates an overload condition (e.g., the magnitude of the bus current $I_{BUS}$ exceeds a threshold current), and generate the signal (e.g., the overload signal VOL) in response. The bus current $I_{BUS}$ may equate to the load current of the fixture controller.

Alternatively or additionally, the control circuit of the fixture controller may detect the brownout event based on the reception of a signal (e.g., a brownout event message, such as a brownout status flag) from at least one of the lighting modules indicating that the lighting module is experiencing the brownout event. Each of the lighting modules may be configured to send the signal if a magnitude of the bus voltage $V_{BUS}$ received on the power bus at the lighting module drops below a threshold voltage (e.g., approximately 15V). The threshold voltage may be referred to as a brownout threshold voltage. Further, in some instances, each of the lighting modules may be configured to send the signal if the magnitude of the bus voltage $V_{BUS}$ drops below the threshold voltage but remains above a second threshold voltage (e.g., approximately 5V), which for example, may be greater than the supply voltage $V_{CC}$ at the fixture controller. The signal may be useful in situations where, for instance, one or more lighting modules are located along the power bus at a wiring length greater than the maximum wiring length (e.g., the wiring of the power bus), such that those lighting modules receive the bus voltage $V_{BUS}$ at a magnitude that is below the threshold voltage (e.g., brownout threshold voltage) (e.g., which may be below approximately 15 V).

In some instances, the control circuit may receive the signal (e.g., the brownout event message) in response to a query message that the fixture controller sends to the lighting modules. For example, the control circuit may be configured to send (e.g., periodically send) a query message (e.g., health message) to the one or more lighting modules across a communication bus (e.g., the communication bus 540, such as an RS-485 communication link). The query message may be a general or specific request that the lighting module send the signal (e.g., the brownout event message) if a magnitude of the bus voltage $V_{BUS}$ received on the power bus at the lighting module is below and/or drops below the threshold voltage (e.g., approximately 15V), and in some instances, remains above the second threshold voltage (e.g., approximately 5V) that is greater than the supply voltage $V_{CC}$ at the fixture controller. The query message may request additional information from the lighting modules, such as a minimum measured magnitude of the bus voltage on the power bus at the lighting module, a maximum measured magnitude of the bus voltage on the power bus at the lighting module, and an average measured magnitude of the bus voltage on the power bus at the lighting module over a period of time. Further, in some examples, the control circuit may be configured to detect the brownout event based upon the reception of a plurality of consecutive signals (e.g., at least 3 consecutive brownout event messages) from at least one of the lighting modules.

Alternatively or additionally, the control circuit of the fixture controller may detect the brownout event based on the magnitude of the bus voltage $V_{BUS}$. For instance, the control circuit may detect a brownout event when the magnitude of the bus voltage $V_{BUS}$ drops below a first threshold voltage (e.g., 15V). In some examples, the control circuit may detect a brownout event in response to the magnitude of the bus voltage $V_{BUS}$ swinging between different magnitudes with respect to time. For instance, the control circuit may detect a brownout event in response to the magnitude of the bus voltage $V_{BUS}$ dropping below the threshold (e.g., 15V) and then rising above a third threshold voltage (e.g., 19V), for example, multiple times (e.g., at least three times) within a predetermined time period (e.g., six seconds). As noted above, the control circuit of the fixture controller may determine the magnitude of the bus voltage $V_{BUS}$ based on a voltage feedback signal (e.g., the voltage feedback signal $V_{V-FB}$).

Further, to detect a brownout event, in some examples the control circuit is further configured to determine that a magnitude of the AC mains line voltage $V_{AC}$ is stable during the detection of the brownout event. As such, in some examples, regardless of how the control circuit detects the brownout event at 1404 (e.g., based on a signal from the power converter circuit, based on a signal from a lighting module, and/or based on the magnitude of the bus voltage $V_{BUS}$), the control circuit may be configured to detect the brownout event if (e.g., only if) the control circuit also confirms that the magnitude of the AC mains line voltage $V_{AC}$ is stable during the brownout event. As such, in some examples, the control circuit may be configured to ensure that the brownout event is a result of the linear lighting device and not a byproduct of an unstable AC mains line voltage $V_{AC}$.

If the control circuit does not detect a brownout event at 1404, then the procedure 1400 may exit. However, if the control circuit detects a brownout event at 1404, the control circuit may send a power message to the lighting modules of the linear lighting device at 1406. For instance, the control circuit may send the power message to the lighting modules across the communication bus (e.g., the communication bus 540, such as an RS-485 communication link). After the control circuit sends the power message, the procedure 1400 may exit.

The power message may be configured to cause the lighting modules to scale back their power usage. For instance, the power message may be configured to instruct the lighting modules to adjust the high-end intensity level $L_{HE}$ of the lighting module (e.g., decrease the high-end intensity level $L_{HE}$ by a percentage, such as 5%, and/or a step). In some examples, the power message may include a Boolean data type (e.g., a command to scale back or a command to not scale back). The lighting modules may be configured to store the adjusted intensity level (e.g., the adjusted high-end intensity level $L_{HE}$) in in memory of the lighting module.

Inn some examples, the control circuit of the fixture controller may determine a stable high-end intensity level $L_{HE}$ for the system. For example, the control circuit of the fixture controller may send the power message to cause the lighting modules to scale back their power usage. The control circuit may send one or more power messages to the lighting modules, for example, until the lighting modules no longer experience a brownout event. Next, the control circuit may send one or more scale up messages that cause the lighting modules to scale up their power usage (e.g., the high-end intensity level $L_{HE}$), for example, to identify the true limit of the system. The control circuit may send the scale up messages until the lighting modules experience another brownout event. The scale up messages may be in a smaller increment than the power message (e.g., the scale up messages may cause the lighting modules to increase the high-end intensity level $L_{HE}$ by 1%). Finally, the control circuit may second a small power message that causes the lighting modules to scale back their power usage in a smaller increment than the power message (e.g., cause the high-end intensity level $L_{HE}$ to decrease by 1%). In some examples, the small power message may be of equal size and/or increment as the scale up message.

Further, in some examples, the control circuit of the fixture controller may perform the procedure 1400 multiple times to periodically reduce the power usage (e.g., by reducing the high-end intensity level $L_{HE}$) of the lighting modules until the brownout event no longer occurs. Finally, in some examples, the control circuit of the fixture controller may send a report of the brownout event to a remote control device and/or a system controller.

In some examples, the fixture controller may be configured to cause the one or more lighting modules to turn off (e.g., cause the lighting modules to turn off the emitters of the lighting modules) in response to the detection of a brownout event. For example, the control circuit may cause the magnitude of the magnitude of the bus voltage $V_{BUS}$ to drop to approximately zero volts in response to the detection of a brownout event, for example, by controlling the power converter circuit to shut down. For instance, the control circuit may know the magnitude of the bus voltage $V_{BUS}$ and/or the magnitude of the bus current $I_{BUS}$ based on one or more feedback signals (e.g., the voltage feedback signal $V_{V-FB}$ and/or the current feedback signal $V_{I-FB}$), and detect the brownout event based on the magnitude of the bus voltage $V_{BUS}$ and/or the bus current $I_{BUS}$ (e.g., when the magnitude of the bus voltage $V_{BUS}$ is below a threshold voltage and/or the magnitude of the bus current $I_{BUS}$ exceeds a threshold current). Further, in some instances, the fixture controller may cause the lighting modules to turn off prior to the control circuit sending the power message to the lighting modules.

Further, in examples where the fixture controller causes the lighting modules to turn off prior to the control circuit sending the power message to the lighting modules, the time period between the control circuit of each lighting module (e.g., the master control circuit and/or the emitter control circuits) booting up and the emitters of the lighting module turning back on may be relatively short. In some instances, the control circuit of the fixture controller may be configured to send the power message to the lighting modules during this short time period. However, in other examples, the time period may be too short for the control circuit of the lighting module to receive the power message from the fixture controller prior to turning the emitters back on.

Accordingly, the control circuit may transmit a hold signal (e.g., a hold message) to the one or more lighting modules on the communication bus, for example, in situations where the time period is too short. The power message may be configured to cause the lighting modules to scale back their power usage (e.g., before causing the emitters to turn back on and emit light). For example, prior to transmitting the power message, the control circuit of the fixture controller may transmit the hold signal to the lighting modules to instruct the lighting modules to wait before turning back on (e.g., before causing the emitters to turn back on and emit light). In some examples, the hold signal may comprise a pulse (e.g., a hold pulse) generated on the communication bus (e.g., during the synchronization period $T_{SYNC}$). For example, the hold pulse may be longer than the length of a synchronization pulse (e.g., double the length of the synchronization pulse 1122). The control circuit of the fixture controller may be configured to pause communications on the communication bus during a time period (e.g., the synchronization period $T_{SYNC}$) during which the control circuit may generate the hold signal. For instance, the control circuit of the fixture controller may be configured to determine the zero-crossings of the AC mains voltage $V_{AC}$ and begin generating the hold signal (e.g., the hold pulse) at the zero-crossings. Accordingly, by generating the hold signal on the communication bus, the control circuit of the fixture controller may cause the lighting modules to wait until the power message is received before the lighting modules turn back on their emitters. This may allow the lighting modules to reduce their power usage (e.g., decrease the high-end intensity level $L_{HE}$ by an amount, e.g., such as 5%) after the lighting modules power down in response to a brownout event and before they turn back on. Further, in some instances, the hold signal may also include the instruction to scale back their power usage.

Figure 15:
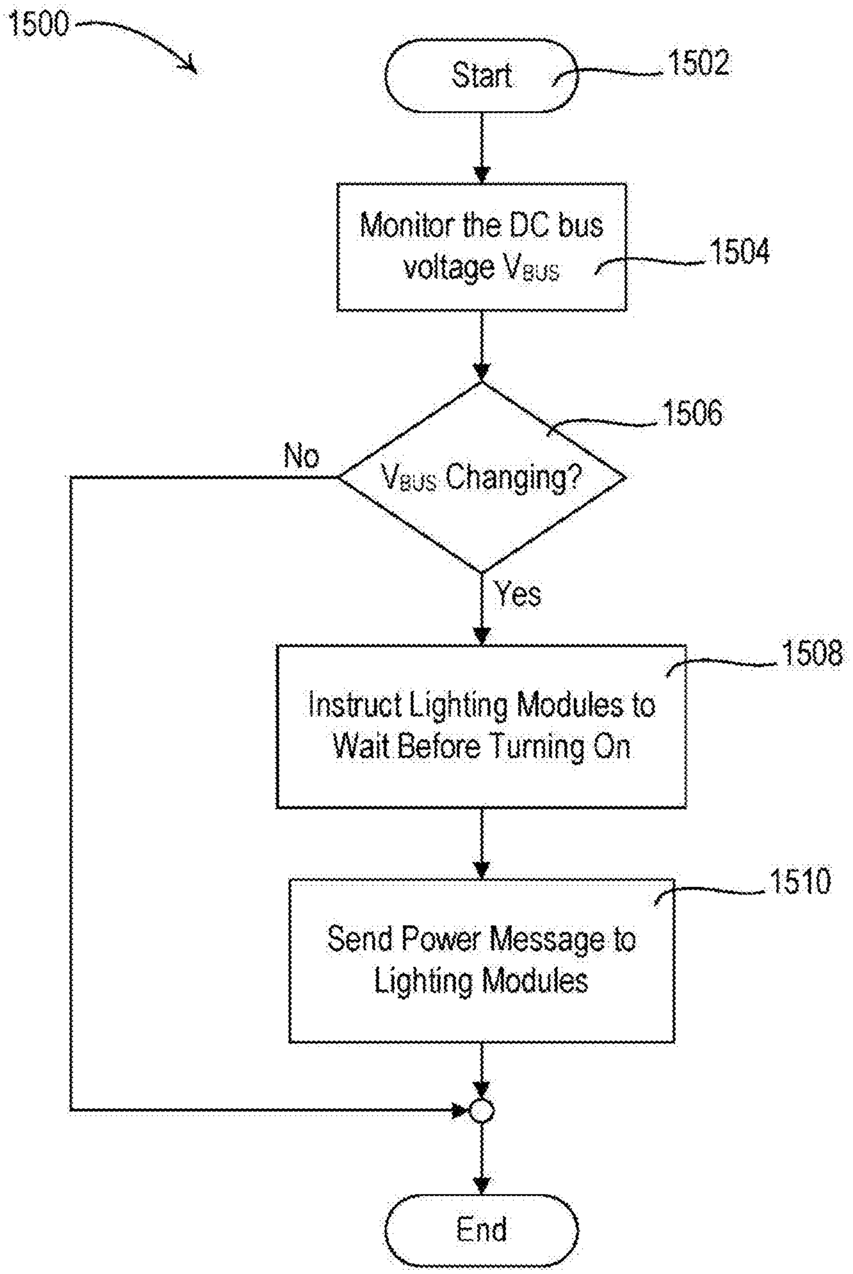
FIG. 15 is a flowchart depicting an example procedure for detecting a brownout event (e.g., an overload condition) by monitoring a voltage at a fixture controller of a linear lighting assembly.

FIG. 15 is a flowchart depicting an example procedure 1500 for detecting a brownout event (e.g., an overload condition) by monitoring a voltage (e.g., the bus voltage $V_{BUS}$) at a fixture controller of a linear lighting assembly (e.g., the fixture controller 520 of the lighting system 500). For example, the procedure 1500 may be executed by a control circuit of the fixture controller (e.g., the fixture control circuit 736 of the fixture controller 700). The control circuit may execute the procedure 1500 periodically. The control circuit may execute the procedure 1500 to detect a brownout event on a power bus (e.g., the power bus 530) and cause the lighting modules (e.g., the master lighting module 800, the drone lighting module 900, and/or the drone lighting module 1000) to reduce their power accordingly. The control circuit may execute the procedure 1500 in addition to or as an alternative to the procedure 1400. For example, the control circuit may execute the procedure 1500 to detect a brownout event that is caused by an overload condition (e.g., too many lighting modules connected to the power bus).

The control circuit may start the procedure 1500 at 1502. At 1504, the control circuit may monitor a magnitude of the bus voltage $V_{BUS}$ of the power bus. For example, the control circuit may determine the magnitude of the bus voltage $V_{BUS}$. At 1506, the control circuit may determine whether the magnitude of the bus voltage $V_{BUS}$ is changing (e.g., alternating and/or swinging) between different magnitudes with respect to time (e.g., oscillating). For instance, the control circuit may determine whether the magnitude of the bus voltage $V_{BUS}$ drops below a first threshold voltage (e.g., approximately 15V) and then rises above a second threshold voltage (e.g., approximately 19V), for example, multiple times (e.g., at least three times) within a predetermined time period (e.g., approximately six seconds). The second threshold may, for example, be configured such that it is greater than a nominal magnitude of the bus voltage $V_{BUS}$ generated by the fixture controller. If the control circuit determines that the magnitude of the bus voltage $V_{BUS}$ is not changing at 1506, the control circuit may exit the procedure 1500.

In some examples, the fixture controller may be configured to cause the one or more lighting modules to turn off (e.g., cause the lighting modules to turn off the emitters of the lighting modules) in response to detecting the magnitude of the bus voltage $V_{BUS}$ is changing at 1506 (e.g., in response to the magnitude of the bus voltage $V_{BUS}$ falling below the first voltage and rising above the second threshold voltage). In some examples, the power converter may automatically shut down when the magnitude of the bus voltage $V_{BUS}$ (e.g., a DC bus voltage $V_{BUS}$) falling below the first threshold voltage. In other examples, the power converter circuit may cause the magnitude of the bus voltage $V_{BUS}$ to drop to approximately zero volts in response to the detection of an overload condition (e.g., by controlling the power converter circuit to shut down). In addition, the control circuit may determine the magnitude of the bus voltage $V_{BUS}$ and/or the magnitude of the bus current $I_{BUS}$ based on one or more feedback signals (e.g., the voltage feedback signal $V_{V\text{-}FB}$ and/or the current feedback signal $V_{I\text{-}FB}$), and detect the brownout event based on the magnitude of the bus voltage $V_{BUS}$ and/or the magnitude of the bus current $I_{BUS}$ (e.g., when the magnitude of the bus voltage $V_{BUS}$ is below a threshold and/or the magnitude of the bus current $I_{BUS}$ exceeds a threshold).

At 1508, the control circuit may instruct the lighting modules to wait before turning on. For instance, the control circuit may transmit a hold signal (e.g., a hold message) to the one or more lighting modules on a communication bus (e.g., the communication bus 540, 740.840, such as an RS-485 communication link). The hold signal may instruct the control circuit of each of the lighting modules to wait a predetermined amount of time before turning the respective emitters back on (e.g., before causing the emitters to turn back on and emit light). In some examples, the hold signal may comprise a pulse (e.g., a hold pulse) generated on the communication bus (e.g., during the synchronization period $T_{SYNC}$). For example, the hold pulse may be longer than the length of a synchronization pulse (e.g., double the length of the synchronization pulse 1122). For instance, the control circuit may be configured to determine the zero-crossings of the AC mains voltage $V_{AC}$ and begin generating the hold signal (e.g., the double-length synchronization pulse) at the zero-crossings. The control circuit may be configured to pause communications on the communication bus during a time period (e.g., the synchronization period $T_{SYNC}$) during which the control circuit may generate the hold signal.

Further, in some examples, the fixture controller may also determine whether a magnitude of the AC mains line voltage $V_{AC}$ is stable prior to causing the lighting modules to turn off and/or transmitting the hold signal at 1508. As such, in some examples, regardless of whether the control circuit detects that the magnitude of the bus voltage $V_{BUS}$ is swinging, the control circuit may be configured to proceed to 1508 if (e.g., only if) the control circuit also confirms that the magnitude of the AC mains line voltage $V_{AC}$ is stable during the brownout event. Accordingly, in such examples, the control circuit may be configured to ensure that the brownout event is a result of the linear lighting device and not a byproduct of an unstable AC mains line voltage $V_{AC}$. If the control circuit determines that the AC mains line voltage $V_{AC}$ is not stable, then the control circuit may exit the procedure 1500 instead of advancing to 1508.

At 1510, the control circuit may send a power message to the lighting modules of the linear lighting device, for example, via the communication bus. The power message may be configured to cause the lighting modules to scale back their power usage. For instance, the power message may be configured to instruct the lighting modules to adjust (e.g., reduce) the high-end intensity level $L_{HE}$ of the lighting module (e.g., decrease the high-end intensity level $L_{HE}$ by a percentage, such as 5%, or a step). In some examples, the power message may include a Boolean data type (e.g., a command to scale back or a command to not scale back). The lighting modules may be configured to store the adjusted power level (e.g., the adjusted high-end intensity level $L_{HE}$) in in memory of the lighting module.

Further, in some examples, the control circuit may perform the procedure 1500 multiple times to periodically reduce the power usage (e.g., the high-end intensity level $L_{HE}$) of the lighting modules until the brownout event no longer occurs. Finally, in some examples, the control circuit may send a report of the brownout event to a remote control device and/or a system controller. After the control circuit sends the power message, the procedure 1500 may exit. Accordingly, the control circuit may cause the lighting modules to wait to receive the power message before the lighting modules turn back on their emitters. This may allow the control circuit to cause the lighting modules to reduce their power usage (e.g., decrease the high-end intensity level $L_{HE}$ by a percentage, such as 5%) after the lighting modules power down in response to a brownout event and before they turn back on.

Finally, in some instances, 1508 may be omitted, and the control circuit may be configured to send the power message to the lighting modules after the lighting modules turn off and without sending the lighting modules the hold signal.

Figure 16:
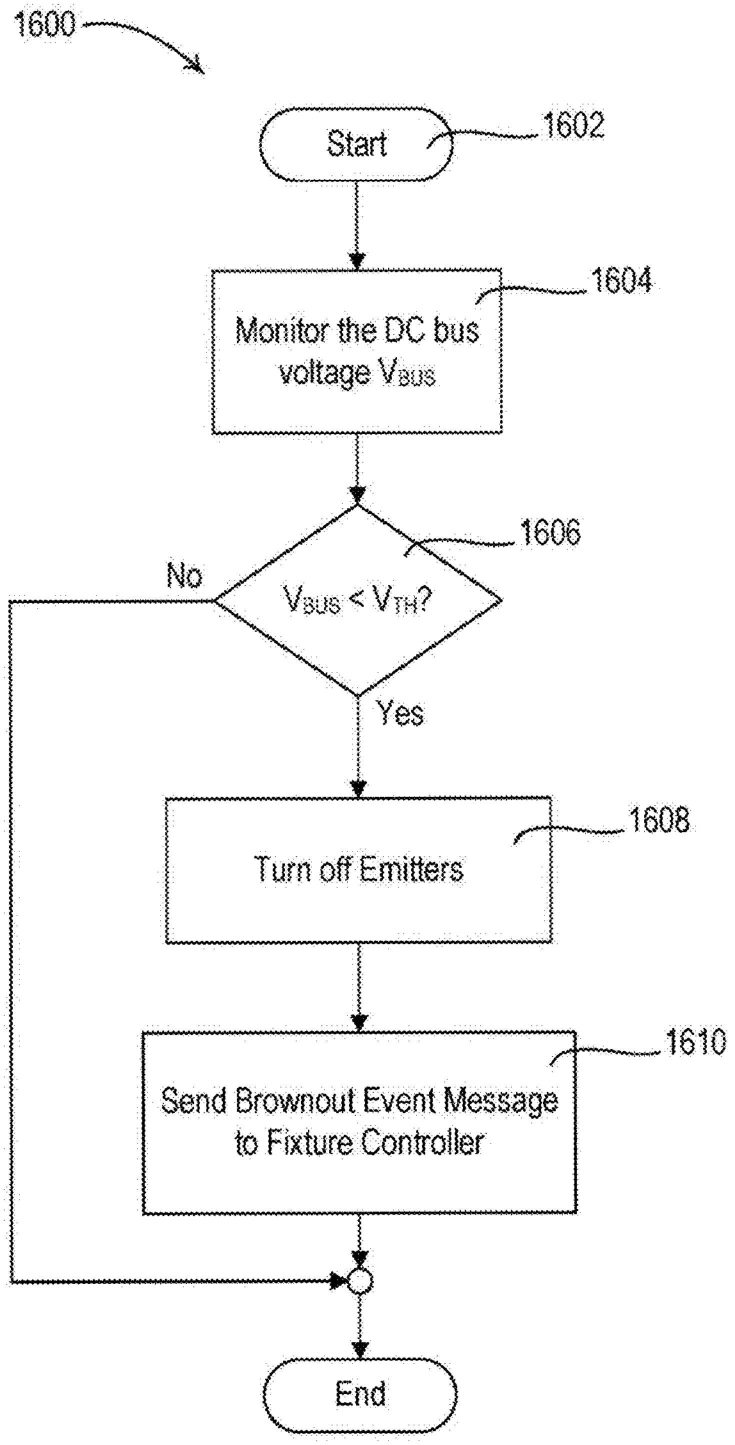
FIG. 16 is a flowchart depicting an example procedure for detecting a brownout event (e.g., a long wire-run condition) by monitoring a bus voltage $V_{BUS}$ at a lighting module of a linear lighting assembly.

FIG. 16 is a flowchart depicting an example procedure 1600 for detecting a brownout event (e.g., a long wire-run condition) by monitoring a bus voltage $V_{BUS}$ at a lighting module of a linear lighting assembly (e.g., the lighting system 500). The procedure 1600 may be executed by a control circuit of a lighting module (e.g., the master control circuit 850 of the master lighting module 800, the emitter control circuit 936 of the drone lighting module 900, and/or the emitter control circuit 1036 of the drone lighting module 1000). The control circuit may execute the procedure 1600 periodically. The control circuit may execute the procedure 1600 to detect a brownout event on the power bus (e.g., the power bus 530) and report back to a fixture controller (e.g., the fixture controller 700) accordingly. For example, the control circuit may execute the procedure 1600 to detect a brownout event that is caused by a long wire-run condition.

The control circuit may start the procedure 1600 at 1602. At 1604, the control circuit may monitor the magnitude of the bus voltage $V_{BUS}$. Since the magnitude of the bus voltage $V_{BUS}$ may reduce along the length of the power bus (e.g., due to the impedance of the electrical wiring of the power bus), the magnitude of the bus voltage $V_{BUS}$ received at the lighting modules that reside further from the fixture controller may be reduced. So, the magnitude of the bus voltage $V_{BUS}$ received at the lighting modules that are located closer to the fixture controller may be higher than the magnitude of the bus voltage $V_{BUS}$ received at the lighting modules that are located farther from the fixture controller.

At 1606, the control circuit may determine whether the magnitude of the DC bus voltage $V_{BUS}$ is less than a threshold voltage $V_{TH}$. In some examples, the threshold voltage $V_{TH}$ may be the same as the threshold voltage $V_{TH}$ (e.g., the first threshold voltage) used in the procedure 1400. For instance, the threshold voltage $V_{TH}$ may be approximately 15 V. In some examples, the control circuit may determine whether the magnitude of the DC bus voltage $V_{BUS}$ is less than an upper threshold (e.g., 15V) but greater than a lower threshold (e.g., 5 V). The lower threshold may be configured to be greater than an internal supply voltage $V_{CC}$ of the lighting module (e.g., 3.3 V). If the control circuit determines that the magnitude of the bus voltage $V_{BUS}$ is greater than the threshold voltage $V_{TH}$ at 1606, the control circuit may exit the procedure 1600.

If the control circuit determines that the magnitude of the bus voltage $V_{BUS}$ is less than the threshold voltage $V_{TH}$ at 1606, the control circuit may cause the emitters to turn off at 1608. For example, the control circuit may control the power delivered to and/or the luminous flux of the light emitted by each of the emitters of the emitter module (e.g., the emitter module 810, the emitter module 910, and/or the emitter module 1010) to cause the emitters to turn off.

At 1610, the control circuit may send a message (e.g., a brownout event message, such as a brownout status flag) to the fixture controller, and the procedure 1600 may exit. The brownout event message may indicate that the lighting module is experiencing or has experienced a brownout event. The control circuit may send the message to the fixture controller across a communication bus (e.g., the communication bus 540, such as an RS-485 communication link). In some examples, the control circuit may send the message in response to a query message that is received from the fixture controller. For example, the fixture controller may be configured to send (e.g., periodically send) a query message (e.g., a health message) to the one or more lighting modules across the communication bus. The query message may request that the lighting module send the message if the lighting module detects a brownout event. The message may be useful in situations where, for instance, one or more lighting modules are located along the power bus at a wiring length greater than the maximum wiring length (e.g., the wiring of the power bus), such that the magnitude of the bus voltage $V_{BUS}$ received by those lighting modules is below the threshold voltage $V_{TH}$ (e.g., below 15 V).

As noted above, the fixture controller may send a power message to the lighting modules of the lighting device in response to receiving the message (e.g., the brownout event message). The power message may be configured to cause the lighting modules to scale back their power usage. For instance, the power message may be configured to instruct the lighting modules to adjust (e.g., reduce) the high-end intensity level $L_{HE}$ of the lighting module (e.g., decrease the high-end intensity level $L_{HE}$ by a percentage, such as 5%). Further, in some examples, the fixture controller may be configured to detect the brownout event based upon the reception of a plurality of consecutive messages (e.g., at least 3 consecutive brownout event messages) from at least one of the lighting modules. Further, in some instances, the message (e.g., the brownout event message) may be a status flag that the control circuit sets and sends to the fixture controller in response to the query message. In such instances, the fixture controller may be configured to send a clear message to the lighting device to instruct the lighting devices to clear the status flag associated with the message (e.g., brownout event message) after the control circuit sends the power message.

Finally, in some examples, the control circuit of the lighting module may cause the emitters to turn on (e.g., after 1608). In some instances, the control circuit may cause the emitters to turn on at a bus voltage magnitude that is higher than the threshold voltage $V_{TH}$ (e.g., at a turn on voltage of 17 V). The difference between the threshold voltage $V_{TH}$ that triggers the control circuit to cause the emitters to turn off at 1608 and the threshold voltage that triggers the control circuit to cause the emitters to turn on may help to prevent the emitters from flashing on and off repeatedly.

What is claimed is:

1. A fixture controller comprising:
- a power converter circuit configured to generate a bus voltage on a power bus, wherein the power bus is coupled between the fixture controller and one or more lighting devices; and
- a control circuit configured to control the one or more lighting devices, the control circuit configured to:
  - send a query message to the one or more lighting devices that requests the lighting device to send a status message including a minimum measured value of the bus voltage on the power bus, a maximum measured value of the bus voltage on the power bus, or an average measured value of the bus voltage on the power bus over a period of time;
  - detect a brownout event on the power bus; and
  - send a power message to the one or more lighting devices instructing the one or more lighting devices to decrease their respective high-end intensity level in response to the detection of the brownout event on the power bus.

2. The fixture controller of claim 1, wherein the control circuit is configured to detect the brownout event based on the status message.

3. The fixture controller of claim 1, wherein the query message requests that the one or more lighting devices send the status message if a voltage received at the lighting device drops below a threshold voltage.

4. The fixture controller of claim 3, wherein the query message requests that the one or more lighting devices send the status message if the voltage drops below the threshold voltage and remains above a second threshold voltage.

5. The fixture controller of claim 4, wherein the second threshold voltage is greater than a supply voltage at the fixture controller.

6. The fixture controller of claim 1, wherein the control circuit is configured to receive the status message in response to the query message, and detect the brownout event on the power bus based on the status message.

7. The fixture controller of claim 1, wherein the control circuit is configured to periodically send the query message to the one or more lighting devices across a communication bus.

8. The fixture controller of claim 1, wherein the control circuit is configured to detect the brownout event based upon the reception of a plurality of consecutive status messages from at least one of the lighting devices.

9. The fixture controller of claim 1, wherein the control circuit is configured to send the power message to the one or more lighting devices instructing the one or more lighting devices to decrease their respective high-end intensity level in response to the reception of the status message.

10. A method comprising:
- generating a bus voltage on a power bus, wherein the power bus is coupled between a fixture controller and one or more lighting devices;
- sending a query message to the one or more lighting devices that requests the lighting device to send a status message including a minimum measured value of the bus voltage on the power bus, a maximum measured value of the bus voltage on the power bus, or an average measured value of the bus voltage on the power bus over a period of time;
- detecting a brownout event on the power bus; and
- sending a power message to the one or more lighting devices instructing the one or more lighting devices to decrease their respective high-end intensity level in response to the detection of the brownout event on the power bus.

11. The method of claim 10, further comprising detecting the brownout event based on the status message.

12. The method of claim 10, wherein the query message requests that the one or more lighting devices send the status message if a voltage received at the lighting device drops below a threshold voltage.

13. The method of claim 12, wherein the query message requests that the one or more lighting devices send the status message if the voltage drops below the threshold voltage and remains above a second threshold voltage.

14. The method of claim 13, wherein the second threshold voltage is greater than a supply voltage at the fixture controller.

15. The method of claim 10, further comprising:
- receiving the status message in response to the query message, and detecting the brownout event on the power bus based on the status message.

16. The method of claim 10, further comprising:
- periodically sending the query message to the one or more lighting devices across a communication bus.

17. The method of claim 10, further comprising:
- detecting the brownout event based upon the reception of a plurality of consecutive status messages from at least one of the lighting devices.

18. The method of claim 10, further comprising:
- sending the power message to the one or more lighting devices instructing the one or more lighting devices to decrease their respective high-end intensity level in response to the reception of the status message.

19. At least one non-transitory computer-readable storage medium comprising executable instructions configured to cause at least one control circuit to:
- generate a bus voltage on a power bus, wherein the power bus is coupled between a fixture controller and one or more lighting devices;
- send a query message to the one or more lighting devices that requests the lighting device to send a status message including a minimum measured value of the bus voltage on the power bus, a maximum measured value of the bus voltage on the power bus, or an average measured value of the bus voltage on the power bus over a period of time;

detect a brownout event on the power bus; and send a power message to the one or more lighting devices instructing the one or more lighting devices to decrease their respective high-end intensity level in response to the detection of the brownout event on the power bus.

20. The at least one non-transitory computer-readable storage medium of claim 19, wherein the executable instructions are further configured to cause the at least one control circuit to:

detect the brownout event based on the status message; and wherein the query message requests that the one or more lighting devices send the status message if a voltage received at the lighting device drops below a threshold voltage.

* * * * *